US008214238B1

(12) United States Patent
Fairfield et al.

(10) Patent No.: US 8,214,238 B1
(45) Date of Patent: Jul. 3, 2012

(54) CONSUMER GOODS AND SERVICES HIGH PERFORMANCE CAPABILITY ASSESSMENT

(75) Inventors: Daren Keith Fairfield, Holland, MI (US); Christopher J. Rundell, Chicago, IL (US); Pascal Doll, Lane Cove (AU)

(73) Assignee: Accenture Global Services Limited, Dublin (IE)

( * ) Notice: Subject to any disclaimer, the term of this patent is extended or adjusted under 35 U.S.C. 154(b) by 545 days.

(21) Appl. No.: 12/427,201

(22) Filed: Apr. 21, 2009

(51) Int. Cl.
*G06Q 10/00* (2012.01)
(52) U.S. Cl. ............... 705/7.11; 705/7.29; 705/7.32; 705/7.36; 705/7.38; 705/7.39
(58) Field of Classification Search ............... 705/7.39, 705/35, 36, 7.11, 7.29, 7.31, 7.36, 7.38; 435/6.1; 707/999.005
See application file for complete search history.

(56) References Cited

U.S. PATENT DOCUMENTS

| | | | | |
|---|---|---|---|---|
| 5,734,890 | A * | 3/1998 | Case et al. ............... | 1/1 |
| 6,256,773 | B1 | 7/2001 | Bowman-Amuah | |
| 6,324,647 | B1 | 11/2001 | Bowman-Amuah | |
| 6,370,573 | B1 | 4/2002 | Bowman-Amuah | |
| 6,601,233 | B1 | 7/2003 | Underwood | |
| 6,957,186 | B1 | 10/2005 | Guheen et al. | |
| 2002/0035495 | A1 | 3/2002 | Spira et al. | |
| 2003/0033192 | A1* | 2/2003 | Zyman et al. ............ | 705/10 |
| 2003/0083912 | A1 | 5/2003 | Covington, III et al. | |
| 2003/0110067 | A1 | 6/2003 | Miller et al. | |
| 2003/0171976 | A1* | 9/2003 | Farnes et al. ............ | 705/10 |
| 2004/0054567 | A1* | 3/2004 | Bubner ................... | 705/7 |
| 2004/0098299 | A1 | 5/2004 | Ligon et al. | |
| 2005/0234767 | A1* | 10/2005 | Bolzman et al. ......... | 705/11 |
| 2006/0247988 | A1* | 11/2006 | Worcester .............. | 705/35 |

OTHER PUBLICATIONS

Ahmed et al.; Maturity Assessment Framework for Business; IBIS—Issue 1(1), 2006; Department of Electrical & Computer Engineering; University of Western Ontario.*
Ahmed et al.; Maturity Assessment Framework for Business; IBIS—Issue 1 (1),2006; Department of Electrical & Computer Engineering; University of Western Ontario.*
Carter; Global agricultural marketing management. (Marketing and Agribusiness Texts—3), Food and Agriculture Organization of the United Nations; Rome, 1997; FAO Regional Office for Africa.*
Shapiro, Stages in the Evolution of the Product Development Process, and Shapiro and Gilmore, Implementing PACE: How to Make It Real and Make It Lasting, in Setting the PACE in Product Development: A Guide to Product and Cycle Time Excellence, 1995, p. 147-1 77.*
Harigopal and Satyadas, Cognizant Enterprise Maturity Model (CEMM), IEEE Transactions on Systems, Man, and Cybernetics-PartC: Applications and Reviews, vol. 31, No. 4, Nov. 2001.*

(Continued)

*Primary Examiner* — Romain Jeanty
*Assistant Examiner* — Naima Akida
(74) *Attorney, Agent, or Firm* — Brinks Hofer Gilson & Lione

(57) ABSTRACT

A high performance capability assessment model helps a consumer goods and services business meet the challenges of the global marketplace. As a result, the consumer goods and services business can achieve the clarity, consistency, and well-defined execution of core processes that reduce inefficiencies and waste that result from unnecessary process complexity and exceptions. In addition, the high performance capability assessment model helps the consumer goods and services business to identify specific areas in which improvements may be made and understand how to make the improvements, and establishes levels of capability along the way to reaching an ultimate capability goal.

18 Claims, 12 Drawing Sheets

OTHER PUBLICATIONS da Silva, J.F. and de Almeida Pinho, A.F.;Study on the competitiveness of the Brazilian pharmaceutical industry based on Porter's typology; 2001;PICMET—Portland State Univ., Portland, OR;Portland International Conference on Management of Engineering and Technology. Proceedings vol. 1: Book of Summaries (IEEE Cat. No. 01CH37199); pp. 292.*

Brochure, "High Performance Acceleration: Global Retail Process Model," Accenture, High Performance Delivered, 2007.

Handbook, Software Engineering Institute, "A Description of the Systems Engineering Capability Maturity Model Appraisal Method Version 1.1," Mar. 1996.

Keith A. Heston, "Achieving Delivery Excellence Using the Capability Maturity Model Integration," *Accenture, High Performance Delivered*, 2006.

Report, Software Engineering Institute, "A Systems Engineering Capability Maturity Model, Version 1.1.," Nov. 1995.

Walker Royce, "CMM vs. CMMI: From Conventional to Modern Software Management," *The Rational Edge*, 2002.

Non-Final Office Action dated Apr. 28, 2011, issued in related U.S. Appl. No. 12/129,080.

U.S. Appl. No. 11/823,112, filed Jun. 25, 2007.
U.S. Appl. No. 12/124,010, filed May 20, 2008.
U.S. Appl. No. 12/129,080, filed May 29, 2008.
U.S. Appl. No. 61/086,927, filed Aug. 7, 2008.
U.S. Appl. No. 12/194,793, filed Aug. 20, 2008.
U.S. Appl. No. 61/092,225, filed Aug. 27, 2008.
U.S. Appl. No. 12/324,150, filed Nov. 26, 2008.
U.S. Appl. No. 61/154,832, filed Feb. 24, 2009.
U.S. Appl. No. 61/154,945, filed Feb. 24, 2009.
U.S. Appl. No. 61/164,640, filed Mar. 30, 2009.
U.S. Appl. No. 61/164,618, filed Mar. 30, 2009.
U.S. Appl. No. 12/471,767, filed May 26, 2009.
U.S. Appl. No. 12/479,310, filed Jun. 5, 2009.
U.S. Appl. No. 12/548,673, filed Aug. 27, 2009.
U.S. Appl. No. 12/701,914, filed Feb. 8, 2010.
U.S. Appl. No. 12/710,900, filed Feb. 23, 2010.
U.S. Appl. No. 12/710,662, filed Feb. 23, 2010.
U.S. Appl. No. 12/713,647, filed Feb. 26, 2010.
U.S. Appl. No. 12/713,597, filed Feb. 26, 2010.

* cited by examiner

CONSUMER GOODS AND SERVICES HIGH PERFORMANCE CAPABILITY ASSESSMENT

BACKGROUND OF THE INVENTION

1. Technical Field

This disclosure concerns a system and method to identify the performance of an organization on a scale of mastery across representative capabilities of the organization's industry. In particular, this disclosure relates to an efficient and cost effective way to assess the performance level of key capability areas within the processes of a consumer goods and services organization.

2. Background Information

Modern consumer goods and services organizations operate in an increasingly challenging environment. To survive, consumer goods and services organizations must adapt to this environment and execute in a clear, consistent, and efficient manner. Furthermore, the competitive nature, low profit margins, and foreign competitive challenges of consumer goods and services businesses greatly increase the complexity and difficulty of surviving on a day-to-day basis.

Despite the need for a consumer goods and services organization to meet the challenges of the global marketplace, it is still often the case that the business lacks clarity, consistency, and well-defined execution of its core processes. These shortcomings severely constrain the business, and lead directly to inefficiencies and waste due to unnecessary complexity, process exceptions, and customer dissatisfaction. At the same time, it can be very difficult to identify specific processes to which improvements may be made, either because the business itself does not have the expertise to identify the processes or because the complexities of the business frustrate attempts to clearly delineate the processes to be improved.

Even if the consumer goods and services business, on its own, could identify one of the many processes that it needs to improve, the business would not necessarily know how to improve the process or be able to identify a concrete and measurable improvement goal. Another difficulty exists in determining whether there are any intermediate goals that should be reached along the way. As consumer goods and services businesses struggle to meet the demands of the modern economic landscape, they fail to identify opportunities for maximizing sales and margin improvement, category expansion, multi-channel execution, customer satisfaction improvement, and to reach other important goals.

Therefore, a need exists for an efficient and effective system and method to assess the performance level of key assessment areas within the processes of an organization.

SUMMARY

A high performance capability assessment (HPCA) model helps consumer goods and services businesses meet the challenges of the global marketplace by defining a scale of performance mastery along which the current practices of the business may be located. The HPCA model accelerates the discovery of process and performance gaps within business operations. In addition, the HPCA model also helps the business to identify specific areas in which improvements may be made, how to make the improvements, and how to establish performance measures during the course of attempting to achieve an ultimate goal. As a result, the business can achieve the clarity, consistency, and well-defined execution of core processes that maximize the operating budget for optimum outcomes.

The HPCA model includes a key factor dimension and a performance mastery scale dimension. The performance mastery scale dimension defines multiple mastery levels. The performance mastery levels form a scale of increasing organizational performance. The scale includes a 'Basic' mastery level, a 'Competitive' mastery level, and a 'Market Leading' mastery level. Each performance mastery level includes criteria specific to a corresponding key assessment area. Each key assessment area identifies some aspect of a capability of a business.

A business capability can be defined as a bundle of closely integrated skills, knowledge, technologies, and cumulative learning that is exercised through a set of processes and that collectively represents an organization's ability to create value by producing outcomes and results. Capability area does not represent a delineation of organizational responsibilities as the business outcomes of a capability may be the result of a number of cross-functional teams. Capabilities of a business may be grouped into platforms. For example, the HPCA model groups the capabilities of the consumer goods and services industry into six high-level platforms, including a strategy and governance platform, a demand generation platform, a demand synchronization platform, a demand fulfillment platform, an enterprise operations platform, and an insight and decision making platform. Examples of capabilities within the strategy and governance platform, for example, include corporate mission (and values and governance), corporate objectives, corporate strategy, portfolio planning, integrated strategic planning, sales and operations planning, operating model and organization planning, and merger and acquisition planning. Platforms may include sub-platforms, as well as capabilities.

The key factor dimension establishes a set of key assessment areas in which to analyze the capabilities of a business. Key assessment areas include performance capability criteria. Performance capability criteria populate the performance capability assessment model. The performance capability criteria may be specific to any one of many different business capabilities. For example, the demand synchronization platform includes performance capability criteria for integrated demand and supply planning, product lifecycle management, portfolio optimization, and route to market key assessment areas at each of the capability levels along the performance capability scale dimension. Any number of performance capability assessment models and performance capability criteria may be defined and stored in a capability detail pool for subsequent retrieval and application to a business under examination. Accordingly, the HPCA model provides a flexible and adaptive scale of performance capability against which business practices may be compared to ascertain where the capabilities of a business under examination fall along the scale.

Other systems, methods, features, and advantages will be, or will become, apparent to one with skill in the art upon examination of the following figures and detailed description. All such additional systems, methods, features, and advantages are included within this description, are within the scope of the invention, and are protected by the following claims.

BRIEF DESCRIPTION OF THE DRAWINGS

The consumer goods and services industry high performance capability assessment model and system may be better understood with reference to the following drawings and description. The elements in the figures are not necessarily to scale, emphasis instead being placed upon illustrating the principles of the capability assessment techniques. In the figures, like-referenced numerals designate corresponding parts throughout the different views.

DETAILED DESCRIPTION OF THE PREFERRED EMBODIMENTS

Figure 1:
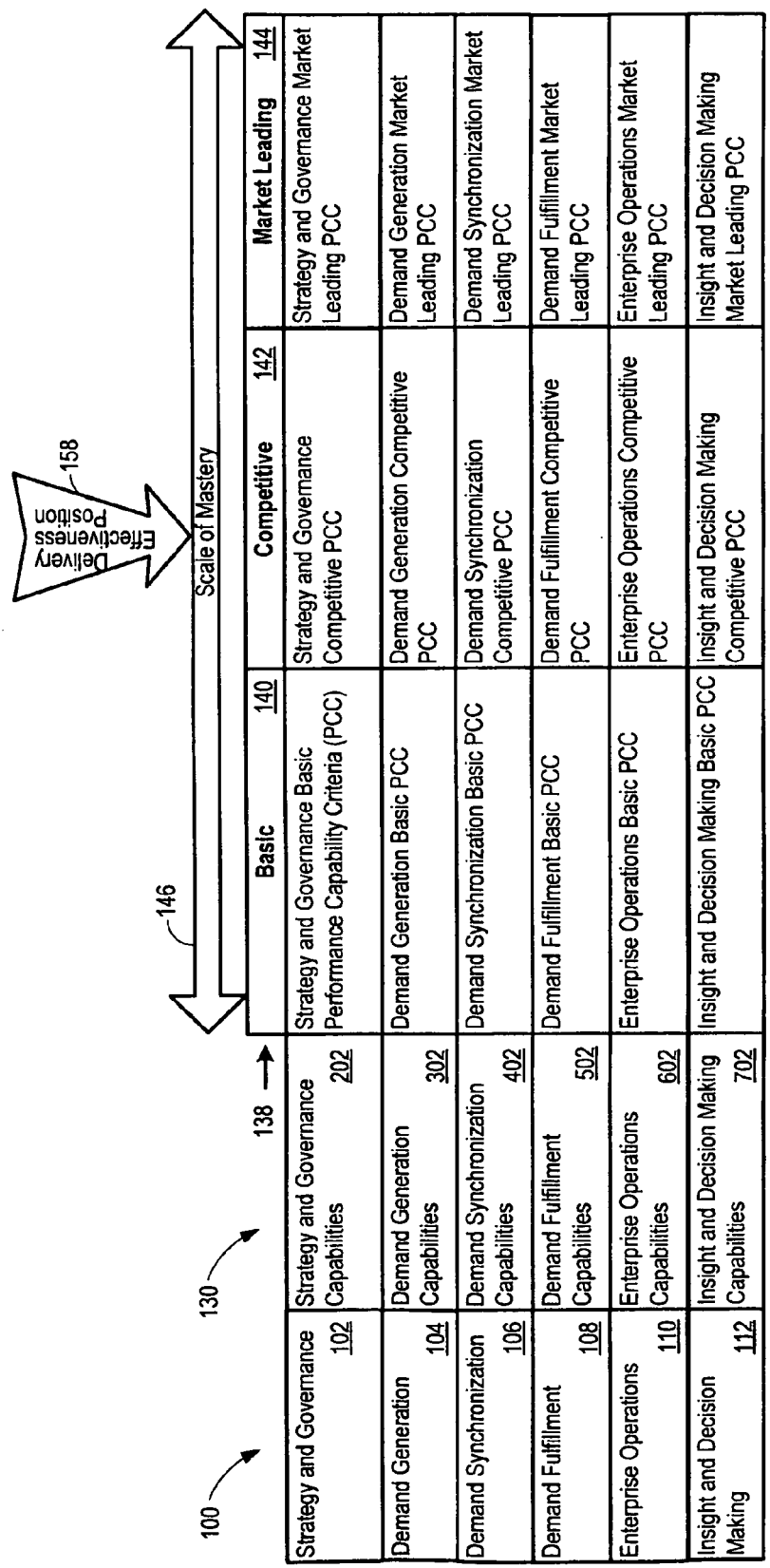
FIG. 1 shows a high performance capability assessment model with a performance scale of mastery and performance criteria shown for different capabilities.

FIG. 1 shows a high performance capability assessment (HPCA) model 100. The HPCA model 100 specifies six high-level platforms, including a strategy and governance platform 102, a demand generation platform 104, a demand synchronization platform 106, a demand fulfillment platform 108, an enterprise operations platform 110, and an insight and decision making platform 112. The HPCA model 100 is not limited to the form shown in FIG. 1. Instead, the HPCA model 100 may be adapted and modified to fill a wide variety of analysis roles. Additional, different, or fewer platforms may be used in other implementations, with each platform defining additional, different, or fewer capabilities. Each platform includes one or more multiple <platform name> capabilities 130.

The HPCA model 100 establishes a multidimensional consumer goods and services industry performance reference set that includes multiple key assessment performance levels 138, further described below in reference Tables 1-3. The performance levels 138 establish a scale of increasing effectiveness in delivery of each capability. The key assessment performance reference tables include a 'Basic' 140 delivery level, a 'Competitive' 142 delivery level and a 'Market Leading' 144 delivery level. The performance levels establish a scale of mastery 146 along which current business practices may be located and identified with respect to any platform and capability within a platform according to an analysis of performance capability criteria (PCC). The capability under evaluation may be assigned the performance level 138 based on a delivery effectiveness position 158 along the scale of mastery 146.

The 'Basic' delivery level 140 specifies 'Basic' performance assessment criteria, the 'Competitive' delivery level 142 specifies 'Competitive' performance assessment criteria, and the 'Market Leading' delivery level 144 specifies 'Market Leading' performance assessment criteria. The HPCA model 100 receives input data that specifies a consumer goods and services business platform (e.g., a consumer goods and services industry area) and a consumer goods and services industry key assessment area for analysis. The HPCA model 100 searches the multidimensional consumer goods and services industry performance reference set for a matching key assessment performance reference table that matches the consumer goods and services industry platform and corresponding industry capability within the platform and the consumer goods and services industry key assessment area, and retrieves the matching key assessment performance reference table. The HPCA model 100 initiates analysis of the matching key assessment performance reference table to obtain a resultant performance assessment level for the consumer goods and services industry key assessment area.

Tables 1-3 below provide an explanation of each of the capability levels 140, 142, and 144.

TABLE 1

'Basic' Delivery Level

| Description: | Capability mastery at a basic level is indicative of a high level, unclear, undisciplined, or unsophisticated ability to execute the capability in a consistent, traceable, and repeatable manner. For non-core, low priority, new, or early adoption of certain process capabilities, a basic level may be acceptable to the organization or the organization may not have the resources to expand beyond the basic capability level. A basic level of mastery often indicates that an organization is lagging behind its competitors in its ability to execute the capability. |
|---|---|

TABLE 2

'Competitive' Delivery Level

| Description: | Capability mastery at a competitive level is indicative of a conservative ability to execute the capability in a fairly consistent, traceable, and repeatable manner with proven techniques, tools and commonly accepted practices that are readily available and maintained. This capability mastery is either a strategic decision by the organization to be a follower or "good enough" operator in many respects or is an interim step that organizations aspire to move beyond and achieve a market leading mastery of the given capability. A competitive level of mastery often indicates that an organization is performing consistently with its competitors in its ability to execute a capability. |
|---|---|

TABLE 3

'Market Leading' Delivery Level

| Description: | Capability mastery at a market leading level is indicative of a highly detailed, clear, and often iterative and sophisticated ability to execute the capability. The market leading practice is the recognized and referenced benchmark of continuous improvement and high performance for a given process capability. The leading process capability has been optimized for efficiency and effectiveness, is well understood, traceable, and consistently executed to the point of being competitively differentiated or at the top level of peer-to-peer comparison. |
|---|---|

For FIGS. 2-7, the capability under evaluation may be assigned a level of mastery 138 based on the business' position along the scale of mastery 146 (e.g., the 'basic,' 'competitive,' or 'market leading' delivery level). Performance criteria corresponding to the basic 140, competitive 142 and market leading 144 performance levels populate the HPCA model 100. The performance criteria capture characteristics, and/or other features of the delivery of a capability at a particular performance level. Examples below illustrate performance criteria that provide analysis and benchmarking for consumer goods and services organizations. The HPCA model 100 performance criteria provide a tool for determining where a platform and capability under examination falls along the scale of mastery 146.

For example, business consultants and business process engineers may interview a business or receive data about the business to determine, measure, or otherwise ascertain the characteristics, criteria, and other features of a particular capability implemented within the business. The consultants and engineers may compare the characteristics of the business to the performance criteria in the HPCA model 100 and arrive at an assessment level 138 for the capability under examination. In doing so, for example, the consultants and engineers may identify where the capability under examination falls in terms of the performance level for each key assessment area of a capability and determine an overall position on the scale of mastery 146 for the capability under examination. Performance criteria may populate the HPCA model 100 in whole or in part. Multiple high performance capability assessments may be collected and stored with the performance criteria for future retrieval and possible modification in a capability detail pool, discussed below.

Figure 2:
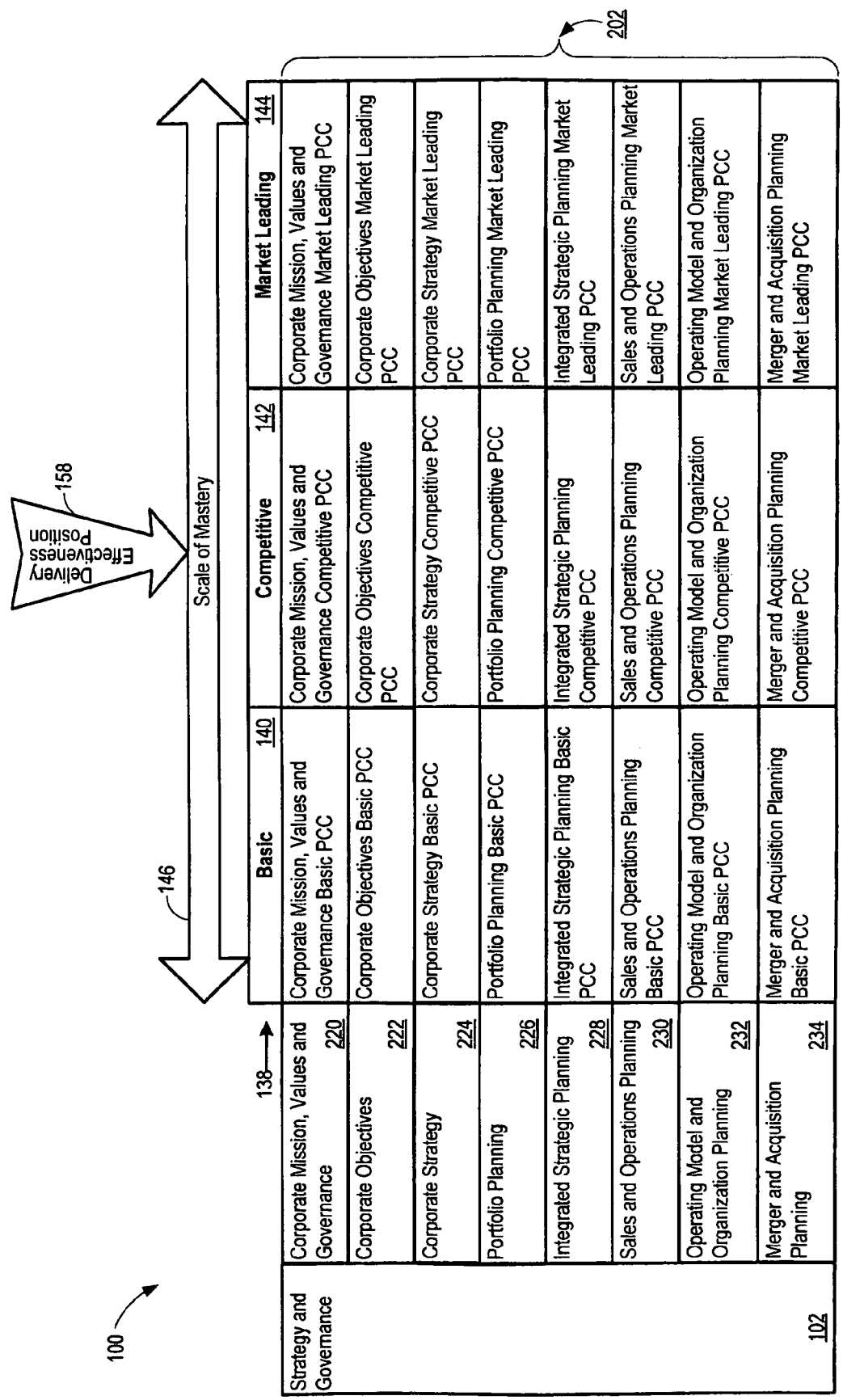
FIG. 2 shows a high performance capability assessment model with strategy and governance capabilities shown.

FIG. 2 shows the strategy and governance platform 102 divided into respective capability areas 202. The strategy and governance platform 102 includes a corporate mission, values and governance capability 220, a corporate objectives capability 222, a corporate strategy capability 224, a portfolio planning capability 226, an integrated strategic planning capability 228, a sales and operations planning capability 230, an operating model and organization planning capability 232, and a merger and acquisition planning capability 234.

Figure 3:
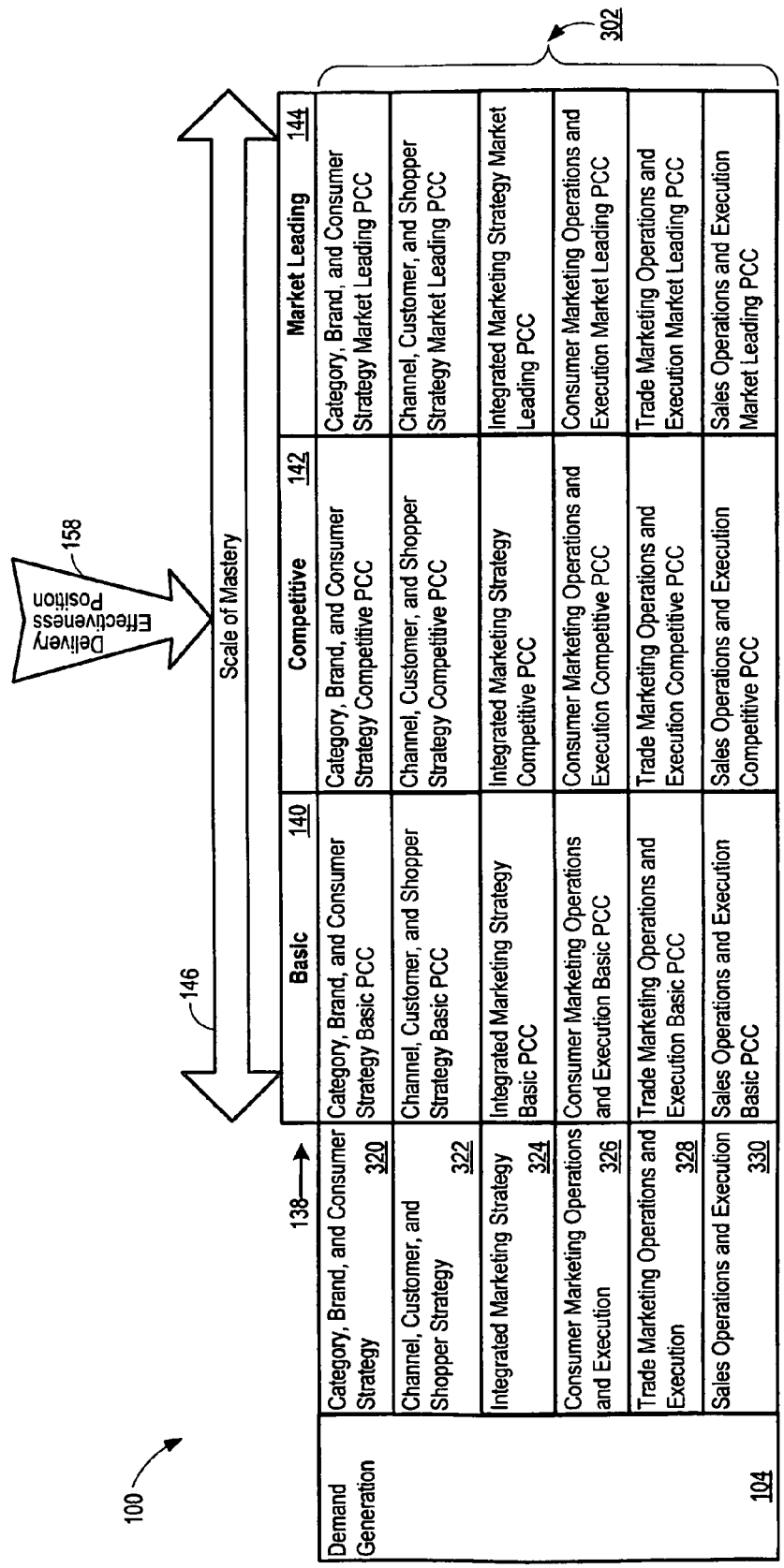
FIG. 3 shows a high performance capability assessment model with demand generation capabilities shown.

FIG. 3 shows the demand generation platform 104 divided into respective capability areas 302. The demand generation platform 104 includes a category, brand, and consumer strategy capability 320, a channel, customer, and shopper strategy capability 322, an integrated marketing strategy capability 324, a consumer marketing operations and execution capability 326, a trade marketing operations and execution capability 328, and a sales operations and execution capability 330.

Figure 4:
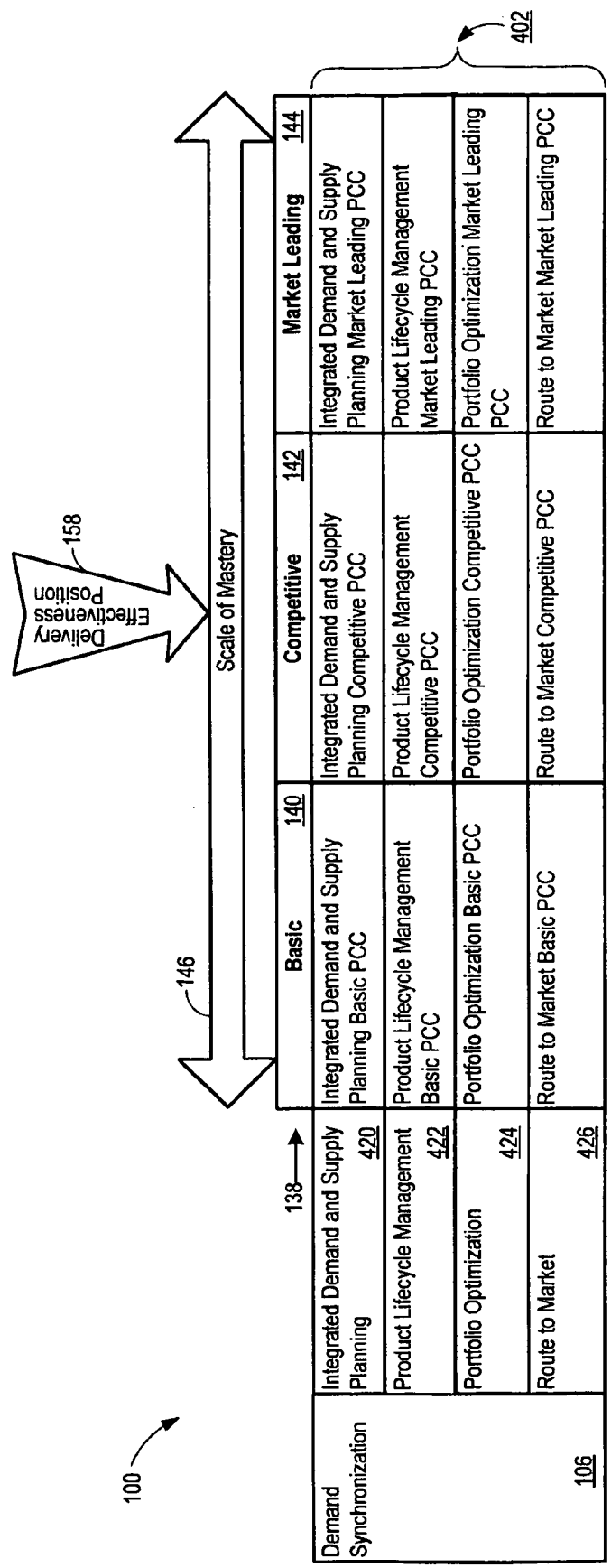
FIG. 4 shows a high performance capability assessment model with demand synchronization capabilities shown.

FIG. 4 shows the demand synchronization platform 106 divided into respective capability areas 402. The demand synchronization platform 106 includes an integrated demand and supply planning capability 420, a product lifecycle management capability 422, a portfolio optimization capability 424, and a route to market capability 426.

Figure 5:
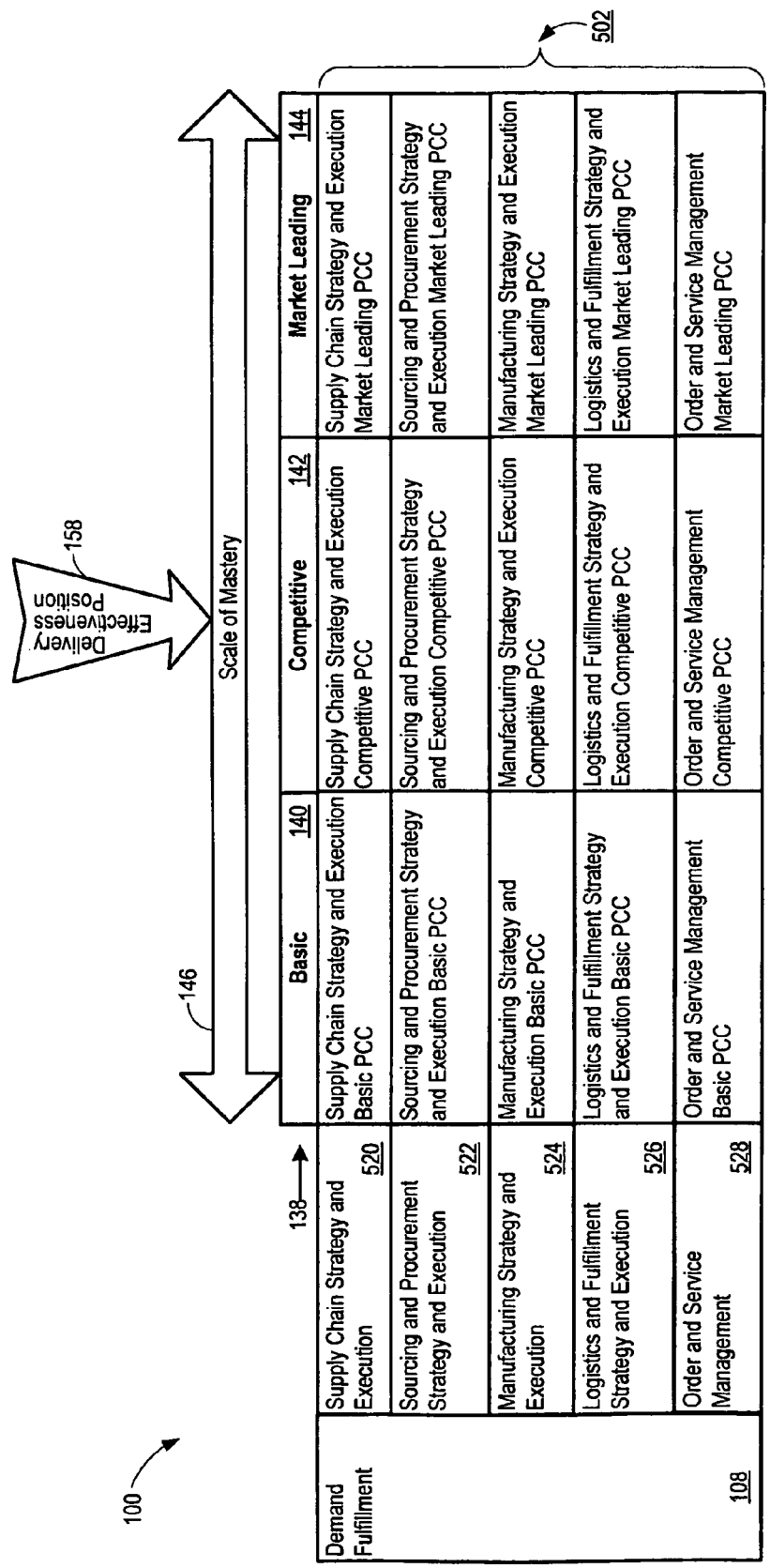
FIG. 5 shows a high performance capability assessment model with demand fulfillment capabilities shown.

FIG. 5 shows the demand fulfillment platform 108 divided into respective capability areas 502. The demand fulfillment platform 108 includes a supply chain strategy and execution capability 520, a sourcing and procurement strategy and execution capability 522, a manufacturing strategy and execution capability 524, a logistics and fulfillment strategy and execution capability 526, and an order and service management capability 528.

Figure 6:
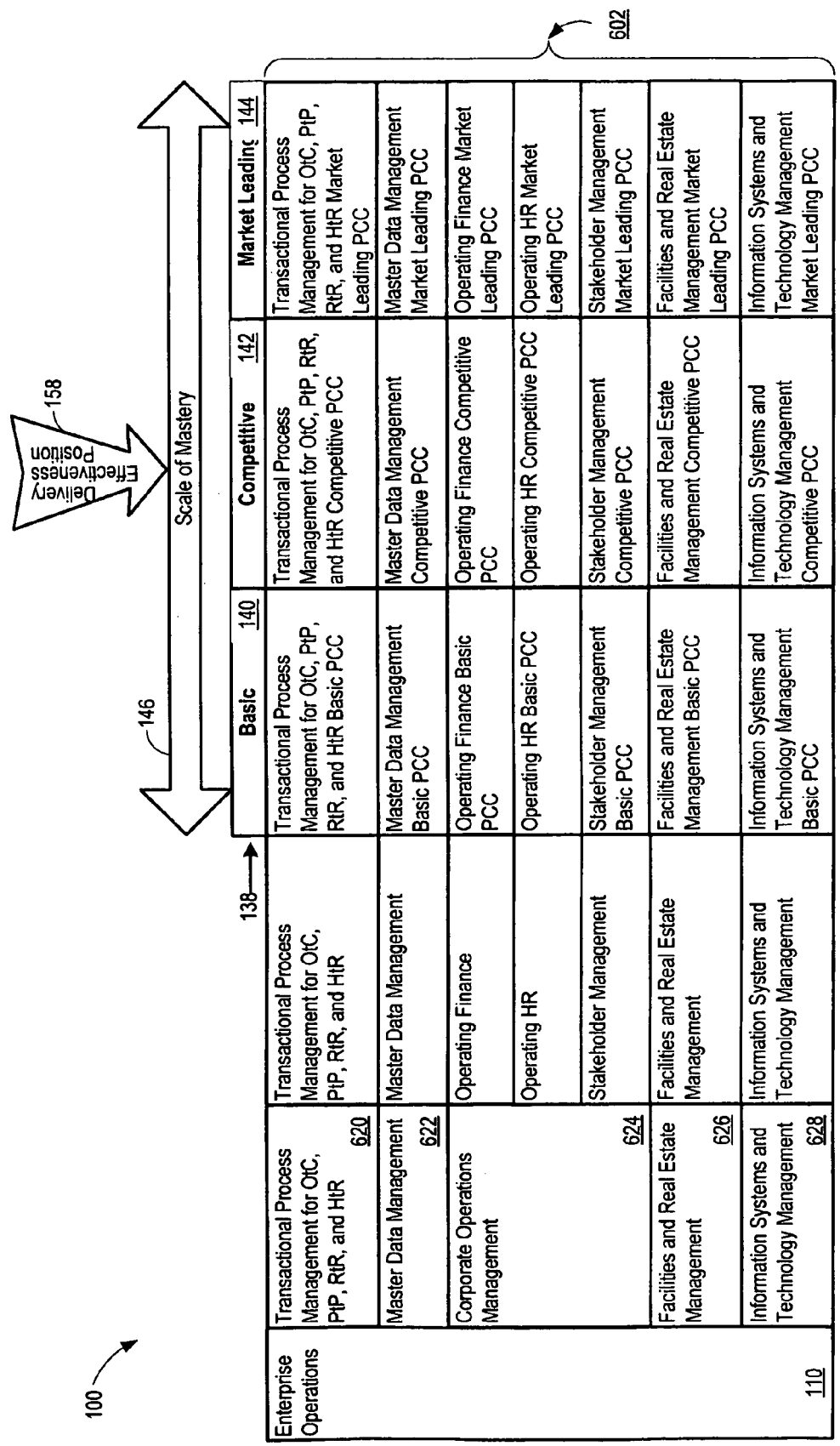
FIG. 6 shows a high performance capability assessment model with enterprise operations capabilities shown.

FIG. 6 shows the enterprise operations platform 110 divided into respective capability areas 602. The enterprise operations platform 110 includes a transactional process management for OtC, PtP, RtR, and HtR capability 620, a master data management capability 622, a corporate operations management capability 624, a facilities and real estate management capability 626, and an information systems and technology management capability 628.

Figure 7:
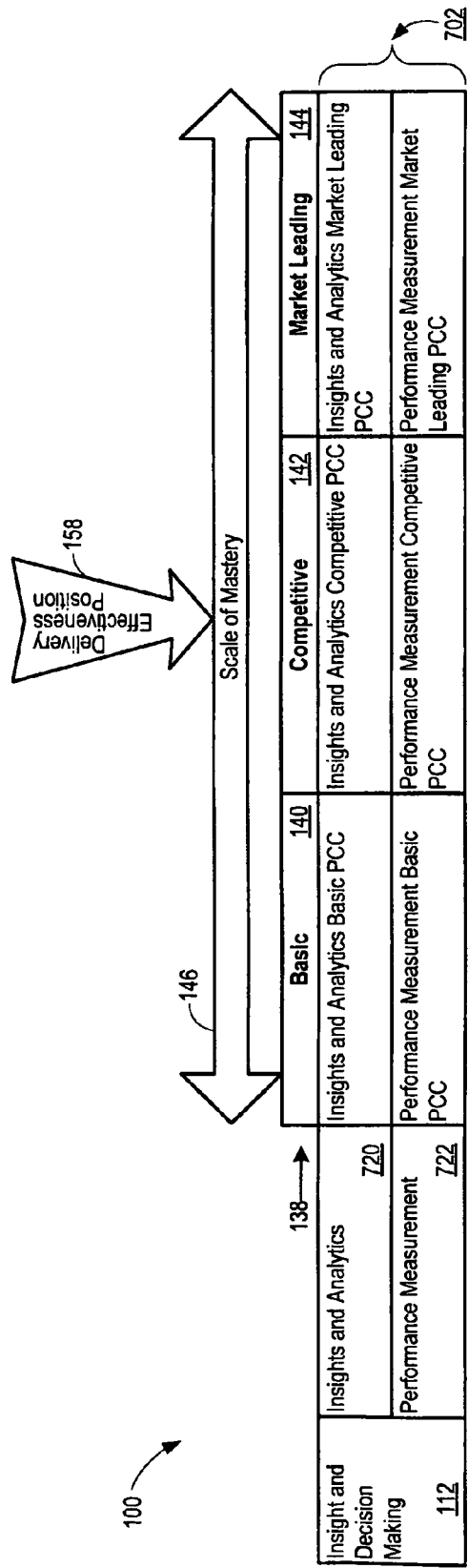
FIG. 7 shows a high performance capability assessment model with insight and decision making capabilities shown.

FIG. 7 shows the insight and decision making platform 112 divided into respective capability areas 702. The insight and decision making platform 112 includes an insights and analytics capability 720, and a performance measurement capability 722.

The tables provided in the appendix listing immediately following the abstract, which form part of this disclosure, provide an explanation of the capabilities and corresponding key assessment areas and performance criteria for each capability within the respective platforms. Each capability may include one or more key assessment areas. Each key assessment area may include one or more additional key assessment areas. In other words, a business capability may include sub-capabilities, and therefore, key assessment areas corresponding to the multiple sub-capabilities. The tables in the appendix show specific criteria used to analyze each capability.

Figure 8:
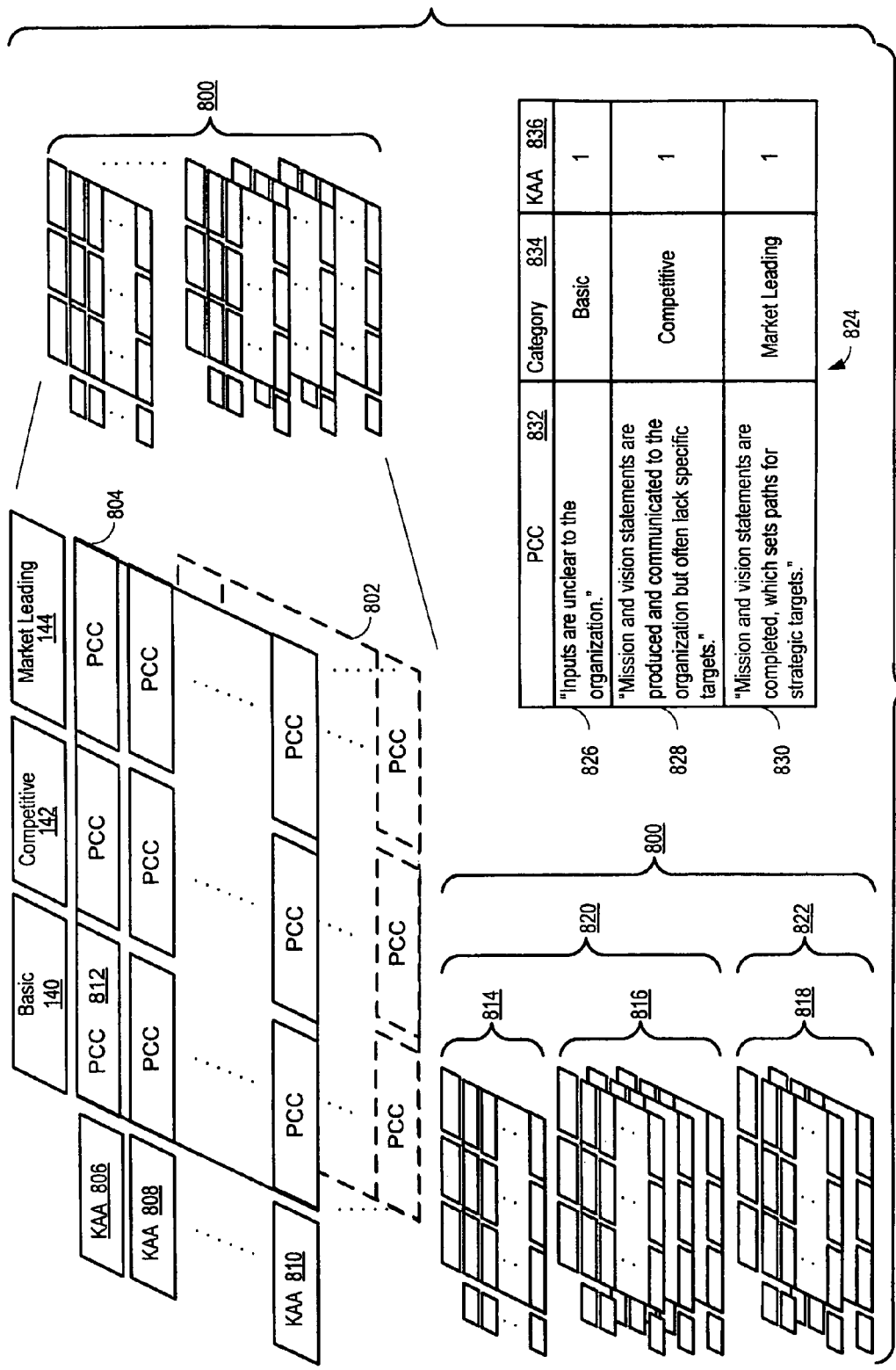
FIG. 8 shows a capability detail pool providing a multidimensional consumer goods and services industry performance reference set where multiple key assessment performance reference tables are collected and stored.

FIG. 8 shows a multidimensional consumer goods and services industry performance reference set 800 ("reference set 800") that provides a capability detail pool from which the system described below may obtain benchmarking tables for a consumer goods and services business. The reference set 800 includes multiple key assessment performance reference tables ("reference tables"), two of which are labeled 802 and 804. Each reference table may provide the benchmarking criteria for a specific capability, such as those noted above with respect to FIGS. 2-7.

One dimension of each table may establish the 'Basic' performance level 140 specifying 'Basic' performance assessment criteria, the 'Competitive' performance level 142 specifying 'Competitive' performance assessment criteria, and the 'Market Leading' performance level 144 specifying 'Market Leading' performance assessment criteria. Another dimension of each table may specify one or more key assessment areas (KAAs), several of which are labeled 806, 808, and 810. As noted above, performance criteria, e.g., the PCC 812, populates each key assessment performance reference table to provide benchmark criteria for 'Basic', 'Competitive', and 'Market Leading' characteristics.

The reference set 800 represents the HPCA model 100. Consistent with the HPCA model 100, the reference set 800 may organize multiple reference tables into a hierarchical structure defining discrete changes in granularity. In one implementation, the hierarchical structure includes reference tables, sub-platforms, platforms, and models. FIG. 8 labels three sub-platforms 814, 816, and 818. The reference set 800 may further organize the platforms into sub-platforms, two of which are labeled 820 and 822. Platforms aggregate into the HPCA model 100 and corresponding reference set 800. Additional, different, or fewer levels of granularity may be defined in the HPCA model 100.

The reference set 800 may dynamically populate the reference tables with the most up-to-date performance criteria, for example upon retrieval and presentation by a business analysis consultant. The performance criteria may be retrieved from a performance capability criteria database or other information source.

FIG. 8 also shows an example of a database implementation 824 of a portion of a reference table. In particular, the database implementation 824 includes records (e.g., the records 826, 828, 830) that establish each PCC 812. In the example shown, each record includes a PCC field 832, a category specifier field 834, and a KAA specifier field 836. Other fields may be provided, such as a reference table assignment field or reference set assignment field. The records categorize each PCC into a specific category (e.g., Basic), into a specific KAA, and, optionally, into a specific reference table in a specific reference set for any particular HPCA model.

Figure 9:
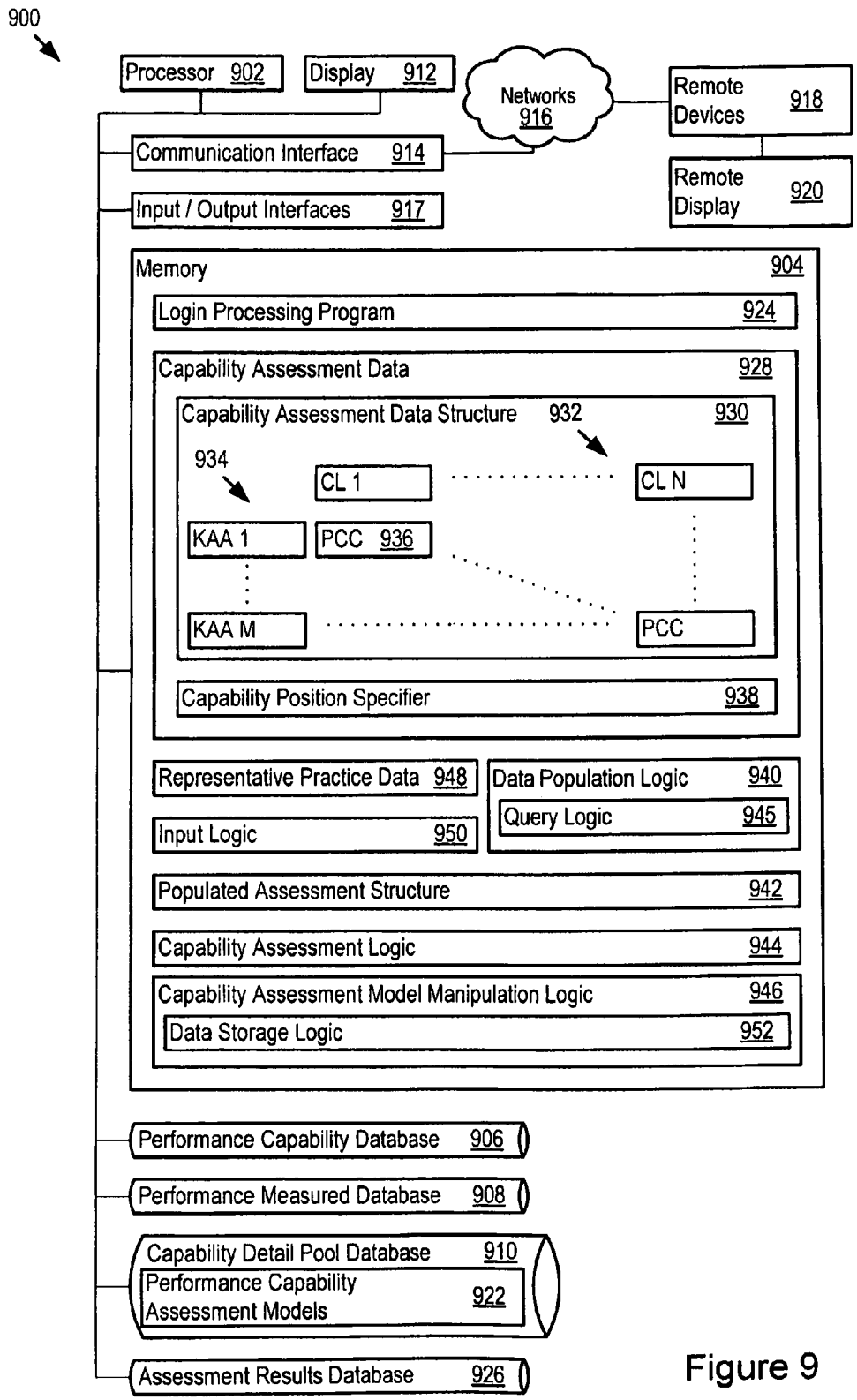
FIG. 9 shows a capability assessment system.

FIG. 9 shows a high-performance capability assessment system ("system") 900. The system 900 includes a processor 902 and a memory 904. Several databases support the operation of the system 900, including a performance capability database 906, a performance measured database 908, a capability detail pool database 910, and an assessment results database 926. The system 900 may include a local display 912 and input/output interfaces 917 (e.g., including a keyboard, mouse, microphone, speakers, or other device), and, through the communication interface 914 and networks 916, may communicate with remote devices 918 and remote displays 920. The networks 916 may be any combination of external networks (e.g., the Internet) and internal networks (e.g., corporate LANs). The displays 912 and 920 may, for example, present performance capability assessment models 922 that the system 900 retrieves from the capability detail pool database 910 for review, modification, and application by process engineers or other individuals. With regard to local access or access by the remote devices 918, the system 900 may include a login processing program 924 to authenticate and/or authorize access to the system 900. To that end, the login processing program 924 may include username/password verification, private/public key encryption, or other validation and data protection capabilities.

In one implementation, the performance capability database 906 stores performance criteria. As will be described in more detail below, the system 900 may populate performance capability assessment models with performance capability criteria suited to any particular platform (e.g., strategy and governance platform 102, demand generation platform 104, demand synchronization platform 106, etc.) and business capability at one or more capability levels across one or more key assessment areas. The performance measured database 908 may store the determined, measured, or otherwise ascertained characteristics, criteria, and other measured data of a particular key assessment area as representative practice data 948. The representative practice data 948 may be obtained through interviews with business consultants and industrial engineers, through online questionnaires, through manual or automated analysis of business data (e.g., year end operating reports), or in other manners.

The capability detail pool database 910 stores the capability detail pool 800, which includes pre-defined performance capability assessment models 922. The assessment results database 926 stores determined capability levels for specific capabilities that have been analyzed.

The system 900 facilitates the review, modification, creation, and application of performance capability assessment models. In that role, performance capability assessment model manipulation logic ("manipulation logic") 946 within the system 900 creates, retrieves, and stores capability assessment data 928 in the memory 904. The manipulation logic 946 may establish capability assessment data 928 in the memory 904, including a capability assessment data structure 930 with multiple capability levels ("CL") 932 organized along a scale of mastery dimension, multiple key assessment areas ("KAA") 934 organized along a key factor dimension, and performance criteria ("PCC") 936 that populates the performance capability assessment model 930. The manipulation logic 946 may vary widely in implementation, and, as one example, may include data storage logic 952 that saves data in memory and user interface logic that accepts capability level specifications, key assessment area specifications and performance capability criteria inputs to create new performance capability assessment models, modify existing performance capability assessment models, delete performance capability assessment models, or retrieve performance capability assessment models for review.

In one implementation, the manipulation logic 946 establishes the capability assessment data structure 930 to include a multidimensional consumer goods and services industry performance reference set that includes multiple key assessment performance reference tables in which the key assessment performance reference tables include a 'Basic' capability performance level, a 'Competitive' capability performance level, and a 'Market Leading' capability performance level.

The capability assessment data 928 may also include a capability position specifier 938. The capability position specifier 938 may record the capability level along the scale of mastery 146, as determined for any particular capability. Thus, the system 900 may store the performance level in the assessment results database 926 or elsewhere for future retrieval and review.

In one implementation, the data population logic 940 may be a data population program executed by the processor 902 that populates template performance capability assessment models. For example, the data population logic 940 may include input logic 950 that accepts input specifying a capability of interest that indicates a particular performance capability assessment model. The data population logic 940 may include query logic 945 that executes database queries and prompts a user for input to obtain the corresponding performance capability criteria for the capability of interest.

In another implementation, for example, the query logic 945 may receive an input specifying a consumer goods and services industry area and a consumer goods and services industry key assessment area with the consumer goods and services industry area for analysis. The query logic 945 searches the multidimensional consumer goods and services industry performance reference set for a matching key assessment performance reference table that matches the consumer goods and services industry area and the consumer goods and services industry key assessment area, and retrieves the matching key assessment performance reference table.

The data population logic 940 may further include storage logic that adds the retrieved performance capability criteria to the template performance capability assessment model. The data population logic 940 produces populated performance capability assessment structures 942 that may be stored in the capability detail pool database 910.

In addition to the analysis process described above, the system 900 may provide an automated analysis of representative practice data 948 that identifies relevant performance capability criteria and determines the position on the scale of mastery 146 of each key assessment area corresponding to the performance capability criteria for the representative practice data 948. As one example, the system 900 may implement capability assessment logic 944 that includes comparison and/or matching logic that analyzes the representative practice data 948 with respect to performance capability criteria to locate key assessment areas for which the system 900 can determine capability levels to obtain a resultant performance level for each key assessment area.

Furthermore, the capability assessment logic 944 may determine an overall position on the scale of mastery 146 as the capability position specifier 938, for a capability under examination given the knowledge of where the key assessment areas corresponding to the capability under examination fall in each capability level. Thus, for example, the capability assessment logic 944 may determine an overall capability level for a capability corresponding to the capability level for the majority of the key assessment areas, or it may apply a weighted analysis technique to give more emphasis to some key assessment areas than others in determining the overall position on the scale of mastery 146 for a capability. As another example, the capability assessment logic 944 may implement an expert system (e.g., based on a neural network trained on prior determinations) that analyzes the determined characteristics with respect to the performance capability criteria and ascertains where the capability under examination falls along the scale of mastery 146 for each of the key assessment areas, or overall on the scale of mastery.

Figure 10:
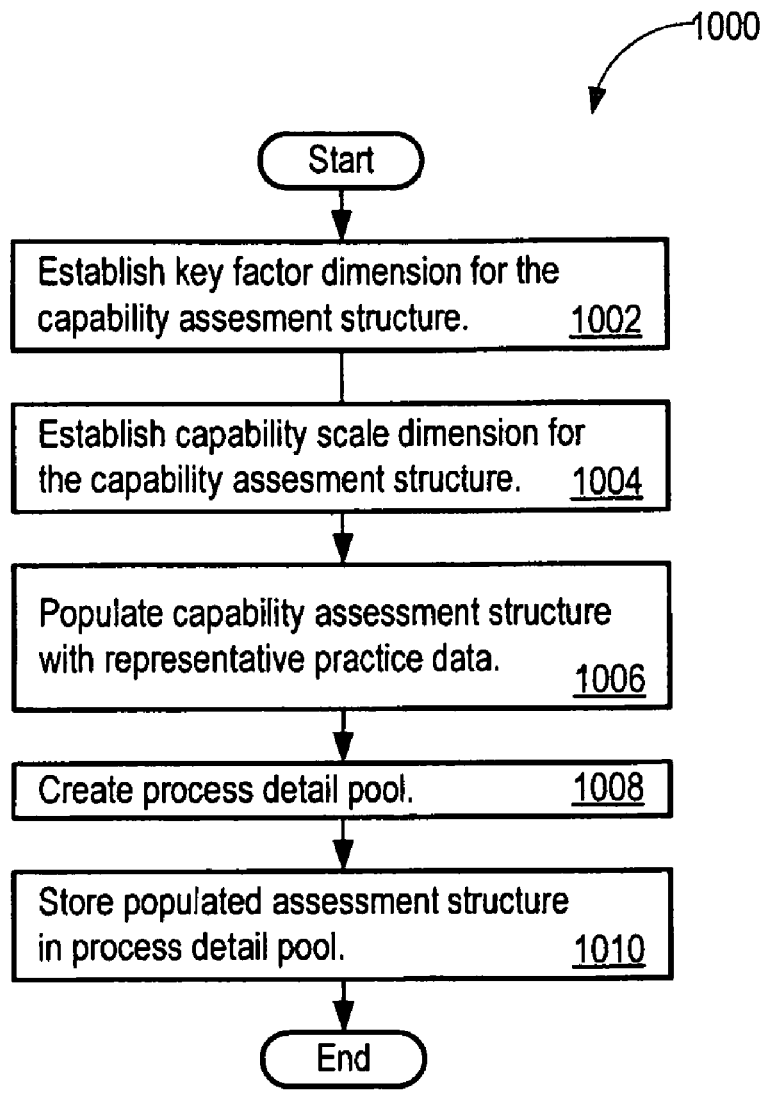
FIG. 10 shows a flow diagram for establishing high-performance capability assessment models.

FIG. 10 shows a flow diagram 1000 for creating performance capability assessment models. The performance capability assessment model creator (e.g., the manipulation logic 946) establishes a key factor dimension for the performance capability assessment model (1002). The performance capability assessment model creator also establishes a capability scale dimension for the performance capability assessment model (1004). The capability scale dimension may define a scale of increasing organizational capability. For example, the structure creator may create the 'Basic' level 140, the 'Competitive' level 142, and the 'Market Leading' level 144. The performance capability assessment model creator also populates the performance capability assessment model with capability performance criteria (1006). A capability detail pool 800 may be formed to hold multiple tailored key assessment performance reference tables (1008). The performance capability assessment model creator may store the populated assessment structure in the capability detail pool for subsequent retrieval and analysis (1010).

Figure 11:
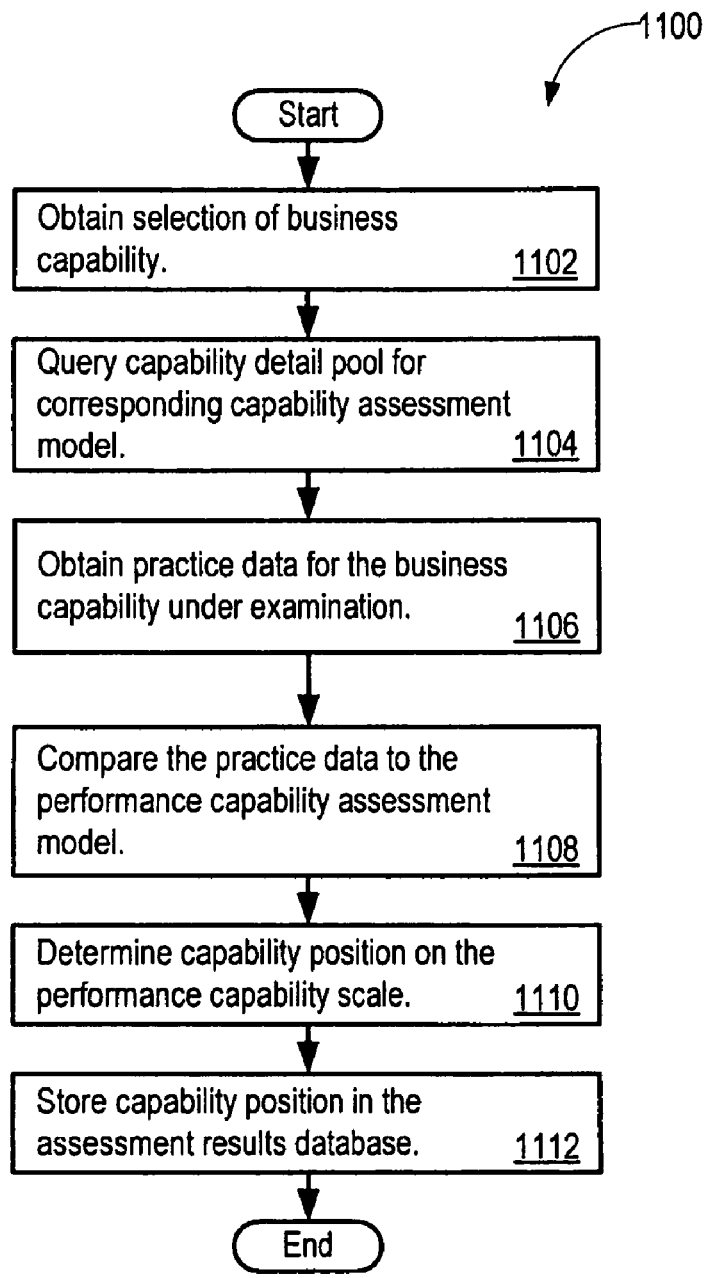
FIG. 11 shows a flow diagram for retrieving and applying high performance capability assessment models.

FIG. 11 shows a flow diagram 1100 for retrieving and applying performance capability assessment models. A selection of a capability to be analyzed is obtained (1102). In one implementation, the system 900 receives input data that specifies a consumer goods and services industry area and a consumer goods and services industry key assessment area for analysis. For example, the system 900 may accept input from a business consultant that specifies a capability for analysis. The system 900 may query the capability detail pool 800 for a corresponding performance capability assessment model (1104). The corresponding performance capability assessment model may be pre-defined in the capability detail pool 800, or the data population logic 940 (or other actor) may populate a performance capability assessment model template that the system 900 newly creates, or that the system 900 retrieves from a data store, such as the capability detail pool database 910.

In another example, the system 900 searches the multidimensional consumer goods and services industry performance reference set in the capability detail pool 800 for a matching key assessment performance reference table based on the input data that specifies a consumer goods and services industry platform and a consumer goods and services industry key assessment area. The system 900 retrieves the matching key assessment performance reference table and initiates analysis of the matching key assessment performance reference table to obtain a resultant performance level for the consumer goods and services industry key assessment area.

The system 900 obtains representative practice data 948 for the capability under examination in the specific business under review (1106). For example, a business consultant may interview the business to determine how the business currently executes the capability under review. As another example, a representative from the business may complete a questionnaire, submit business data for analysis and parameter extraction, or otherwise provide the characteristics of their current capability execution. As a further example, the system 900 may retrieve the representative practice data 948 from a database of previously obtained representative practice data.

The system 900 compares the representative practice data 948 to the performance criteria in the performance capability assessment model (1108). For example, a business consultant may use his or her expertise to arrive at a determination of level for the business and the capability under examination (1110). Alternatively or additionally, the capability assessment logic 944 may perform an automated analysis of the assessment results data in the assessment results database 926 and ascertain the performance level on the scale of mastery 146. The system 900 may store the assessment results, including the determined performance level, for future reference in the assessment results database 926 or other location (1112).

Figure 12:
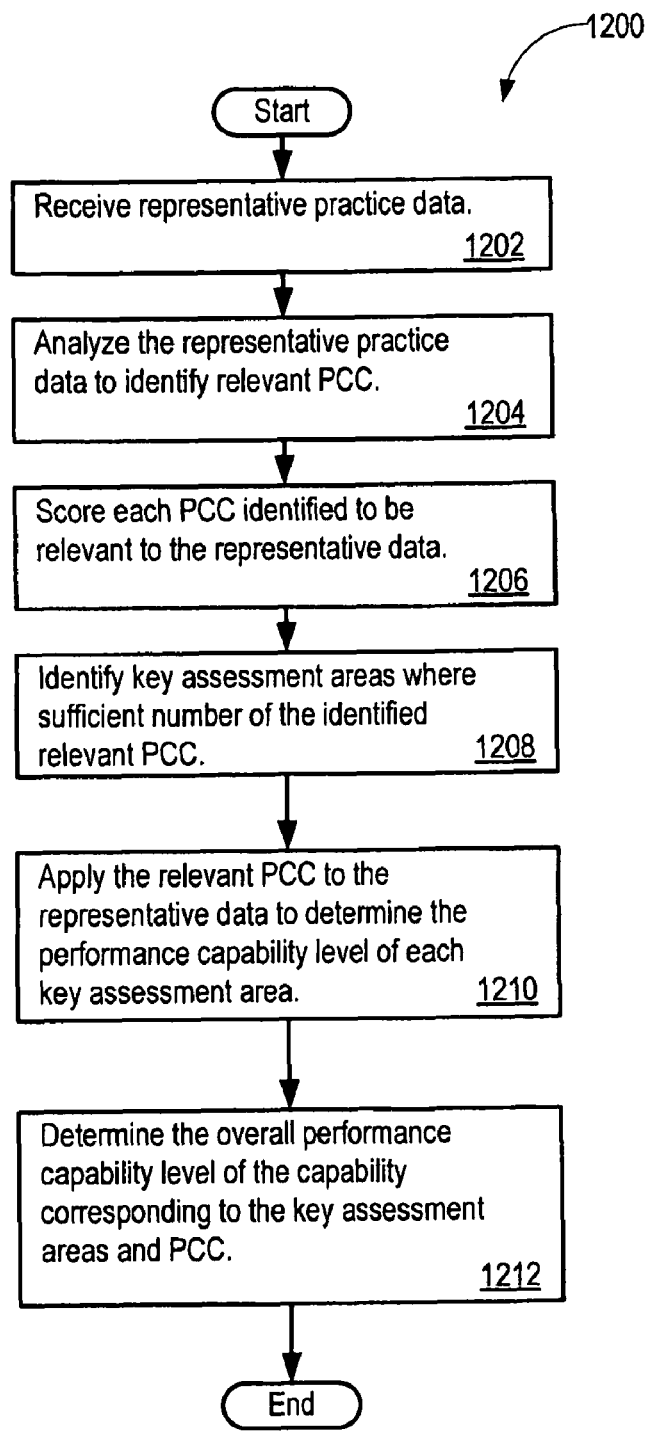
FIG. 12 shows a flow diagram for analyzing representative practice data to determine a consumer goods and services industry and a consumer goods and services key assessment area to which the representative practice data applies.

FIG. 12 shows a flow diagram 1200 for analyzing representative practice data 948 to determine a consumer goods and services industry and a consumer goods and services key assessment area to which the representative practice data applies. The system 900 receives representative practice data 948 as input data (1202). The system 900 may receive the representative practice data 948 from a database query performed by the query logic 945 that the query logic executes periodically, when instructed by an operator, and/or automatically against any number of available database sources that store representative practice data 948. The capability assessment logic 944 analyzes the representative practice data 948 to identify performance capability criteria in the capability detail pool 800 that the capability assessment logic 944 determines relevant to the representative practice data 948 (1204). For example, the capability assessment logic 944 may compare and/or match the content of the representative practice data 948 with the performance capability criteria using natural language processing (NLP), text string and/or substring matching, by comparing tags linked to the representative practice data 948 and that specify that any portion of the representative practice data 948 is applicable to a specific PCC, by querying for a manual classification of the representative practice data 948 to a PCC, or other matching technique. The capability assessment logic 944 may score and/or weight a performance capability criteria and compare the score and/or weight to a user specified relevance threshold to rank the relevance of the performance capability criteria to the representative practice data 948 (1206). The user may specify particular terms and/or phrases to search and match between the performance capability criteria and the representative practice data 948, in order to score the performance capability criteria.

The capability assessment logic 944 may determine, based on the number of performance capability criteria that meet or exceed the relevance threshold, that the capability assessment logic 944 has identified a sufficient number of performance capability criteria for a specific key assessment area in order to determine a performance level for the capability as a whole or any key assessment area within the capability (1208). As one example, where at least 51% of the performance capability criteria for a particular key assessment area meet or exceed the relevance threshold, the capability assessment logic 944 applies the performance capability criteria to the representative practice data 948. In another example, the performance capability criteria for a particular key assessment area may be ranked in importance and/or designated as mandatory in order to assess the key assessment area. In the event the capability assessment logic 944 identifies the mandatory performance capability criteria for a key assessment area, the capability assessment logic 944 applies the performance capability criteria to the representative practice data 948.

The capability assessment logic 944 may apply the performance capability criteria meeting or exceeding the relevance threshold to the representative practice data 948 to determine whether any particular PCC is met. Accordingly, as the capability assessment logic 944 analyzes the PCC, the system 900 tracks the best fit of the representative practice data 948 to the PCCs in the key assessment performance reference tables. In other words, the system 900 determines how the representative practice data 948 meets (or does not meet) each PCC, thereby gaining insight into whether the representative practice data 948 is indicative of Basic, Competitive, or Market Leading practices.

The system 900 may also gauge the position on the scale of mastery 146 of each key assessment area corresponding to the performance capability criteria (1210). The capability assessment logic 944 may further determine an overall position on the scale of mastery 146 for a capability (1212). The capability assessment logic 944 may establish that a desired number and/or designated mandatory performance capability criteria for the key assessment areas have been identified as relevant to a capability and sufficient to determine the position on the scale of mastery 146 for the capability. For example, the capability assessment logic 944 may determine an overall performance level for the capability based on the performance level determined for the majority of the key assessment areas. The capability assessment logic 944 may apply a weighted analysis technique to give more emphasis to some key assessment areas than others in determining the overall position on the scale of mastery 146 for the capability. Although selected aspects, features, or components of the implementations are depicted as being stored in computer-readable memories (e.g., as computer-executable instructions or performance capability assessment models), all or part of the systems and structures may be stored on, distributed across, or read from other computer-readable media. The computer-readable media may include, for example, secondary storage devices such as hard disks, floppy disks, and CD-ROMs; a signal, such as a signal received from a network or received at an antenna; or other forms of memory, including ROM or RAM, either currently known or later developed.

Various implementations of the system 900 may include additional or different components. A processor may be implemented as a microprocessor, a microcontroller, a DSP, an application specific integrated circuit (ASIC), discrete logic, or a combination of other types of circuits or logic. Similarly, memories may be DRAM, SRAM, Flash or any other type of memory. The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be combined or split among multiple programs, or distributed across several memories and processors.

The HPCA 100 model provides unexpectedly good results for a performance capability assessment model, particularly in the consumer goods and services industry. In particular, the combinations of key assessment areas and particular assessment criteria of the HPCA model, including the criteria noted in the Appendix of Tables, provide significant advantages over other assessment models. The unexpectedly good results include clearly identifying and delineating from among multiple related complex processes the specific processes to improve, how to improve said process, and identifying concrete and measurable improvement goals.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

APPENDIX OF TABLES

|  | Basic | Competitive | Market Leading |
|---|---|---|---|
| STRATEGY AND GOVERNANCE Capability Area - Strategy and Governance Company Mission, Values and Governance | | | |
| Process Participation Who participates in the process execution/approval | Little to no executive participation exists beyond the CEO. The board of directors or equity partners may set or heavily influence the mission, values and governance of the organization. | The C-level (CIO, CFO, CEO, etc.)/executive team participates collaboratively in determining the mission, values and governance. The board of directors or equity partners review and approve if necessary. | The C-level (CIO, CFO, CEO, etc.)/executive team determines the mission, values and governance with managed input from non-executive influences such as employees, customers and suppliers. |
| Process Creation How the process gets executed Points that serve as differentiators in process capability and sophistication across the scale | The process of elaborating the mission, the values and governance principles is not defined or loosely defined. It is largely developed in isolation and dictated to leadership, with inconsistent communication to the organization. | A process for mission and vision setting is followed, but may vary from year to year and is inconsistently applied or executed. Defining the values and governance responsibilities allows input from top management. | A clear and consistent mission and vision development process is documented and followed for both annual and long-range plans. Strong values set the standards used to create the process. The exercise of sifting and packaging behaviors is the method used. The mission and vision statements are reviewed against corporate goals, business scope and plan, operating model, growth intent, and major change programs. |

-continued

|  | Basic | Competitive | Market Leading |
|---|---|---|---|
| Process Frequency<br>Number of times and frequency at which a process is executed<br>Number of iterations required before process is complete | No iterations, no set timeframe, but generally an annual restatement or reiteration of the mission and vision occur here. Goals and objectives are fixed throughout the year with quarterly checkpoints for budgetary and financial purposes, but with no reviewing at this point. | Iterations are done during development.<br>Process is done annually or in defined periods (3 yr increments with annual refreshes).<br>Apart from budget and other financial purposes, goals and objectives are revised semi-annually. | Long range and annual planning is conducted and a revision/refresh/performance schedule is developed as part of the planning cycle. |
| Process Inputs<br>Data, intentions, objectives, materials, information, events, outputs from other processes, etc. | Inputs are unclear to the organization, where often there is a general reliance on past performance factors and historical reports. | Process inputs include C-level (CIO, CFO, CEO)/executive team direct input, historical and forward looking business performance indicators, and limited market relevant trend inputs. | Process inputs include everything in the competitive category, including solicited input from the organization and external parties. |
| Process Outputs<br>Decisions, status, events, actions, information, materials, finished product, etc., resulting from the process | Outputs are often unclear, with strategic intent and strategic motivators not well defined or communicated.<br>Output is generally focused on sales lift and cost reduction messages.<br>The mission and vision are much like published cases, not linking to ambitions or timeframes. | The mission and vision statements are produced and communicated to the organization, but often lack specific targets and methods for strategy achievement. | The mission and vision statements are completed, which sets the path for strategic targets and which determines the methods that are expected to be deployed.<br>These findings are communicated to stakeholders. |
| Process Automation<br>Level of automation or tools used to shape, enable or execute the process | Little to no automation is used, although presentation software such as PowerPoint, Excel spreadsheets, and email are used. | The process defines the standard inputs and formats for setting mission and vision, as well as the goals and objectives materials. A system is used to generate reports and conduct data or the comparative analysis used in strategy development. | Automated reports and data analysis tools are used in developing goals and objectives, and alongside syndicated or subscribed data services for market and industry insights. Common templates are used to capture and communicate strategy inputs and outputs. |
| Process Integration<br>Level of integration the process has with other processes, systems, tools or third parties | Integration points are generally email or meeting driven, between CEO and Board of directors or equity partners. | The process is integrated into the periodic planning calendar, but generally, no automated or other process integration is intentional beyond perhaps an annual budgeting cycle. | This mission and vision development and goals and objectives setting are integrated into the long range and annual planning calendars to coincide with fiscal year budgeting, and refreshes or updates are done to coincide with major shareholder meetings or analyst communications. |
| Capability Area - Strategy and Governance<br>Corporate Objectives | | | |
| Process Participation<br>Who participates in the process execution/approval | There is little to no executive participation beyond the CEO. The board of directors or equity partners may set or heavily influence the strategy. | There is C-level (CIO, CFO, CEO)/executive team participation and the strategy is determined collaboratively. The board of directors or equity partners review and approve this if necessary. | The C-level (CIO, CFO, CEO)/ executive team determines the strategy with managed input from non-executive influences such as employees, customers, and suppliers. |
| Process Creation<br>How the process gets executed<br>Points that serve as differentiators in process capability and sophistication across the scale | The strategy process is either undefined or is defined loosely. It is largely developed in isolation and dictated to leadership, with inconsistent communication to the organization.<br>The annual plan is emphasized with minimal long range planning detail. | A process for strategy development is followed, but may vary from year to year and is inconsistently applied or executed.<br>The annual plan is emphasized and the long-range plan is created every 3 or 5 years. | A clear and consistent strategy development process is documented and followed for both annual and long-range plans. The strategic process includes a refresh of the corporate goals, business scope and plan, operating model, growth intent, and major change programs. |
| Process Frequency<br>Number of times and frequency at which a process is executed<br>Number of iterations required before process is complete | There are no iterations, nor a set timeframe, but there is generally an annual restatement or reiteration of the strategy. | Iterations are done during the development phase.<br>The process is done annually or in defined periods (3 yr increments with annual refreshes). | Both long range and annual planning are conducted.<br>A revision/refresh/performance schedule is developed as part of the planning cycle. |
| Process Inputs<br>Data, intentions, objectives, materials, information, events, outputs from other processes, etc. | Inputs are unclear to the organization, where often there is a general reliance on past performance factors and historical reports. | Process inputs include C-level (CIO, CFO, CEO)/executive team direct input, historical and forward looking business performance indicators, and limited market relevant trend inputs. | Process inputs include the Competitive scale of mastery, plus a solicited input from the organization and external parties. |

-continued

|  | Basic | Competitive | Market Leading |
| --- | --- | --- | --- |
| Process Outputs<br>Decisions, status, events, actions, information, materials, finished product, etc., resulting from the process | Outputs are often unclear, with strategic intent and strategic motivators not well defined or communicated.<br>Output is generally focused on sales lift and cost reduction messages | A strategy document is produced and communicated to the organization, but often lacks specific targets and methods for strategy achievement. | A strategy document is completed with strategic targets and expected methods to be deployed. This information is communicated to stakeholders. |
| Process Automation<br>Level of automation or tools used to shape, enable or execute the process | Little to no automation is used. Process automation may involve presentation software such as PowerPoint, Excel spreadsheets, and email. | The process defines inputs of standards and formats for strategy material.<br>The system is used to generate reports and conduct data or comparative analysis used in strategy development. | Automated reports and data analysis tools are used in strategy development, along with syndicated or subscribed data services for market and industry insights.<br>Common templates are used to capture and communicate strategy inputs and outputs. |
| Process Integration<br>Level of integration the process has with other processes, systems, tools or third parties | Integration points are generally email or meeting driven, between CEO and board of directors or equity partners. | The process is integrated into the periodic planning calendar. Generally no automated or other process integration is intentional, beyond perhaps an annual budgeting cycle. | This strategy development is integrated into the long range and annual planning calendars to coincide with fiscal year budgeting. Refreshes or updates are done to coincide with major shareholder meetings or analyst communications. |

Capability Area - Strategy and Governance
Corporate Strategy

| Process Participation<br>Who participates in the process execution/approval | There is little to no executive participation beyond the C-suite (CIO, CFO, CEO).<br>The board of directors or equity partners may set or heavily influence objectives, sources of businesses, and capability development alternatives. | There is C-level (CIO, CFO, CEO)/executive team participation. Objectives, sources of businesses and capability development needs and alternatives are determined collaboratively.<br>The board of directors or equity partner review and approve if necessary. | The C-level (CIO, CFO, CEO)/ executive team determine objectives, prospect sources of businesses and capability development alternatives with managed input from non-executive influences such bankers, consultants, and suppliers. |
| --- | --- | --- | --- |
| Process Creation<br>How the process gets executed Points that serve as differentiators in process capability and sophistication across the scale | The process of determining objectives, identifying sources of business, and developing capabilities is not defined or is loosely defined. The process is largely developed in isolation and dictated to leadership, with inconsistent communication to the organization. | A process for defining objectives, identifying sources of business, and developing capabilities is followed, but may vary from period to period and is inconsistently applied or executed. | A clear and consistent process of defining objectives, identifying sources of business, and developing capabilities is documented and followed for both annual and long range plans. The objectives and opportunities are reviewed against corporate goals and aspirations. |
| Process Frequency<br>Number of times and frequency at which a process is executed Number of iterations required before process is complete | No iterations, no set timeframe. Emerging opportunities are treated in an episodic fashion. | Objectives and sources of business are reviewed, establishing the baseline for further investigation. Iterations with corporate goals and aspirations occur, but not necessarily changing either of them. | Both long range and annual objectives are conducted. Sources of business are examined quarterly, following a documented and disciplined examination of future opportunities.<br>Capability development follows the same path and iterations are done with key function owners. |
| Process Inputs<br>Data, intentions, objectives, materials, information, events, outputs from other processes etc | Inputs are unclear to the organization, where often there is a general reliance on published and unchecked information.<br>Internal information is sometimes incomplete. | Process inputs include C-level (CIO, CFO, CEO)/executive team direct input, historical and forward looking business performance indicators, and limited market relevant trend inputs. | Process inputs include everything in the progressive category, including solicited input from the organization and external parties. |
| Process Outputs<br>Decisions, status, events, actions, information, materials, finished product, etc., resulting from the process | Outputs are often unclear or not communicated to the organization. | Outputs are clear and linked to the company's goals and aspirations. The sources of business documented but not thoroughly.<br>The capabilities are not linked to performance enhancement but to ability and knowledge building. | Outputs are clear and linked to the company's goals and aspirations.<br>The sources of business are thoroughly and thoughtfully documented.<br>The capabilities are linked to performance enhancement. |
| Process Automation<br>Level of automation or tools used to shape, enable or execute the process | Little to no automation is used. May involve presentation software such as PowerPoint, Excel spreadsheets, and email. | The process defines standard inputs and formats for objectives, sources of business, capabilities and development materials. | The process is documented in shared knowledge environments using custom formats created from standard information. |
| Process Integration<br>Level of integration the process | Integration points are generally email or meeting driven and | The process is integrated into the periodic planning calendar, but | The process is integrated into the periodic planning calendar |

-continued

|  | Basic | Competitive | Market Leading |
|---|---|---|---|
| has with other processes, systems, tools or third parties | occur between CEO and board of directors or equity partners. | is generally not automated. | intentionally, with supporting information fed into the knowledge base. |

Capability Area - Strategy and Governance
Portfolio Planning

|  | Basic | Competitive | Market Leading |
|---|---|---|---|
| Process Participation<br>Who participates in the process execution/approval | CFO and commercial directors | C-Level/Executive team collaboration facilitated by business development VP and/or chief financial officer | Business development executive team; often consisting of business development VP, CFO, general counsel, commercial and supply chain leadership with collaboration across C-Level/Executive team and category leads |
| Process Creation<br>How the process gets executed Points that serve as differentiators in process capability and sophistication across the scale | Portfolio strategy is limited in development, focusing mostly on acquiring some evident individual businesses to complement wide business portfolio. | Portfolio strategy is developed with some level of role definition by business unit. Basic business screening is used to identify prospects, but little sophistication is used to allocate resources.<br>Multi-year view and emerging businesses usually not included. | Portfolio strategy leverages fact based analytics, defines business unit roles clearly, specifies that target financial goals and resource allocation is commensurate with targeted goals.<br>Portfolio strategy includes a multiyear view and addresses emerging businesses. |
| Process Frequency<br>Number of times and frequency at which a process is executed Number of iterations required before process is complete | Portfolio planning is done annually.<br>There is no understanding of overall portfolio sensitivity across business and major categories. | Portfolio planning is performed annually, with a mid-year checkpoint for revision. | Portfolio planning is done annually with quarterly refreshes or adjustments based on current performance, forecast, competitor actions, and market trend data, but with a multi-year view for emerging businesses. |
| Process Inputs<br>Data, intentions, objectives, materials, information, events, outputs from other processes, etc. | Process inputs include corporate strategy components and overall financial targets, current leading/key products and historical performance. | Process inputs include corporate strategy components, overall financial targets and historical performance, current business portfolio strategic strength (market share, profitability, position in business portfolio matrix, growth prospects), customer insights, and new category/product introduction. | Process inputs include corporate strategy components, overall financial targets and historical performance, current business portfolio strategic strength (market share, profitability, position in business portfolio matrix, growth prospects), customer insights, competitor analytics, resource capacity and constraints, supplier intelligence and new category/product introduction. |
| Process Outputs<br>Decisions, status, events, actions, information, materials, finished product, etc., resulting from the process | Outputs include business portfolio matrix and key prioritized businesses prospects. | Outputs include portfolio planning with key businesses financial targets, business unit roles and strategic intent by group of categories as well as a prioritized list of prospects. | Outputs include portfolio planning with key business units, strategic intent for each of the business units in the portfolio, financial targets, and major targets, along with multi-year view and emerging business opportunities. |
| Process Automation<br>Level of automation or tools used to shape, enable or execute the process | No automation is used in the process other than presentation software and system reports | Some automation, along with system reports and presentation software, is used to perform basic analytics, | Automation is used to perform business performance modeling and simulation, comparative data and trend analysis, forecasting and financial analysis. |
| Process Integration<br>Level of integration the process has with other processes; systems, tools or third parties | Little to no integration other than strategic planning | Portfolio planning is integrated into integrated strategic planning process such as; input to mergers and acquisitions planning, category plan management and key product planning, but integration with analytics and operational practices is limited or not emphasized. | Portfolio planning is integrated with other strategy development and is data driven with analytics. It includes other functional areas such as business development, supply chain, commercial etc. to optimize business unit roles and target performance.<br>Integrated strategic planning and mergers and acquisitions planning are closely linked to execute and optimize the portfolio strategy. |

Capability Area - Strategy and Governance
Integrated Strategic Planning

|  | Basic | Competitive | Market Leading |
|---|---|---|---|
| Process Participation<br>Who participates in the process execution/approval | The finance team which is led by the CFO, and revised and approved by the CEO/board of directors/equity partners | Finance team<br>Business development<br>Business Intelligence with fundamental input from functional areas (Commercial, Supply Chain, Manufacturing), which are reviewed by CFO/ | The strategic planning team (not an ad-hoc project based formed team) with inputs from the functional areas, reviewed and approved by the CEO/board of directors/equity partners participate in integrated strategic |

|  | Basic | Competitive | Market Leading |
|---|---|---|---|
| Process Creation<br>How the process gets executed<br>Points that serve as differentiators in process capability and sophistication across the scale | Strategic planning is essentially a long-term forecasting exercise, with a focus on incremental changes. | CEO/board of directors/equity partners participate in integrated strategic planning<br>The focus is on longer term and/or structural changes, but only loosely linked to shareholder value. | planning<br>The strategic plan focuses on the financial, operational and structural changes needed to achieve shareholder value objectives. |
| Process Frequency<br>Number of times and frequency at which a process is executed<br>Number of iterations required before process is complete | No iterations<br>No set timeframe | Strategic planning goals are reviewed quarterly or semi-annually, establishing the baseline for further investigation. | Strategic planning is the basis for long term investigation and goals measurement.<br>Deviations from the strategic plan are measured, reported to and evaluated by CFO/CEO/board of directors/equity partners. |
| Process Inputs<br>Data, intentions, objectives, materials, information, events, outputs from other processes, etc. | Process inputs are P&L performance measures with key strategic goals and objectives. | Process inputs include C-Level/Executive team direct input, historical and forward looking business performance indicators and limited market relevant trend inputs. | Process inputs include C-Level/Executive team direct input, historical and forward looking business performance indicators and limited market relevant trend inputs.<br>Strong emphasis is placed on competitor performance, recent developments and market trends. |
| Process Outputs<br>Decisions, status, events, actions, information, materials, finished product, etc., resulting from the process | Process outputs include many P&L-focused performance measures; neither well-defined nor consistent across the organization. | Driver based measures are used in addition to traditional P&L measures; but may not be prioritized or used consistently. | Process inputs include consistent, prioritized and clearly-defined key result measures of successful execution of strategy, with direct linkage to total return to shareholders. |
| Process Automation<br>Level of automation or tools used to shape, enable or execute the process | Little to no automation is used. It may involve presentation software such as PowerPoint, Excel spreadsheets and email. | The process defines standard inputs and formats for objectives, sources of business and capabilities development materials. | The process is documented in shared knowledge environments in custom formats created from needed standard information. |
| Process Integration<br>Level of integration the process has with other processes, systems, tools or third parties | Strategic plan stands alone | Process integration includes partial linkage to targets and budgets.<br>Changes to strategy do not always result in changes to targets and budgets. | Strategic planning is explicitly linked to targeting and resource allocation. |

Capability Area - Strategy and Governance
Sales and Operations Planning

|  | Basic | Competitive | Market Leading |
|---|---|---|---|
| Process Participation<br>Who participates in the process execution/approval | Limited involvement of functional areas other than SC is involved in sales and operations planning.<br>There is no integrated planning capability per se to integrate into the organization. | Consumer analysis, market analysis, competitor analysis and base lining completed with supply chain organization using comparative, internal benchmarks all play roles in sales and operations planning. | Participation includes integrated planning embedded into organizational operating processes to the extent that it is part of business as usual.<br>Involvement of key functional areas include: sales/marketing - market trends and channels perspectives/customer service - customer demands/financial - cost auditing/IT - high level technical architecture/industrial and logistics leaders of the analysis. |
| Process Creation<br>How the process gets executed<br>Points that serve as differentiators in process capability and sophistication across the scale | The process is created through ad-hoc meetings between key impacted functions held in a reactive or fire fighting mode.<br>All analysis is conducted manually using spreadsheet based tools; no what-if analysis capability is included. | Proactive formal meetings are held between core functional teams.<br>Scenario and what-if analysis capabilities are used and are based mainly on cost and gross sales drivers. | Proactive formal meetings are held between all functional teams across the extended supply chain.<br>Scenario, what-if and optimization analysis capabilities are used based on profits and similar drivers. |
| Process Frequency<br>Number of times and frequency at which a process is executed<br>Number of iterations required before process is complete | This process is done quarterly with few iterations.<br>It involves reconciling past with present needs. | Annual plans with quarterly revisions and monthly reviews are used. | Annual planning with quarterly revisions and monthly reviews focus on what-if scenarios and optimization analyses. |
| Process Inputs<br>Data, intentions, objectives, materials, information, events, outputs from other processes, etc. | Multiple operating plans are used to drive business activities and actions. | Process inputs include a single number plan agreed to drive business activities - however some functions still use additional plans. | All business activities are driven off the integrated planning single number - with no other plans developed or tracked. |
| Process Outputs<br>Decisions, status, events, actions, information, materials, finished product, etc., resulting | Process outputs include plans for sales (volumes, by channel, brand, and category) and for supply chain management | Process outputs include integrated sales and operations plans, medium to longer term needs for capacity increases and | Process outputs include fully integrated sales and operations plans, long term needs for capacity increases, |

-continued

|  | Basic | Competitive | Market Leading |
|---|---|---|---|
| from the process | (demand, inventory levels, supply coverage), basic make/buy decisions for key products for the short term. | recommendations for "renting" external capacity (warehouse, transportation, production). | recommendations for "renting" external capacity (warehouse, transportation, production) and financial impacts on trade-offs. |
| Process Automation Level of automation or tools used to shape, enable or execute the process | Data is maintained and reported using desktop based tools such as MS Excel and ad hoc MS Access applications. | Data is maintained and sourced from ERP applications and reported using a mix of desktop tools and ERP reporting tools. | Data is maintained and sourced from ERP applications and reported using a web enabled integrated planning workbench. |
| Process Integration Level of integration the process has with other processes, systems, tools or third parties | There is no integrated planning capability per say to integrate into the organization. | Integrated planning is seen as an essential addition to business as usual. | Integrated planning is embedded into organizational operating processes to the extent that it is part of business as usual. |
|  | Capability Area - Strategy and Governance Operations Model and Organization Planning | | |
| Process Participation Who participates in the process execution/approval | Little to no executive participation is involved beyond the CEO and key VPs (VP for Human Resources, VP for Supply Chain, VP for Commercial). The board of directors or equity partners may set or heavily influence the organization. | C-Level/Executive team participation - organization is determined collaboratively. The board of directors or equity partner review and approve if necessary. | C-Level/Executive Team participation - organization and people strategy is determined collaboratively. Other key executives may participate in specific details of people strategy. The board of directors or equity partner review and approve if necessary. Source talent from the worldwide talent pool, and in developing the right operating models to leverage this talent most effectively. |
| Process Creation How the process gets executed Points that serve as differentiators in process capability and sophistication across the scale | The process of designing and communicating the organization strategy is not defined or loosely defined. Most of the time the organization strategy development process accommodates current people and traditional names/organization designs. | A process for developing and designing the organization strategy is followed, but may vary from year to year and is inconsistently applied or executed. | A clear and consistent organization and people strategy development process is documented and followed for both annual and long range plans. The organization and people strategy development process includes a refresh of the organizational corporate goals, people development scope and plan, operating model, growth intent, and major change programs. |
| Process Frequency Number of times and frequency at which a process is executed Number of iterations required before process is complete | No iterations or set timeframe exists, but generally an annual version of an adapted organization to reflect business units' changes. People strategy programs, objectives, and scope are followed throughout the year. | Iterations are done during organization and people strategy development. The process is done annually or in defined periods. | Organization and people strategy is constantly checked against the company business units' needs and changes (mergers, acquisitions and divestitures). People strategy is confirmed at fixed times, semi-annually, for leadership pulse checks and to instill company values throughout the company. |
| Process Inputs Data, intentions, objectives, materials, information, events, outputs from other processes, etc. | Inputs are unclear to the organization or are very basic, such as business units' current organizational design and people development curricula. | Process inputs include corporate business strategy, C-Level/Executive team direct input, some evaluations on company leadership and business units with leadership needs. | Process inputs include everything in the progressive category, plus solicited input from the organization and external parties and guiding leadership assessments. |
| Process Outputs Decisions, status, events, actions, information, materials, finished product, etc., resulting from the process | Outputs are often unclear, with organization/people strategic intent and motivators not well defined or communicated. Output is generally focused on a new organization chart and internal development programs. | Organization strategy is communicated throughout the company but with mixed results on understanding. People strategy is incorporated to all training courses and communicated through a passive media (such as a flyer or corporate website). | Organization and people strategy are communicated to stakeholders, with clear examples and definitions on roles, responsibilities, governance processes, etc. |
| Process Automation Level of automation or tools used to shape, enable or execute the process | None | Automation is close to inexistent, except for some standard formats to collect and organize information. | Automation includes standard formats to support operational model design; policy templates on responsibilities in an electronic media, available to the whole team. |
| Process Integration Level of integration the process has with other processes, systems, tools or third parties | Integration points are generally email or meeting driven, between CEO, selected VPs, and board of directors or equity partners. | Process integration is usually done in workshops for designing and alignment/consensus building. | Process integration is done during the organization and people strategy design and alignment. People participating in the process proactively inform and capture |

-continued

| | Basic | Competitive | Market Leading |
|---|---|---|---|
| | | | feedback from the organization. |
| Capability Area - Strategy and Governance <br> Merger and Acquisition Planning | | | |
| Process Participation <br> Who participates in the process execution/approval | There is little to no executive participation beyond the CEO, the board or equity partners, the CFO and perhaps the commercial VP and the general counsel, supported by investment bankers. | C-Level/Executive team suggests and screens prospects. The board of directors or equity partner review and approve, if necessary. Execution is carried out by appointed people in finance. | Business development Director/C-Level/Executive team suggests and screens prospects. The board of directors or equity partner reviews and approves, if necessary. Execution is carried out by business development personnel supported by key functional executives (Commercial, Supply Chain, Manufacturing) and enterprise supporting (General Counsel, Finance). |
| Process Creation <br> How the process gets executed Points that serve as differentiators in process capability and sophistication across the scale | M&A process is not defined or loosely defined. This process is carried out by external hired experts, on an ad-hoc basis. | A process for conducting mergers and acquisitions is followed, but may vary from year to year and is inconsistently applied or executed. It is still strongly supported by a handful of external consultants and investment bankers. | A clear and consistent M&A strategy development process is documented and followed for both annual and long range plans. Execution is clear; in particular analysis, due diligence and negotiation. Several agents are known (law firms, bankers, external accountants, consultants and auditors) and share the practice. |
| Process Frequency <br> Number of times and frequency at which a process is executed Number of iterations required before process is complete take place at least quarterly. | M&A is done episodically/ad-hoc. Lack of experience does not allow knowledge accumulation enough to improve processes. | M&A is carried out frequently, with prospect screening and evaluation throughout the year. The process is revised semi-annually and screening sessions | M&A is carried out as an ongoing effort; with monthly meetings to revise pipeline and long term goals to improve the company portfolio of businesses. |
| Process Inputs <br> Data, intentions, objectives, materials, information, events, outputs from other processes, etc. | Inputs are incomplete or very basic, such as business units' opportunities or strategic intent of prospect business. | Process inputs include corporate business strategy, C-Level/Executive team direct input. | Process inputs include corporate business strategy, C-Level/Executive team direct input, some evaluations on company leadership and business units with leadership needs. |
| Process Outputs <br> Decisions, status, events, actions, information, materials, finished product, etc. resulting from the process | Outputs are often unclear, except on the cases that a company/business is acquired or spun off. No feedback is used to improve process. | Outputs are clear and linked to company's goals and aspirations. Sources of business are somewhat documented, but not thoroughly. | Outputs are clear and linked to company's strategy. Sources of business are thoroughly and thoughtfully documented. Strong feedback loops are established to improve process. |
| Process Automation <br> Level of automation or tools used to shape, enable or execute the process | Little to no automation is used although it may involve presentation software such as PowerPoint, Excel spreadsheets and email. | The process defines standard inputs and formats, but all analytic work is an upgrade from the most recent work. This process is not automated. | The process is documented in shared knowledge environments in custom formats created from needed standard information. |
| Process Integration <br> Level of integration the process has with other processes, systems, tools or third parties | Integration points are generally meeting driven, between CEO and board of directors or equity partners. | The process is integrated into the periodic planning calendar, but generally no automated or other process integration is intentional. | The process is integrated into the periodic planning calendar intentionally, with supporting information fed into the knowledge base. |
| DEMAND GENERATION <br> Capability Area - Demand Generation <br> Category, Brand, and Consumer Strategy | | | |
| Process Participation <br> Who participates in the process execution/approval | Chief marketing officer and marketing group, with review by CEO and/or board of directors | Chief marketing officer and marketing group with inputs from sales and production groups Review by c-level (CIO, CFO, CEO)/executive team and board of directors | C-level (CIO, CFO, CEO)/executive team collaboration facilitated by Chief marketing officer and/or Chief Sales Officer Review by board of directors Identify and leverage product-innovation talent and new sources of innovation. Link marketing and product development tightly to embed the voice of the customer within new product development. |
| Process Creation <br> How the process gets executed | Marketing group evaluates category and brand image against | Strategic group communicates the portfolio management guidelines | Strategic Group communicates the portfolio management |

-continued

| | Basic | Competitive | Market Leading |
|---|---|---|---|
| Points that serve as differentiators in process capability and sophistication across the scale | business performance and consumer feedback and develops strategies including changes to existing categories/brands, new brand introduction or brand termination. Funds are allocated based on past spending and on management experience Strategic guidelines, historical business performance and consumer feedback | to the marketing group along with details of any analysis supporting the given directions. Funds are allocated on the base of a past spending and in some cases on ROI calculations Marketing group evaluates category and brand image against business performance and consumer feedback and develops strategies including changes to existing categories/brands, new brand introduction or brand termination. | guidelines to the marketing group along with details of any analysis supporting the given directions. Investment decisions are based on ROI or advanced marketing modeling techniques (e.g. competitive cause and effect evaluation). The marketing group generates and analyzes consumer and shopper insights in relation to the market, evaluates category and brand image against past performance and strategic category leadership objectives. Category and brand plans are developed with a focus on brands and products enabling category leadership. This plan outlines products and/or brands to be developed or acquired to achieve category leadership or, adversely, to be terminated where required and is feeding innovation, product lifecycle and consumer pricing processes Accurately understand precisely which features, functions or services customers really want. Take a portfolio management approach to products, services and solutions to optimize revenue and margin while managing risk. Identify and leverage product-innovation talent and new sources of innovation. Add new features and characteristics early in the product-development process to minimize risk and increase the chance of product acceptance. Develop products to enhance downstream operational efficiencies such as manufacturing and fulfillment, thus reducing overall cost and time to market. Develop the concept of "frugal engineering" that enables cost-efficient product designs in conjunction with a lean product development resource base. Implement innovations in the product development process itself. Sell products and services rather than just products to create greater customer value. |
| Process Frequency Number of times and frequency at which a process is executed Number of iterations required before process is complete | Annually | Annually, with quarterly adjustments based on measured performance and in-season marketing opportunities or adjustments | Annually, with quarterly adjustments based on measured performance and in-season marketing opportunities or adjustments Proactive and ongoing performance monitoring with in-flight adjustments where further potential for optimization is identified |
| Process Inputs Data, intentions, objectives, materials, information, events, outputs from other processes, etc. | Strategic guidelines, historical business performance and consumer feedback | Strategic guidelines, competitive position, historical business performance and consumer feedback | Strategic guidelines and data, competitive position and activity, historical business performance, foreseen trends and feedback of the consumer and market Focus a higher percentage of product resources on key products. |
| Process Outputs Decisions, status, events, actions, information, materials, | Strategic marketing plan Brand strategy consisting of recommended changes to | Strategic brand and product plans Brand strategy consisting of | Strategic and integrated category, brand, product and innovation plans |

|  | Basic | Competitive | Market Leading |
|---|---|---|---|
| finished product, etc., resulting from the process. | branding | short and long-term brand enhancements | Brand and product strategy describing short and long term objectives that are linked to other strategy components |
| Process Automation<br>Level of automation or tools used to shape, enable or execute the process. | No automation utilized in process beyond presentation software and system reports | Some limited access to online survey or feedback to capability and system reports | Automated brand performance metrics, survey or feedback tools, and media or third party reporting for brand performance and perception analysis<br>Workflows are used to seamlessly interconnect the parties that are involved in the strategy formulation process. |

Capability Area - Demand Generation
Channel, Customer, and Shopper Strategy

|  | Basic | Competitive | Market Leading |
|---|---|---|---|
| Process Participation<br>Who participates in the process execution/approval | Primary input comes from the marketing group, with little input, other than review and approval, from the c-level (CIO, CFO, CEO)/executive team. | Executive leadership from the marketing and sales groups drives the strategy formulation process with inputs from the supply chain and with c-level (CIO, CFO, CEO)/executive team review and approval. | Customer centric thinking is led by the c-level (CIO, CFO, CEO)/executive team with inputs from all parts of the organization and customers. |
| Process Creation<br>How the process gets executed<br>Points that serve as differentiators in process capability and sophistication across the scale | An unsophisticated process for assessing customers exists here with little to no segmentation, limited data inputs or fact basis. Offers tend to be product and service driven rather than based on customer needs or preferences. Channels are defined and developed without specific role definition.<br>The sales group defines customer targets, identifies what needs are to be distributed through which channels and manages trade terms and pricing. | Some customer segmentation analysis is done.<br>Offers are aligned with customer segments and customer performance is tracked and used for future planning.<br>Channels are defined and developed according to expected roles/priority within the organization.<br>The sales group defines customer targets, identifies what needs to be distributed through which channels and manages trade terms and pricing.<br>The logistics group gathers inputs from the sales group and implements optimized delivery routes based on the segmented customers. | Deep customer centric analysis is done and used to drive business activities including assortments and services. Customer feedback is frequently captured and growth plans by customer segment and cluster are developed and followed. Channels are assessed and developed based on target outcomes and the value they will contribute to the organization Cross channel components are part of the strategy and are integrated with the customer strategy.<br>Sophisticated measurement across channels is deployed and channel specific resources are deployed.<br>The marketing group segments shoppers, analyzes which channels customers leverage and segments outlet specificities.<br>The sales group defines customer targets, identifies what needs to be distributed through which channels and manages trade terms and pricing.<br>The logistics group gathers inputs from the sales group and implements optimized delivery routes based on the segmented customers. |
| Process Frequency<br>Number of times and frequency at which a process is executed<br>Number of iterations required before process is complete | Annual process with revisions occurring reactively when business issues arise | Annual process with mid-year checkpoint to assess performance and areas for improvement or retirement | Annual process with quarterly review and refreshes based on performance, competitive actions, and in some cases technology changes or pilot decision points. |
| Process Inputs<br>Data, intentions, objectives, materials, information, events, outputs from other processes, etc. | A strategic marketing plan exists here.<br>Other than historical customer behavior, there is limited customer insight within the process inputs. | The process inputs include strategic brand and product plans.<br>Customer data is available and used in strategy process though may be dated due to systems constraints or inadequate analysis capability, logistics cost and service inputs.<br>Customer data is available and used in strategy process though may be dated due to systems constraints or inadequate analysis capability, logistics cost and service inputs. | Extensive customer attributes and customer value analysis are collected, along with forward looking customer insights and near real time customer purchase behavior data, logistics cost and service inputs.<br>Inputs include strategic category, brand, product and innovation plans. |

|  | Basic | Competitive | Market Leading |
| --- | --- | --- | --- |
| Process Outputs<br>Decisions, status, events, actions, information, materials, finished product, etc., resulting from the process. | The guidelines of the sales force Customer strategy is broadly defined and not detailed at customer segment level<br>Overall customer growth is identified, but little to no measurement approach is included<br>Channel strategy that includes financial targets by channel and resource allocation/prioritization by channel<br>Broadly defined sales-force guidelines | Customer strategy defined by customer segment along with growth targets and measurement expectations<br>Channel strategy that includes channel roles, channel operating guidelines, financial targets, performance KPI's, and resource allocation<br>Prioritized sales-force guidelines including market goals and approach as well as surrounding logistics service levels | Customer strategy is defined at the segment and cluster level, with growth targets and sources, value contribution, and measurement approach articulated in the strategy.<br>Channel strategy includes channel roles, cross channel integration components, financial targets, resource allocations, performance calendar and KPIs, channel standards and channel leadership roles.<br>Prioritized sales-force guidelines include market goals and approach as well as surrounding logistics service levels |
| Process Automation<br>Level of automation or tools used to shape, enable or execute the process. | Little automation, other than ad-hoc customer reports or manual customer surveys<br>Limited automation for historical performance analysis | Customer feedback captured via online tools and incorporated into the strategy development process<br>Automation used for historical performance analysis and limited forecasting of future channel performance Select channel KPI's are automated for capture and tracking. | Customer feedback is captured via online tools and incorporated into the strategy development process.<br>Common online templates are used across groups to capture customer centric ideas.<br>Sophisticated automation is used for modeling of channel performance and optimization, including integrated channel performance and channel sensitivities.<br>Workflows are in place to make a seamless connection between parties involved in the strategy formulation process. |
| Process Integration<br>Level of integration the process has with other processes, systems, tools or third parties inconsistently. | There are limited integration points across the organization; strategy is set and cascaded down through the organization | The strategy is developed in parallel with corporate strategy areas and influences strategic outcomes. | The corporate strategy processes are integrated and provide customer centric direction/context for all strategic development areas.<br>Customer growth, loyalty and satisfaction are tied to group and individual incentives for performance and are compared against strategy. |
| Capability Area - Demand Generation<br>Integrated Marketing Strategy | | | |
| Process Participation<br>Who participates in the process execution/approval | The marketing group | Participants include the marketing group which have formal interaction with customers, supply chain, procurement and sales groups | The sales, operations and supply chain functions of the company are totally integrated into the marketing plan definition processes (sharing information and people knowledge is natural, making an integrated decision flow that takes into account all perspectives and has high quality integration with other processes). The marketing group leads and facilitates the process to get the best from all areas and to promote a marketing plan that is integrated with the company strategy, financial plans and all other company objectives. |
| Process Creation<br>How the process gets executed Points that serve as differentiators in process capability and sophistication across the scale | The marketing plan is mainly developed using basic metrics (as sales %: last year x this year), based on a cost perspective and linked to strategy in an intuitive way (not formal).<br>Most events are driven on a short-term basis.<br>There is little co-ordination of events to optimize the marketing calendar. | Incorporates high-level and formal company strategy and financial plans<br>Clear positioning and communication consistency builds long-term brand image.<br>The overall sales performance of specific events is evaluated.<br>The focus is on constructing the company image and contributing to the sales margin increase.<br>Coordination between different formats exists to avoid marketing | Process creation is a cross-functional process between marketing, merchandising, sales and operation and supply chain.<br>The marketing plan ROI (return on investment) is optimized with usage of econometric tools (e.g. competitive cause and effect modeling).<br>All areas are involved in the marketing plan; socializing data insights and people knowledge that may contribute to marketing |

-continued

| | Basic | Competitive | Market Leading |
|---|---|---|---|
| | | conflicts (e.g. two campaigns to same public in the same vehicle). | plan development and implementation. Focus on "contact point management", where the contact point is the single target of a communication. Investments are targeted on cost per targeted contact point. |
| Process Frequency Number of times and frequency at which a process is executed Number of iterations required before process is complete | A yearly market plan is constructed once and revised on an ad-hoc basis (with no clear criteria to define reviews). | A yearly market plan with periodic scheduled reviews Ad-hoc reviews are executed when needed Criteria for reviews are well established (e.g., financial targets not achieved, company strategy changes, etc.) | A yearly marketing plan with periodic scheduled reviews. Ad-hoc reviews are based on structured processes to capture changes in internal (e.g. financial target achievement) or external (e.g. competition, customer requirements and vendors' opportunities) environments. |
| Process Inputs Data, intentions, objectives, materials, information, events, outputs from other processes, etc. | Process inputs include category, brand and customer strategy, along with the prior year's marketing plan as well as new product launches. | Process inputs include category, brand, customer and shopper strategy along with the prior year's marketing plan. Major new product launches, financial plans, customer insight formats and portfolio strategy are also process inputs. | Same as progressive, plus micro market inputs to tailor marketing efforts at localized levels. |
| Process Outputs Decisions, status, events, actions, information, materials, finished product, etc., resulting from the process. | A yearly plan is constructed based on intuitive criteria and basic metrics (e.g. percent of sales), without taking into account synergies (e.g. TV planning and other types of actions). The process outputs include a basic year marketing plan without detail (mainly with events, and dates). | A yearly plan that considers high-level company strategies and synergies, and sets a clear and consistent plan for long-term image construction It includes event objectives and targets and differentiates between geographies and/or channels | The process outputs Include return on investment perspective and considers seasonality (media cost by time of the year, market elasticity by period). Market plan is aligned with category roles, brand/format/portfolio strategy and financial plan (marketing plan as an output to financial plan). |
| Process Automation Level of automation or tools used to shape, enable or execute the process. | This is mainly a manual process. | Tools to calculate marketing return on investment are available and used. Econometric analysis tools are used to understand the differential impact of the various components in the marketing mix. BI/data mining tools are used to facilitate data analysis and the basic marketing dashboard is available (planned x real). | Complete event planning tools are used to incorporate the learning of the econometric analysis in the event planning process. Elements of pricing and advertising are integrated in the same models and optimization is made on an event level considering the optimal return of discounts and media activity. A complete marketing dashboard is available with all needed metrics for monitoring media execution, sales, budget usage, etc. |
| Process Integration Level of integration the process has with other processes, systems, tools or third parties | Integration is limited to the strategic definition level. | Coordination with financial plan is integrated. There is some level of integration with sales, merchandising, supply chain and main vendors' marketing initiatives. | The market plan is aligned with company strategy (brand, portfolio, etc.), sales, supply chain and financial plans. Strong process documentation shows all integration points with other processes and integration with customers to the extent possible. Data insights and people knowledge are taken in to consideration (made part of the construction and decision process "DNA"). |
| Capability Area - Demand Generation Consumer Marketing Operations and Execution ||||
| Process Participation Who participates in the process execution/approval | The main participation comes from the marketing and advertising groups. There is extensive media agency support in the execution of the process. | The marketing group engages in formal interaction with the customers, supply chain, procurement and sales groups | The marketing group engages in formal interaction with customers, supply chain, procurement and sales groups. Vendors are included at the forefront of the planning stages. |
| Process Creation How the process gets executed Points that serve as | The marketing group executes the marketing plan. There is extensive media or public | The marketing plan is executed by marketing group, with involvement of the | The marketing plan is executed by the marketing group, with involvement of the |

| | Basic | Competitive | Market Leading |
|---|---|---|---|
| differentiators in process capability and sophistication across the scale | relations support. Public relations, events and sponsorships promote the corporate image rather than the brands or products. Execution is often at the local level with limited head-quarter involvement | communications group for public relations activities. Public relations, events and sponsorship groups are used to promote both the corporate image and brand awareness. The central marketing group monitors the local activities. | communications group for public relations activities. Messages to consumers are targeted on brands and products, with all marketing channels being used in an integrated way. Central marketing and advertising groups have control over all advertising conducted in the enterprise in order to ensure standards are met. |
| Process Frequency Number of times and frequency at which a process is executed Number of iterations required before process is complete | Iterations are ongoing while revisions are conducted on an ad-hoc basis and without clear review criteria | Iterations are ongoing and according to plan, with periodically scheduled reviews. Reviews are executed on an ad-hoc basis. The criteria for reviews is well established (e.g. financial targets not achieved, company strategy changes, etc.). | Iterations are ongoing and according to plan, with periodically scheduled reviews. Reviews are executed on an ad-hoc basis and according to structured processes that are designed to capture changes in internal (e.g., financial target achievement) or external (e.g. competition, customer requirements, vendor opportunities) environments. |
| Process Inputs Data, intentions, objectives, materials, information, events, outputs from other processes, etc. | This pertains to the consumer marketing plan and includes the events calendar, events to be advertised, type of advertising, and products/prices to be advertised (where applicable). | Same as basic, plus: Events briefings Past events sales and margin | Same as progressive, plus events related detailed sales forecast and margin |
| Process Outputs Decisions, status, events, actions, information, materials, finished product, etc., resulting from the process. | Executed consumer marketing plan with some performance measures | Executed consumer marketing plan with execution reports and comprehensive performance measurement routinely in place Amended customer development plan with activities to capture shoppers | Executed consumer marketing plan with execution reports and maximized $ spent on activities compared to reach/frequency achieved for specific target audience Amended Customer and Channel development plan with activities aiming to capture shoppers. |
| Process Automation Level of automation or tools used to shape, enable or execute the process. | Mainly manual processes exist here. | The advertising planning process is conducted using basic analytical tools, such as storage tools, (e.g. image database). The approval process is supported by system functionalities. | Analytical tools for marketing activities and advertising planning are relied on heavily. Detailed reporting is performed on media auditing KPI's. Workflows are in place to seamlessly connect parties involved in the consumer marketing execution processes. |
| Process Integration Level of integration the process has with other processes, systems, tools or third parties | Little integration exists with other processes (mainly with the marketing plan to get the products and prices that should be advertised). | Process activities, responsibilities and timelines are established and well known by all areas (marketing planning, agencies, merchandising, supply chain, sales and customers). Workflow tools help to achieve integration and managing deadlines. | Process activities, responsibilities and timelines are established and well known by all areas (marketing planning, agencies, merchandising, supply chain, sales and customers). Workflow tools help to achieve integration and manage deadlines. Strong process documentation shows how all integration points relate to other processes. |
| Process Participation Who participates in the process execution/approval | Main participation is from the local or regional sales group, with finance involvement where needed. | The global and local sales groups are supported by merchandising and marketing teams. The involvement of the finance group occurs where needed. | The global and local sales groups are supported by the merchandising and marketing teams. The involvement of the finance group occurs where needed. |
| | | Capability Area - Demand Generation Trade Marketing Operations and Execution | |
| Process Participation Who participates in the process execution/approval | Main participation is from the local or regional sales group, with finance involvement where needed. | The global and local sales groups are supported by merchandising and marketing teams. The involvement of the finance group occurs where needed. | The global and local sales groups are supported by merchandising and marketing teams. The involvement of the finance group occurs where needed. |
| Process Creation How the process gets executed Points that serve as differentiators in process | The marketing group defines promotions, manages pricing and develops the point of sales materials. | The marketing group defines promotions, manages pricing and develops the point of sales materials. | The marketing group defines promotions, manages pricing and develops the point of sales materials. |

|  | Basic | Competitive | Market Leading |
|---|---|---|---|
| capability and sophistication across the scale | The sales group lists SKU's with buyers at the highest level (with no attention to space, assortment and range). '  Merchandisers are occasionally activated. | The sales group lists products with buyers, offering limited negotiation on space, assortment and range.  Merchandisers are activated upfront for specific promotions | Sales groups negotiate with buyer trade terms, shelf space, assortment and range per specific outlet clusters and buyers.  Partnering options for co-funding of promotions are explored with buyers.  Merchandisers play an integral role in the monitoring of trade promotion activities within the trade.  Scrupulous performance and ROI (return on investment) monitoring is in place. |
| Process Frequency  Number of times and frequency at which a process is executed  Number of iterations required before process is complete | Ongoing and according to plan, with revisions on an ad-hoc basis and without clear review criteria | Ongoing and according to plan, with periodically scheduled reviews  Ad-hoc reviews are executed when needed.  Criteria for reviews are well established (e.g. financial targets are not achieved, company strategy changes, etc.). | Ongoing and according to plan, with periodically scheduled reviews.  Ad-hoc review process is based on structured processes to capture changes in internal (e.g., financial target achievement) or external (e.g. competition, customer requirements, vendor opportunities) environments |
| Process Inputs  Data, intentions, objectives, materials, information, events, outputs from other processes, etc. | Trade marketing plan includes:  Activity calendar, point of sales materials requirements and associated logistics | Same as basic, plus:  Activity briefings, and past activity sales and margin | Same as progressive, plus:  Activity related detailed sales forecast and margin |
| Process Outputs  Decisions, status, events, actions, information, materials, finished product, etc., resulting from the process. | Executed trade-marketing plan with some performance measures | Executed trade-marketing plan with execution reports and comprehensive performance measurement routinely in place | Executed trade-marketing plan with execution reports and maximized $ spent on activities compared to reach/frequency achieved for specific target audience |
| Process Automation  Level of automation or tools used to shape, enable or execute the process. | Mainly manual processes | Activity planning is done using basic analytical tools.  Sales force automation tools include event planning capabilities  Approval processes are supported by system functionalities. | Heavy use of analytical tools for activity planning  Detailed reporting on trade promotion effectiveness is in place  Sales force Automation tools are integrated with a Trade Promoton managent tools, ensuring a "closed loop" promotion process  Workflows are in place to seamlessly connect parties involved in the consumer marketing execution processes |
| Process Integration  Level of integration the process has with other processes, systems, tools or third parties | Little integration with other processes (mainly with marketing) | Process activities, responsibilities and timelines are established and well known by all areas (marketing planning, merchandising, supply chain, sales and customers).  Workflow tools help to achieve integration and managing deadlines. | Process activities, responsibilities and timelines are established and well known by all areas (marketing planning, merchandising, supply chain, sales and customers).  Workflow tools help to achieve integration and managing deadlines  Finance has visibility on the budget burn rate and allocation  Strong process documentation show all integration points with other processes. |
| Capability Area - Demand Generation  Sales Operations and Execution ||||
| Process Participation  Who participates in the process execution/approval | Participants are sales and merchandising groups. | Participants are sales and merchandising groups, supported by key account management. | Participants are sales and merchandising groups, driven by category and brand managers and supported by key account management. |
| Process Creation  How the process gets executed  Points that serve as differentiators in process capability and sophistication across the scale | Sales planning is conducted with a top down approach.  Distributors are historical partners.  Sales force manages customer information, queries and | Sales planning is conducted with a combined top down and bottom up approach.  Distributors are managed in line with the route to market strategy and objectives. | Sales planning is conducted using sophisticated demand forecasting models.  Distributors are managed in line with the route to market strategy and objectives. |

-continued

|  | Basic | Competitive | Market Leading |
|---|---|---|---|
| | complaints as well as orders and returns.<br>Customer data is updated on an ad hoc basis (e.g. when wrong data prevents invoicing or delivery of products). | A customer service center is in place to collect and manage customer information, queries, complaints, orders and feedback. Warranties, returns and product recalls are managed by the QA group. | Sales teams are organized and managed according to channel/customer potential Customer and consumer contact centers are both inbound and outbound and play an integral part in the proactive sales and marketing processes.<br>Warranties, returns and product recalls including communications and logistics are coordinated by the sales organization |
| Process Frequency<br>Number of times and frequency at which a process is executed Number of iterations required before process is complete | Process frequency is ongoing. | Process frequency is ongoing. | Process frequency is ongoing. |
| Process Inputs<br>Data, intentions, objectives, materials, information, events, outputs from other processes, etc. | The trade marketing plans | The trade marketing plans, sales forecasts and/or objectives. | Process inputs include channel, customer and shopper strategy, trade marketing plans, sales forecasts and/or objectives. |
| Process Outputs<br>Decisions, status, events, actions, information, materials, finished product, etc., resulting from the process. | Process outputs are sales operation and execution. | Process outputs are sales operation and execution. | Process outputs are sales operation and execution. |
| Process Automation<br>Level of automation or tools used to shape, enable or execute the process. | The process is mainly manual processes. Orders are often paper based. Customer specific information is prepared by sales back-office for sales force using office tools (Excel, Word, etc.). | Order management is supported by ERP's (enterprise resources plans), with on-line ordering capabilities deployed to customers.<br>The sales-force is equipped with mobile devices with direct access to CRM data.<br>The call-center technologies must support in-bound and out-bound telesales processes. | The IT (information technology) platforms are integrated with customers, providing stock visibility and pre-set replenishment capabilities.<br>The sales-force is equipped with mobile devices with direct access to CRM (customer relationship management) data, customer statistics and trade promotion management<br>The call-center technologies must support in-bound and out-bound telesales processes |
| Process Integration<br>Level of integration the process has with other processes, systems, tools or third parties | There is little integration with other processes (mainly with marketing). | Process activities, responsibilities and timelines are established and well known by all areas (marketing planning, merchandising, supply chain, sales and customers).<br>There are workflow tools in place helping to achieve integration and managing deadlines. | Process activities, responsibilities and timelines are established and well known by all areas (marketing planning, merchandising, supply chain, sales and customers).<br>Order to Cash is executed seamlessly throughout the organization<br>There are workflow tools in place to help achieve integration and managing deadlines.<br>Strong process documentation shows all integration points with other processes. |
| DEMAND SYNCHRONIZATION<br>Capability Area - Demand Synchronization<br>Integrated Demand and Supply Planning | | | |
| Process Participation<br>Who participates in the process execution/approval | Supply Chain and other functional managers. Other functional managers participate in an unstructured and ad hoc fashion.<br>Unclear accountability. Function which creates statistical forecast signs-off | Supply Chain and other functional managers.<br>Participation of other functions is continuous and is not restricted to a few meetings.<br>Supply Chain and other functions (Marketing, Sales, Finance and Operations) sign-off on one number forecast | Supply Chain and other functional managers, Third party providers are called for special information gathering or policy communication<br>Participants fully understand the processes within their group and the integration of these with other groups as well as customers and vendors.<br>Function with overall profit/loss responsibility has forecast sign-off. Accountability across enterprise boundaries |
| Process Creation<br>How the process gets executed | Ad hoc meetings between key impacted functions held in a | A more formal cross-functional S&OP process exists. Managers | Proactive formal meetings held between all functional teams |

| | Basic | Competitive | Market Leading |
|---|---|---|---|
| Points that serve as differentiators in process capability and sophistication across the scale | reactive or fire-fighting mode. All analysis conducted manually using spreadsheet based tools. No what-if analysis capability is available. An informal S&OP (Sales and Operations Planning) process exists where decisions are made based upon partial facts and with one function typically influencing others | from several functions (e.g. Marketing, Sales, Finance, New Product Development, Operations) play an equal part in decision-making Proactive formal meetings held between core functional teams. Scenario and what-if analysis capability is used, based mainly on cost and gross sales drivers. | across the extended supply chain. Scenario, what-if and optimization analysis capability is used, based on profit and similar drivers. S&OP process designed to (1) facilitate senior management review of demand and supply plans and (2) provide a forum where business decisions (which will balance supply and demand processes) can be agreed upon |
| Process Frequency Number of times and frequency at which a process is executed Number of iterations required before process is complete | Quarterly, with few iterations - reconciling past with present needs. Usually few revisions are made. | Annual plans with quarterly revisions and monthly reviews | Annual planning with quarterly revisions and monthly reviews focused on what-if scenarios and optimization analyses. Continuous reduction of costs and improved service by analyzing and adapting the fulfillment infrastructure to meet changes in market and geographic demand. |
| Process Inputs Data, intentions, objectives, materials, information, events, outputs from other processes, etc. | Multiple operating plans are used to drive business activities and actions. Forecast based on actual sales or shipment history for existing product No sales force input into the forecast Forecasting by different functional areas | One agreed plan used to drive business activities - however some functions still use additional plans Forecast is integrated with sales and customer input Baseline statistical forecast generated using demand history that most closely resembles "Customer Demand" Market trends and promotions incorporated Exception based forecast management | One integrated plan is used to drive all business activities - with no other plans developed or tracked. Integration of real-time demand information (based on Point of Sale data) Collaborative improvement of forecast with customers (integrated feedback loop) marketing, sales, operations, etc. Utilization of 3rd party syndicated market information for promotion impacts |
| Process Outputs Decisions, status, events, actions, information, materials, finished product, etc., resulting from the process. | Plans for sales (volumes, by channel, brand and category) and for supply chain management (demand, inventory levels, supply coverage), basic make/buy decisions for key products for the short term. Multiple forecasts exist for different functions (e.g., Finance, Sales, Production, etc.) S&OP meeting results are collected and published in consistent ways. | Integrated sales and operations plans, medium to longer term needs for capacity increases, recommendations for "renting" external capacity (warehouse, transportation, production), etc. Multiple views of the same forecast are available (e.g., in tons for manufacturing, $ for sales) and product, customer and geographical hierarchies are used S&OP meeting results are published and show trends in place as well as comments. | Fully integrated sales and operations plans (only one integrated plan for the company), long term needs for capacity increases, recommendations for "renting" external capacity (warehouse, transportation, production), financial impacts on trade-offs, etc. Consensus forecast across functions S&OP meeting results analyzed in different ways depending on problems to be addressed or improvement programs implemented. |
| Process Automation Level of automation or tools used to shape, enable or execute the process. | Data is maintained and reported using desktop based tools such as MS Excel and ad hoc MS Access applications. Statistical forecasting tools are not available or are highly rudimentary Forecasting techniques are largely judgmental versus statistical Limited systems support and flexibility to provide different views of the forecast (i.e., aggregation levels, time buckets, time horizons, sales divisions, etc.) | Data is maintained and sourced from ERP applications and reported using a mix of desktop tools and ERP reporting tools, Multiple algorithms simulated to create a "best-fit" forecast Statistical techniques are well understood by users; Correlation between demand for substitute and complementary products is evaluated Lag analysis is applied to understand impact of events on demand Basic understanding of causal factors Forecast systems can be adjusted to account for special events and promotions Both original forecast and adjusted forecast can be tracked/stored for performance monitoring | Data is maintained and sourced from ERP applications and reported using a web enabled integrated planning workbench. Use statistical correlations between POS data tracked at the top key accounts and total Sell-Through ABC classification and demand planning horizon used to balance effort and value Expert systems, Econometrics or Neural networks used to generate and evaluate strategic forecasts Integrated software ensures integration across all planning functions by allowing everyone to work from the same information with little delays caused by interfacing Collaborative Forecasting with Customers through use of collaborative planning software via Internet capabilities |

|   | Basic | Competitive | Market Leading |
| --- | --- | --- | --- |
| Process Integration<br>Level of integration the process has with other processes, systems, tools or third parties | No integrated planning capability per se to integrate into the organization.<br>Multiple systems used for forecasting, planning and execution are not integrated | Integrated planning seen as an essential addition to business as usual.<br>Forecasting, supply planning and execution systems are integrated | Integrated planning embedded into organizational operating processes to the extent that it is part of business as usual.<br>Forecasting, supply planning and execution systems are integrated<br>Online access to forecast<br>Consensus forecast available via internet to suppliers and other external partners |
| | Capability Area - Demand Synchronization<br>Product Lifecycle Management | | |
| Process Participation<br>Who participates in the process execution/approval | Chief marketing officer and marketing group, with review by CEO and/or board of directors<br>Independent program management body | Chief marketing officer and marketing group with inputs from sales and production groups, Review by c-level (CIO, CFO, CEO)/executive team and board of directors<br>Heavy-weight program leadership to drive change, with visible senior executive support<br>Very senior executives act as "Godfathers", or sponsors, for specific projects | C-level (CIO, CFO, CEO)/executive team collaboration facilitated by Chief marketing officer and/or Chief Sales Officer, Review by board of directors<br>Program management established as a career milestone, with appropriate reward structure<br>Team incentives based on program performance |
| Process Creation<br>How the process gets executed<br>Points that serve as differentiators in process capability and sophistication across the scale | Workflow and process documentation in place | Establishment of a Product Definition Stage, in which all requirements are spelled out and agreed to<br>Use of stage-gates to control processes and make go/no-go decisions | Continuous improvement program documented and executed<br>R&D undertaken as part of a holistic strategic framework |
| Process Frequency<br>Number of times and frequency at which a process is executed<br>Number of iterations required before process is complete | Annual plans, with ad hoc review during the year | Annual plans with quarterly reviews and defined stage gates | Annual planning with defined stage gates and monthly reviews |
| Process Inputs<br>Data, intentions, objectives, materials, information, events, outputs from other processes, etc. | Market requirements and risk considered when making product line decisions<br>Targeted customer input to define product/solution needs<br>Customer requirements and feedback stored as documents | Product line strategy dictates split of product development resources into new product projects, platform projects, and maintenance projects<br>Extensive, direct customer interaction in defining product/solution programs and requirements<br>Senior level customer engagement in program reviews<br>Customer requirements and feedback stored as knowledge linked to corresponding products, systems, and parts | Product strategy aligned to supply chain capabilities<br>Customer ability to design specific elements or whole system through largely configurable input<br>Structured, closed loop customer collaboration throughout product lifecycle, through focus groups and advisory councils<br>Customer requirements and feedback looped into new product development |
| Process Outputs<br>Decisions, status, events, actions, information, materials, finished product, etc., resulting from the process. | Product focused definition and prioritization of customer requirements<br>Funds based on needs and risk sharing | Formal business case development for recommended initiatives and prioritization of requirements<br>Business objectives are determined by project for incremental and radical R&D | Creation of robust product and market entry strategy<br>Requirements are analyzed across the entire portfolio to ensure that the needs of market niches will be met |
| Process Automation<br>Level of automation or tools used to shape, enable or execute the process. | Process modeling using existing manufacturing process<br>Simulation used on a one-off basis | System level simulation and prototyping<br>NPI (New Product Introduction) tools fully integrated with ERP system | System level and modular simulation and prototyping<br>NPI tools extended to supplier and vendor partners |
| Process Integration<br>Level of integration the process has with other processes, systems, tools or third parties | Limited communication between Marketing and R&D, Supply Chain, Manufacturing | Sales and marketing visibility to R&D, supply chain, manufacturing data, and vice versa<br>Design for supply chain (production and distribution) constraints, manufacturability, quality and regulatory compliance<br>Two-way dialog regarding manufacturing requirements and supplier capabilities | Tight integration between sales and marketing, supply chain and manufacturing, including collaborative workflow<br>Design optimized for total lifecycle cost<br>Strategic sourcing decisions are part of the product development process<br>Product designs take into account customer requirements<br>Validation of supplier capacity and production processes occurs |

-continued

| | Basic | Competitive | Market Leading |
|---|---|---|---|
| Capability Area - Demand Synchronization<br>Portfolio Optimization | | | |
| Process Participation<br>Who participates in the process execution/approval | Chief marketing officer and marketing group, with review by CEO and/or board of directors | Chief marketing officer and marketing group with inputs from sales and supply chain, Review by c-level (CIO, CFO, CEO)/executive team and board of directors | C-level (CIO, CFO, CEO)/ executive team collaboration facilitated by Chief marketing officer and/or Chief Sales Officer, Review by board of directors |
| Process Creation<br>How the process gets executed Points that serve as differentiators in process capability and sophistication across the scale | Product portfolio management decisions based on intuition rather than evidence and analysis of product profitability.<br>Product expansion and refreshment ad hoc and opportunistic. Retirement does not occur until product is losing money. | Partially structured approach to product portfolio management, with frequent but static product profitability analysis and tracking.<br>Activities to manage product across lifecycle; often based on intuition with periodic refreshments. | Product portfolio management approached in a disciplined, scientific manner. Decisions based on constant product profitability analysis and tracking.<br>Active management of product over its life cycle. Expansions and refreshments planned. |
| Process Frequency<br>Number of times and frequency at which a process is executed Number of iterations required before process is complete | Addressed in an ad-hoc manner | Portfolio optimization is done annually, with a mid-year checkpoint for revision. | Portfolio optimization is done annually, with quarterly refreshes or adjustments based on current performance, forecast, competitor actions, and market trend data. |
| Process Inputs<br>Data, intentions, objectives, materials, information, events, outputs from other processes, etc. | Inputs include business portfolio matrik and key prioritized businesses prospects.<br>Limited availability of information about the markets, customers or partners makes effective management difficult | Inputs include portfolio planning with key businesses financial targets, business unit roles and strategic intent by group of categories as well as a prioritized list of prospects.<br>Significant information about markets, customers and partners made available, collated manually and locally | Inputs include portfolio planning with key business units, strategic intent for each of the business units in the portfolio, financial targets, and major targets, along with multi-year view and emerging business opportunities. Active input from market intelligence<br>A large volume of market, customer and partner intelligence is collated, analyzed, and made available to aid marketing planning and decision-making |
| Process Outputs<br>Decisions, status, events, actions, information, materials, finished product, etc., resulting from the process. | Output is the product portfolio | Outputs include prioritized product portfolio matrix | Prioritized product portfolio matrix, with continuous measure of product performance |
| Process Automation<br>Level of automation or tools used to shape, enable or execute the process. | No automation is used in the process, other than presentation software and system reports. | Some automation used to perform basic analytics, along with system reports and presentation software.<br>Access DB/Excel financial models | Automation is used to perform business performance modeling and simulation, comparative data and trend analysis, forecasting, and financial analysis.<br>Constraint-based planning with real-time input from Product Creation and other systems, Profitability and Process Metric reports across product lines |
| Process Integration<br>Level of integration the process has with other processes, systems, tools or third parties | Little to no integration with other functions<br>Lack of clear buy-in to the portfolio management strategy. Business is decentralized and departments operate with a high degree of independence. | Integrated with sales, production and supply chain functions Informal buy-in to the business' portfolio management strategy, but no formalized structure to control the activities of different departments, channels and partners | Portfolio planning is integrated with other functional areas such as production, supply chain, commercial etc. to optimize business unit roles and target performance.<br>Business-wide buy-in to the portfolio management strategy, with a high level of coordination across business lines, channels and partners |
| Capability Area - Demand Synchronization<br>Route to Market | | | |
| Process Participation<br>Who participates in the process execution/approval | Sales and Marketing function primarily, with CEO taking the final decisions | Sales and Marketing jointly drive Route to Market strategy Supply Chain supports the process marginally | Sales, Supply Chain and Marketing drive Route to Market and Portfolio strategy Brand Managers involved in new product route to market |
| Process Creation<br>How the process gets executed Points that serve as differentiators in process capability and sophistication across the scale | Limited analysis undertaken, with a view to tailoring offerings to specific markets or customer groups<br>Limited ability to serve customers through the most | Moderate amount of analysis conducted to tailor offerings to perceived needs of target markets.<br>Some understanding of the value of different channels, but limited | Extensive advanced analysis undertaken to provide products, services and treatments in line with the business strategy; process provides consistent repeatable approach |

|  | Basic | Competitive | Market Leading |
|---|---|---|---|
|  | commercially appropriate channel | ability to take the appropiate action no maximize business returns | Clear strategy to interact with customers through the channels which will provide a differentiated customer experience, and build a lasting and mutually profitable relationship |
| Process Frequency Number of times and frequency at which a process is executed Number of iterations required before process is complete | One-time. Review only when new businesses or products are added | Annual with informal reviews, primarily as a result of performance issues | Reviewed on a regular basis to ensure continuing fit |
| Process Inputs Data, intentions, objectives, materials, information, events, outputs from other processes, etc. | Route to Market based on historical performance Lack of insight to drive business decisions and actions. | Based on some basic analysis of market trends Some application of customer understanding to drive business decisions and actions | Based on a clear data-driven understanding of likely future market conditions. Fully integrated, insight-driven process to incorporate customer and market intelligence into route to market decisions, and track market results. |
| Process Outputs Decisions, status, events, actions, information, materials, finished product, etc., resulting from the process. | All customers/channels offered same services/products - offering not tailored to the needs and budget of the customer/channel | Customized services and products for each customer group/channel based on fact-based analysis | Targeted product/service offerings delivered with clear value propositions for targeted customer groups, prioritized based on market opportunity, competitive presence, and vendor capability |
| Process Automation Level of automation or tools used to shape, enable or execute the process. | No documentation of processes/approach | Some documentation of processes/approaches | Documented process is communicated and enforced across the entire business, promoting consistency |
| Process Integration Level of integration the process has with other processes, systems, tools or third parties | Minimal formal interaction between Sales, Marketing and Supply Chain | Limited collaboration between Sales, Marketing and Supply Chain functions | Extensive ongoing collaboration between Sales, Marketing and other functions |

DEMAND FULFILLMENT
Capability Area - Demand Fulfillment
Supply Chain Strategy and Execution

|  | Basic | Competitive | Market Leading |
|---|---|---|---|
| Process Participation Who participates in the process execution/approval | Limited involvement of functional areas apart from Supply Chain | Consumer analysis, market analysis, competitor analysis and base lining completed with supply chain organization using comparative, internal benchmarks. | Involvement of key functional areas: Sales and Marketing (market trends and channels perspectives), Customer Service (customer demands), Finance (cost auditing), IT (high level technical architecture) and Logistics with Supply chain organization using comparative best-in-class external/internal benchmarks Extensive collaboration with customers and suppliers, extending planning both upstream and downstream. Recognizing the importance of talent and career development to optimize resource utilization. |
| Process Creation How the process gets executed Points that serve as differentiators in process capability and sophistication across the scale | Ad-hoc, standalone SC "strategy" process more focused on financial/budget objectives than capability development Strategic planning process is more internally focused. Customer requirements, if discussed, are limited to fill-rate and service levels "Disconnect" between strategy and execution strategy is a "one time effort" Limited focus on "big picture", focused on making plan or meeting performance objectives quarter by quarter. | SC "strategy" processes are less focused on financial objectives/budget and more on required capabilities Strategies include some customer perspective, but not integrated into formal planning process Increased emphasis on annual performance planning and defining a "high level roadmap" to get there Focus on operational excellence | End to end approach (Total cost approach) with SC "strategy" processes integrated with other organizational processes. Strategies start from the customer and work backwards into organization and suppliers Integrated "roadmap" which paints a clear picture of current SC performance, key improvement objectives, and milestones action plan 2-3 years out Strategic intent translated into defined action plans, monitored to ensure execution Continuous improvement - significant emphasis on six sigma, TQM, analyze issues, define root cause, and take corrective actions Planning for and responding well to disruptions and opportunities. |

|  | Basic | Competitive | Market Leading |
| --- | --- | --- | --- |
| Process Frequency<br>Number of times and frequency at which a process is executed Number of iterations required before process is complete | Executed every year Focused on upcoming fiscal year/budget | Formal supply chain strategy planning process every 2-3 years Execution on a continual basis | Focus on building solutions for tomorrow's problems today Formal supply chain strategy planning process as part of annual business planning cycle Focused on 2-3 year horizon; where company needs to be in order to execute business plan Potential review when relevant new aspects appear (e.g. M&A, significant changes in sales trends) Execution on a continual basis |
| Process Inputs<br>Data, intentions, objectives, materials, information, events, outputs from other processes, etc. | Last year's results, financial objectives, historical product/segment trends. Data not easily accessible Data accuracy procedures not in use (e.g., root cause analysis, reconciliation/tie-out process) Multiple sources exist for the same data element | Current information and strategic vision along with historical information. Weekly reconciliation of similar data elements across systems at all levels Key customer/market requirements are identified but not aligned to required capabilities Synchronized data entities across systems and enterprises (naming standards, formatting, internal data usage) | Projected information and strategic vision along with organizational potential and capability requirements. Industry Best Practices and Benchmark data also serve as a crucial input. Key customer/market requirements are aligned to new and existing supply chain capabilities All data available as required in the desired format |
| Process Outputs<br>Decisions, status, events, actions, information, materials, finished product, etc., resulting from the process. | Copy of last year's plans and output revised to reflect performance objectives. Completed execution process | Updated plans based on current market conditions and strategic plan. Completed execution process with rudimentary inputs into the supply chain plans | Forward looking plans based on projected market conditions and strategic opportunities as well as the potential of the organization. Completed execution process with detailed inputs into the supply chain plans. A detailed comparison with best in class process and delineation of possible go forwards with specific thrust areas. |
| Process Automation<br>Level of automation or tools used to shape, enable or execute the process. | Processes completed by individuals with spreadsheets, email and paper. Data has not been aligned to perform integrated planning (e.g., consistent coding for products, locations, etc.) Late adopter of new technologies Wait for economically affordable innovations | Process completed with integrated groupware and workflow tools. Fast follower of new technologies Outsourcing is considered but is not thoroughly understood as a process alternative. | Process completed with zero-based plans that begin with an understanding of customer needs and value drivers, organizational and competitor strengths and weaknesses and forward-looking trends. Operational modeling tools used to evaluate numerous scenarios. Baselines developed based on the full potential of the organization. Leading edge technologies applied (RFID and sensors) Drive others to adopt (e.g. Wal-Mart and RFID) Outsourcing solutions understood and considered. Successful approaches immediately communicated and deployed synchronously on a global basis. |
| Process Integration<br>Level of integration the process has with other processes, systems, tools or third parties | Linkage between research, baselines and plans is unclear. Processes are integrated loosely based on the knowledge of a few individuals. Supply Chain Process does not incorporate all relevant functions of the organization - Marketing, Production, Sales, Finance, Logistics, Forecasting Little to no partnering with customers and suppliers | Relationship between consumer trends, market trends and competitor capabilities is articulated in process Meetings include manager-level personnel from Marketing, Sales, and Forecasting; Production and Finance are not represented Selective partnerships with customers and suppliers Captured operational transaction data is incorporated into planning processes | Supply chain transaction processing systems, web-based EDI, workflow tools, analytic tools, and often data warehouses are used. Supply Chain participants from all relevant organizations each having the authority to make key decision and to commit his/her functional groups to resolve issues Shared business processes, people and performance metrics used to optimize cross-organizational supply chains Leveraging their tools, processes and operating models extensively to enable companies to focus on higher-value planning activities |

| | Basic | Competitive | Market Leading |
|---|---|---|---|
| | | | Partner with customers and suppliers to integrate information into IT systems and processes seamlessly |
| | | Capability Area - Demand Fulfillment Sourcing and Procurement Strategy and Execution | |
| Process Participation Who participates in the process execution/approval | Buyers or purchasing employees without complete accountability and have little input to procurement and sourcing strategy. Managing supplier relationships is left to the purchasing director-level resources. Buyers have little interaction with vendors until purchasing contracts are established. | Purchasing employees with responsibility for process performance identified consistently across business units. Buyers and other purchasing employees work directly with warehouses and inbound quality assurance. Buyers are empowered to select vendors and are provided with specific, guiding principles for operating this way. | Purchasing leaders with authority, responsibility and accountability for process improvement are identified. Purchasing leaders are held accountable to identify and cost justify improvement initiatives. Leaders fully understand processes within their group and the integration of these with vendors and other internal groups. Buyers and other employees work with vendors and their internal groups. Formal strategic category planning process in collaboration with key business owners for all main spend areas Conduct procurement development actions in a way that considers the extended talent network of procurement. Among supply chain masters, procurement has played a material role in the design/development of 58 percent of the company's products, compared with 28 percent among lower performers |
| Process Creation How the process gets executed Points that serve as differentiators in process capability and sophistication across the scale | Procurement strategy and planning processes have been around for a long time and were inherited. They are included in an SOP document that is probably no longer used. Buyers focus on tactical execution rather than on performance optimization. Supplier selection criteria based on price and quality | Processes were created collaboratively and are kept current. Buyers are integrated in to procurement strategy and planning processes. Processes are documented in a shared repository and are accessible to all participants. Buyers operate without full spectrum of information and base decisions on relationships rather than on cost competitive factors in some cases. Reduced number of suppliers selected by strategic Key Performance Indicators (KPIs) Differentiate between supplier segments and have clear strategies for each segment Long-term strategic supplier relationships | Processes are viewed as part of an overall "value equation" that creates value for customers. Process owners are fully accountable Processes are documented and automated through a workflow system or automated process. Category management is centrally managed and has specialists in cost modeling. Reduced number of suppliers selected by strategic Key Performance Indicators (KPIs) with emphasis placed on supplier's willingness/ability to develop long-term strategic relationship For supply chain masters, the procurement function controls 92 percent of controllable spend, compared with just 36 percent at lower performers |
| Process Frequency Number of times and frequency at which a process is executed Number of iterations required before process is complete | Processes are executed on a semi-regular basis with arbitrary frequency based on financial reporting periods. Processes are generally left unrevised. | Measurement processes are executed frequently enough to provide process owners with information needed. Purchasing processes occasionally revised every several years with new project or systems implementation. | Processes executed as continuous flow or as frequently as is needed Business is able to react quickly to changes and optimize purchasing cost dynamics. |
| Process Inputs Data, intentions, objectives, materials, information, events, outputs from other processes, etc. | Inputs include basic data needed for P.O. entry and do not empower buyers to improve business performance. Processes are not integrated with upstream or downstream activities or groups. | Inputs include data needed for effective procurement decision-making including product requirements, alternatives, specifications and quality requirements. Processes are integrated within the organization. | Inputs include relevant and supporting data and all data necessary to understand underlying needs as well as any knowledge the requisitioning entity has about the suppliers. Buyers and manufacturing engineers work together with quality groups to ensure optimal results at the best price. |

|  | Basic | Competitive | Market Leading |
|---|---|---|---|
| Process Outputs<br>Decisions, status, events, actions, information, materials, finished product, etc., resulting from the process. | Process outputs include basic procurement instructions provided to Buyers. Procurement execution processes shall include a completed purchase order | Process outputs include collaborative decisions made and guiding principles for Buyers to follow.<br>Procurement execution shall include a completed purchase order which is registered electronically. | Processes are integrated with all upstream activities related to vendors and all receiving/QA processes.<br>Process outputs include collaborative decisions as well as best practices for delegating data entry activity in order to empower buyers to improve performance along measures aligned with the profitability of the organization.<br>Apart from an electronically registered purchase order, other details like next purchase date (likely), payment details, discounts, etc. are indicated.<br>Among supply chain masters, the ratio between total cost of ownership reduction and procurement operating cost is 10.4, compared with 4.0 among lower performers |
| Process Automation<br>Level of automation or tools used to shape, enable or execute the process. | Many aspects of the process are completed manually and repetitive tasks have not been fully automated. Company typically struggles to collect accurate, meaningful information.<br>Little or no advanced technology used to interface with suppliers or in materials planning | Repetitive tasks have been automated and process is sufficiently automated to provide timely information. Company functions efficiently with existing technologies that have been customized.<br>New technologies for automating catalog "punch-out" purchasing, reverse auctions and other workflow enhancements are being considered for use. | Process has been automated to the degree that it is economically worthwhile (e.g. improves financials or quality). Financial evaluations of technology are activity based and account for the time of internal resources. Leading technologies are routinely considered and identified for potential to provide strategic advantage. |
| Process Integration<br>Level of integration the process has with other processes, systems, tools or third parties | Traditional in-country organization design based on functional areas (e.g. finance, logistics, manufacturing) Dysfunctional anomalies due to tenure and personality conflicts Information is shared only in the sourcing/procurement function which owns the data Supplier interactions and linkages are focused on transactional activities Processes are largely discrete - source of input information is not clearly understood. Relationships are not maintained well with manufacturing, receiving as well as quality assurance. Processes sub-optimized within departmental silos. | Some centers of excellence exist to bring together functional experts e.g.. Procurement, Supply-Chain with some regional ownership Information is shared internally across the whole supply chain Procurement processes are integrated across organization. Success is achieved when internal organizational processes function well.<br>Key suppliers are incorporated into planning process Some strategic/preferred suppliers identified and performance management process in place Vendor performance is measured relative to contracted terms and orders requested. | Organization structure tightly aligned to support Operating Model. Balance between regional and local responsibilities carefully considered<br>Real time Information shared between supplier and customer systems, including funds transfer, POS data<br>Shared business processes, people and performance metrics to optimize cross-organizational supply chains<br>Procurement processes are integrated across the organization and with vendors as well as manufacturing and quality assurance teams. Processes support development of High Performance capabilities Enable a high level of integration with their suppliers and analyze active end-product configurations. Collaborative Supply Planning with suppliers through use of collaborative planning software via Internet capabilities<br>Supply chain masters on average formally manage 72 percent of their supplier base, as compared with 26 percent of lower performers |
| Capability Area - Demand Fulfillment<br>Manufacturing Strategy and Execution ||||
| Process Participation<br>Who participates in the process execution/approval | Includes Production Planners, Production Schedulers and Production Managers. | Includes Production Planners, Production Schedulers, and Production Managers. Also included are quality managers and production executives. | Includes Production Planners, Production Schedulers, and Production Managers. Also included are quality managers and production executives in addition to shipping and receiving managers. |

|  | Basic | Competitive | Market Leading |
| --- | --- | --- | --- |
| Process Creation<br>How the process gets executed<br>Points that serve as differentiators in process capability and sophistication across the scale | Processes have probably been around for a long time and were inherited. They are likely stored in an SOP document that is rarely referenced. Process and performance measurement documentation is considered separate from job descriptions. Virtually no Failover processes are in place. If there are any, they are not current. | Processes were created or reengineered collaboratively in consideration of the "Value Creation Equation" which outlines how the organization creates value for customers. This aligns with group objectives as well as those of the organization.<br>Failover processes are in place to handle disaster and recovery. | Processes were engineered from the group using best practices and knowledge available in all areas. Processes are quality centric and every key activity includes a measure of performance. The processes which are key to the value creation equation for customers is staffed with the most talented resources.<br>Failover procedures are in place along with redundant systems which help to avoid failover.<br>Have an optimized, global, end-to-end manufacturing model. |
| Process Frequency<br>Number of times and frequency at which a process is executed<br>Number of iterations required before process is complete | Processes are executed on a semi-regular basis with arbitrary frequency.<br>Results are published in consistent ways. | Processes are executed frequently enough to provide process owners with information needed.<br>Results information is published in graphical format and is posted prominently. | Processes executed as a continuous information flow or as frequently as needed to understand whether improvement initiatives are effective.<br>Results include root cause and Pareto analysis useful for identifying ways to improve performance. These also include action plans that are continuously monitored. These are extensively circulated across the organization. |
| Process Inputs<br>Data, intentions, objectives, materials, information, events, outputs from other processes, etc. | Inputs include data needed for measurement procedure as defined.<br>This generally does not require the most timely data and inaccuracies are accepted leading to a general feeling that the measurements may not be accurate. | Inputs include relevant data and supporting data.<br>Data is generally timely and accepted as being accurate due to additional performance measures in place that measure data accuracy.<br>Use performance measurement indicators to proactively address issues. | Inputs include relevant, supporting data and all data necessary to understand exceptions as well as improvement opportunities. This data supports incorporation of activities with vendors and customers.<br>Data proofing is ensured through error-proofing, cross-checks, total-checks and accuracy measurements. |
| Process Outputs<br>Decisions, status, events, actions, information, materials, finished product, etc., resulting from the process. | Process outputs include regular performance reports or defect lists.<br>These are typically distributed to managers and have limited impact. | Process outputs measure performance on a 0-100% scale - measuring the successful events/the number of opportunities for success.<br>These are shared with all managers and supervisors. | Process outputs measured continuously and graphically as a % measure of successful events and are compared to performance improvements expected to be achieved.<br>These integrate with upstream and downstream processes.<br>Collaborative performance measures enable vendors and customers to identify ways to improve their effectiveness. |
| Process Automation<br>Level of automation or tools used to shape, enable or execute the process. | Many aspects of the process are completed manually and repetitive tasks have not been fully automated.<br>Technology adapted only after required for competitive survival or when an upgrade to an existing application is made that has additional capabilities. | Repetitive tasks have been automated and process is sufficiently automated to provide timely information.<br>Company functions efficiently with existing technology such as mainframe reports and other sources of information.<br>Technology not generally accepted and economics not understood. Leading technologies have not been adopted. | Process has been automated to the degree that it is economically worthwhile (e.g. improves financials or quality).<br>Leading technologies routinely considered and identified for potential to provide strategic advantage. Value equation of business clearly understood and serves as basis for decision-making. |
| Process Integration<br>Level of integration the process has with other processes, systems, tools or third parties | Process steps are integrated within the process. Processes sub-optimized within departmental silos.<br>Source of input information is not well-understood nor are the uses of the outputs. | Processes are integrated across organization. Owners understand how process fits in to overall value add equation for organization and customers.<br>Process reporting may be part of a performance measurement program for organization.<br>Adopt lean manufacturing principles and extend these to their suppliers. | Processes are integrated across organizations and with vendors and customers. Understanding of stakeholder needs is ubiquitous. Feedback is received continuously. Successes are achieved jointly with customers and direct interaction is encouraged.<br>Process supports distinct High Performance capabilities in clearly defined and articulated ways. |

-continued

| | Basic | Competitive | Market Leading |
|---|---|---|---|
| | | | Process is part of an overall program to become High Performance. |

Capability Area - Demand Fulfillment
Logistics and Fulfillment Strategy and Execution

| | Basic | Competitive | Market Leading |
|---|---|---|---|
| Process Participation<br>Who participates in the process execution/approval | Supply Chain and other functional managers<br>Ownership of all inventory in the central stocking locations; little or no vendor collaboration or visibility to inventory levels | Supply Chain and other functional managers, with information validated/signed off by the VP of Commercial<br>Some introduction of Vendor Managed Inventory levels with central planning organization sharing information with vendors, but still monitoring and setting safety stock levels | Supply Chain and other functional managers, with information signed off by the VP Commercial.<br>Use of VMI with majority of planning and ownership held by vendors; introduction of consignment inventory; robust collaboration techniques on inventory and demand patterns via internet planning tools |
| Process Creation<br>How the process gets executed Points that serve as differentiators in process capability and sophistication across the scale | Inventory control with centralized responsibility and accountability<br>Planning strategy/parameters are assigned to product segments and products. All SKUs for a product have the same planning parameters. Some strategy/parameters are set by general policy.<br>Marginal order promising capability | Inventory policies tied directly to customer service requirements<br>Planning strategy/parameters and inventory policy is set by the joint customer-product segments and SKU. The same product in different locations have different planning parameters.<br>Capability to order promise, such as Available to Promise (ATP) or Capable to Promise (CTP) | Key performance indicators (KPIs) tie inventory management practices to desired customer service levels<br>A combination of the CRM customer and product segmentation is used to drive and establish planning parameters by SKU-Customer combination.<br>Capability to order promise with different service levels for different customers or customer segments<br>Ability to quickly and profitably meet demand variations; proactively balancing transportation and production costs. |
| Process Frequency<br>Number of times and frequency at which a process is executed Number of iterations required before process is complete | No defined frequency for logistics and fulfillment planning Processes are executed on a semi-regular basis with arbitrary frequency. | The planning strategy/parameters are reviewed every 9-12 months. Execution is basis company established patterns and is usually isolated from demand surges. Process execution typically gets hampered in times of extreme demand surge/fall. | The planning strategy/parameters are reviewed every 9-12 months. Process gets executed as per the need. Process execution is a unique function of demand and supply variables and encompasses most of variability at the customer/organization side through its design.<br>Continuous reduction of costs and improved service by analyzing and adapting the fulfillment infrastructure to meet changes in market and geographic demand. |
| Process Inputs<br>Data, intentions, objectives, materials, information, events, outputs from other processes, etc. | Inputs include basic data needed for inventory planning. | Inputs include basic data needed for effective planning as well as supporting data. | Inputs include relevant and supporting data and all data necessary to understand underlying needs |
| Process Outputs<br>Decisions, status, events, actions, information, materials, finished product, etc., resulting from the process. | Process outputs include basic instructions. | Process outputs include collaborative decisions made and guiding principles to follow. | Process outputs include collaborative decisions as well as best practices in order to improve performance along measures aligned with the profitability of the organization. |
| Process Automation<br>Level of automation or tools used to shape, enable or execute the process. | Data is maintained and reported using desktop based tools such as MS Excel and ad hoc MS Access applications.<br>Effective matching of supply and demand through optimization of inventory and assets across the supply chain. | Data is maintained and sourced from ERP applications and reported using a mix of desktop tools and ERP reporting tools. Effective matching of supply and demand through optimization of inventory and assets across the supply chain. | Data is maintained and sourced from ERP applications and reported using a web enabled integrated planning workbench. Standardized (often centralized) processes and IT infrastructures enabling the use of real-time information to respond to any significant business changes. |
| Process Integration<br>Level of integration the process has with other processes, systems, tools or third parties | No integrated planning capability in the organization. Available to promise visibility is limited to available finished goods inventory | Integrated planning seen as an essential addition to business as usual.<br>On-line available to promise includes ability to view planned production receipts in addition to finished goods inventory<br>Operation of multiple supply chain channels based on customer service requirements and product characteristics. | Integrated planning embedded into organizational operating processes to the extent that it is part of business as usual.<br>On-line capable to promise includes the ability to view planned production receipts and reallocate resources to meet demand |

-continued

| | Basic | Competitive | Market Leading |
|---|---|---|---|
| Capability Area - Demand Fulfillment | | | |
| Order and Service Management | | | |
| Process Participation<br>Who participates in the process execution/approval | No dedicated service personnel | Dedicated service team | Dedicated service team, closely working with sales and supply chain personnel |
| Process Creation<br>How the process gets executed<br>Points that serve as differentiators in process capability and sophistication across the scale | All customers treated the same<br>An S&OP model is not in place for parts planning; planners/forecasters create the plan in an organizational vacuum.<br>No forecasting or planning of returned parts and activities is conducted. | Some customers receive higher levels of service but it is not handled systemically<br>Parts master planning is enabled with inputs from demand and supply planning teams; some metrics in place.<br>Demand planning team includes repaired parts in its forecasting approaches; output is used in replenishment planning. | All customers are systemically tiered and specific criteria and ability to reimburse are defined for each tier<br>S&OP supported by cross-functional process teams using advanced tools and function-spanning metrics.<br>Planning system captures transaction data on returned parts; factored into deployment and replenishment plans.<br>Mitigate the risk inherent in assuming responsibility for a customer's equipment and keep service-related projects on track.<br>Develop a highly flexible service delivery model to serve customers better.<br>Excel at resource and asset utilization to use people, parts, facilities and partners effectively.<br>Articulate a clear partner strategy to improve customer experience and use metrics to measure customer response continually<br>Maximize return on service financially and in terms of customer service |
| Process Frequency<br>Number of times and frequency at which a process is executed<br>Number of iterations required before process is complete | Ad-hoc, as and when customer service requests are received. | Planned maintenance activities with key customers, but not handled systematically | Service levels are clearly defined for different customer tiers.<br>Other ad-hoc service requests are processed immediately. |
| Process Inputs<br>Data, intentions, objectives, materials, information, events, outputs from other processes, etc. | Minimal insight into partner or customer needs<br>Scope of parts inventory visibility is limited to central stocking locations, or only a very limited view of the network. | Some employment of partner or customer insight to further relationships<br>Scope of parts inventory visibility encompasses all company-owned physical stocking locations in the network. | Partner and customer treatments driven by an evidence-based understanding of needs<br>Scope of inventory visibility includes all network nodes, including dealer channel inventories, field stores and technician stocks. |
| Process Outputs<br>Decisions, status, events, actions, information, materials, finished product, etc., resulting from the process. | Some service requests may remain unfulfilled<br>No receipt confirmation is available for outbound shipments to dealer and technician locations. | Most service requests fulfilled, and on time<br>Receipt confirmation using both automatic and manual methods are available for dealer and technician shipments. | All service requests fulfilled on time, with processes available for customer feedback on service levels<br>Automated data capture tools enable receipt confirmation and end-destination tracking of parts to all network locations. |
| Process Automation<br>Level of automation or tools used to shape, enable or execute the process. | No self-service facility for the viewing and administration of warranties.<br>None or very little decision support capabilities are in place to support parts planning.<br>Asset tracking of parts is not enabled for the network; no visibility is available for part disposition and lifecycle usage. | Facility enables partners to view and distribute warranty information upon request<br>Planners have access to planning toolkit, with analytic tools, data extraction tools and reporting utilities.<br>Asset tracking of parts is enabled using a combination of manual (technician data entry) and automated methods. | Full self-service facility enables partners to view and administer warranty agreements<br>Advanced planning system for service operations has seamless integration with enterprise data systems.<br>Asset tracking of parts is enabled at the serial code level for the full lifecycle of the part across all network locations.<br>Electronic interfaces/Integration with other operation systems to process claims and collect data for warranty analysis. (For example: order processing, service and repair system, accounting system, customer contact management system, diagnostic system, recall campaign management). |

|  | Basic | Competitive | Market Leading |
| --- | --- | --- | --- |
| Process Integration<br>Level of integration the process has with other processes, systems, tools or third parties | Transactional relationship between enterprise and partners or customers<br>Partner has no access to warranty management system | Close relationship with key partners and customers<br>Partner has access to warranty process through marketing contacts | Enterprise and partners work as one team<br>Partner plays an integral role in the warranty management process<br>Enterprise works to fully meet customer's needs and wants |

ENTERPRISE OPERATIONS
Capability Area - Enterprise Operations
Transactional Process Management for OtC, PtP, RtR, and HtR

|  | Basic | Competitive | Market Leading |
| --- | --- | --- | --- |
| Process Participation<br>Who participates in the process execution/approval | Personnel are distributed across business segments or sales organizations.<br>Activities are fragmented across businesses and/or geographies with processes designed around functional/geographical roles. | Transaction processing personnel are located in low cost locations using flexible sourcing models that include the use of shared services or outsourcing. | Organization is aligned to fit the process.<br>Leveraging is maximized on shared services and/or outsourcing |
| Process Creation<br>How the process gets executed<br>Points that serve as differentiators in process capability and sophistication across the scale | Partially standardized processes by business segment<br>Substantial exception processing takes place<br>Deeply experienced personnel are relied upon to provide process and customer specific knowledge<br>Limited process documentation and rigor | Standardized and documented processes by business segment<br>Limited exception processing is required<br>Process and customer specific knowledge is captured in a repository shared by all relevant personnel | A single integrated set of standardized and documented processes across all business segments<br>Exception processing is rare<br>Process and customer specific knowledge is embedded within systems and workflow management tools<br>Formal process owners are in place |
| Process Frequency<br>Number of times and frequency at which a process is executed<br>Number of iterations required before process is complete | This process is ongoing with many ad-hoc triggers in the processing of financial transactions (e.g. orders and collections processes). | This process is ongoing, with stabilized workflows<br>It is supported by system alerts | This process is ongoing, with stabilized workflows<br>It is supported by system alerts<br>Process efficiencies are measured on a regular basis and adjusted where opportunities for improvement are identified |
| Process Inputs<br>Data, intentions, objectives, materials, information, events, outputs from other processes, etc. | Process inputs include service requests generated by the sales, finance, procurement, supply chain, HR functions or employees on an "as needed" basis.<br>Iterations might be required for completeness or accuracy in the data required for process execution. | Process inputs include service requests generated by the sales, finance, procurement, supply chain, HR functions or employees often via pre-formatted self-service forms or supporting self-service system workflow capabilities. | Process inputs include service requests generated by the sales, finance, procurement, supply chain, HR functions or employees often via pre-formatted self-service forms or supporting self-service system workflow capabilities. |
| Process Outputs<br>Data, intentions, objectives, materials, information, events, outputs from other processes, etc. | Process outputs include fulfilled service requests in the form of paid invoices, collected receivables, recorded accounting transactions and HR administration. | Fulfilled service requests in the form of paid invoices, collected receivables, recorded accounting transactions and HR administration.<br>Regular reporting on process performance is in place | Fulfilled service requests in the form of paid invoices, collected receivables, recorded accounting transactions and HR administration.<br>Regular reporting on process performance is in place<br>Continuous improvement culture with mechanisms to regularly adapt transactional processes and improve performance is established |
| Process Automation<br>Level of automation or tools used to shape, enable or execute the process. | Multiple ERP (enterprise resource planning) and/or legacy systems including standalone PtP, OtC, RtR or HR systems, with often geography based instances resulting in limited global reporting capabilities.<br>Limited use of EDI (electronic data interchange) and/or other paperless technology. | Single ERP (enterprise resource planning) system, but with exceptions<br>Some legacy systems are not yet decommissioned.<br>Various "workarounds" (e.g. data warehouse, spreadsheets) required to get visibility at a global level for who holistic or comprehensive information. | Single end-to-end ERP system used worldwide.<br>ERP generated visibility into transactional activities.<br>Heavy use of EDI (electronic data interchange), and/or paperless technologies. |
| Process Integration<br>Level of integration the process has with other processes, | Integration of data and solutions is limited and usually involves batch or manual steps to | Some integration into strategy and business process planning<br>Integrated solutions for major | Comprehensive integration at all levels of organizational strategy through end user activity. |

-continued

|  | Basic | Competitive | Market Leading |
|---|---|---|---|
| systems, tools or third parties | integrate. | processes, near real time data exchange for transaction processing. | Solutions are architected for integration to meet business requirements. |

Capability Area - Enterprise Operations
Master Data Management

|  | Basic | Competitive | Market Leading |
|---|---|---|---|
| Process Participation<br>Who participates in the process execution/approval | Information technology | This process involves CIO and information technology, with business area participation.<br>A steering committee provides overall guidance to all data governance efforts.<br>There is a single lead data governance person. | This process involves senior business area leadership, CIO and information technology team, and suppliers.<br>A steering committee provides overall guidance to all data governance efforts.<br>There is a single lead data governance person.<br>Data producers and users have dedicated and recognized roles.<br>Cross-organizational data governance groups are increasingly established with distinct and clearly defined roles, responsibilities, accountability and authority<br>Data owners and data stewards, both with data management activities are included in talent management |
| Process Creation<br>How the process gets executed Points that serve as differentiators in process capability and sophistication across the scale | Enterprise data requirements are defined<br>IT is driven by leadership and governance<br>Data is periodically extracted and loaded<br>Periodic cleansing, synchronization and updates occur | Enterprise data requirements are defined<br>IT is driven by leadership with business area engagement and governance<br>Some data synchronization occurs with few trading partners<br>Data standards are defined<br>Data quality is monitored. | Enterprise data objectives and responsibilities are clear<br>Business is driven by leadership and governance<br>Data synchronization tools are leveraged internally and with trading partners<br>Third party data is assessed<br>Data quality and standards are maintained |
| Process Frequency<br>Number of times and frequency at which a process is executed Number of iterations required before process is complete | This process has periodic refreshes of enterprise data, generally annually or semi annually. | This process has an ongoing enterprise data management, with periodic refreshes.<br>The frequency of refreshes depends on data volatility and the number of trading partners with issues, etc.<br>Frequency can be quarterly, monthly or weekly. | Enterprise data management is built into business processes and is managed daily for consistency, quality and synchronization. |
| Process Inputs<br>Data, intentions, objectives, materials, information, events, outputs from other processes, etc. | Process inputs include Enterprise data requirements, business objectives, IT data architecture and data quality assessment. | Process inputs include Enterprise data requirements, business objectives, IT strategy, IT data architecture, trading partner readiness and capability and data quality assessment. | Process inputs include business strategy and objectives, IT strategy, IT data architecture, trading partner readiness and capability and data quality assessment. |
| Process Outputs<br>Data, intentions, objectives, materials, information, events, outputs from other processes, etc. | Process outputs include common enterprise data definitions and business rules for usage and change. | Process outputs include common Enterprise data definitions, data ownership and business rules for Enterprise data usage and change. | Process outputs include common Enterprise data definitions, consistent and synchronized data, data ownership, logical and physical data models, and business rules for enterprise data usage and change. |
| Process Automation<br>Level of automation or tools used to shape, enable or execute the process. | Extract, transform and load (ETL) tools to capture and manage Enterprise data and its quality | Extract, Transform and Load (ETL) tools for Enterprise data management; some data interchange tools for trading partner synchronization. | Extract Transform and Load (ETL) tools are used for enterprise data management<br>Enterprise data business rules, definitions repository, tool set, logical data modeling software, trading partner data, synchronization tools, and subscription to a data pool. |
| Process Integration<br>Level of integration the process has with other processes, systems, tools or third parties | Integration includes enterprise data integrated into IT systems and data management processes. | Integration includes enterprise data processes integrated into IT systems and data management processes, with business user contribution and participation. | Enterprise data processes are integrated with daily business processes<br>Trading partner practices and systems manage data Ownership in the systems of record Integration also includes enterprise data service level agreements between the business, IT and trading partners |

|  | Basic | Competitive | Market Leading |
|---|---|---|---|
|  |  |  | (where desired and enterprise data quality incentives and performance are built into leadership or group metrics). |
| Capability Area - Enterprise Operations<br>Corporate Operations Management - Operating Finance ||||
| Process Participation<br>Who participates in the process execution/approval | This process involves an organization's financial personnel organized as a collection of jobs, not as a group or function. | This process involves an Organization's financial group, organized as a function. | Organization's financial group that operates as a team.<br>Shared services are in place providing support across the business.<br>Third party operators are in place for select financial transaction processing |
| Process Creation<br>How the process gets executed Points that serve as differentiators in process capability and sophistication across the scale | Perform general accounting operations, participate in group budgeting, manage capital and coordinate with auditors and tax preparers. | Perform general accounting operations, participate in group budgeting, manage capital, coordinate with auditors and tax preparers and establish enterprise performance management practices. | Refine and adjust the corporate financial strategy<br>Establish a financial oriented culture and learning perform accounting functions<br>Establish and conduct a performance management strategy centered on value creation and 'manage capital' principles<br>Develop tax strategy |
| Process Frequency<br>Number of times and frequency at which a process is executed Number of iterations required before process is complete | This process is ongoing; period-by-period following the general accounting tax calendar. | This process is ongoing; period-by-period following the accounting calendar with performance benchmarking for continuous improvement. | This process is ongoing; the strategic and operational financial calendar is followed and continuous improvement practices are established. |
| Process Inputs<br>Data, intentions, objectives, materials, information, events, outputs from other processes, etc. | Process inputs include CG&S organization's financial targets, overall strategic objectives, and investor and group feedback. | Process inputs include the CG&S organization's financial targets, overall strategic objectives, sales and operations plans, major program requirements and investor and group feedback. | Process inputs include the CG&S organization's financial targets, overall strategic objectives, sales and operations plans, major change program requirements, industry benchmarks, investor input and group feedback. |
| Process Outputs<br>Data, intentions, objectives, materials, information, events, outputs from other processes, etc. | Process outputs include auditable financial practices. | Process outputs include auditable financial practices and a scorecard measuring performance management in the enterprise. | Process outputs include auditable financial practices, a scorecard measuring performance management in the enterprise and financially responsible and integrated culture. |
| Process Automation<br>Level of automation or tools used to shape, enable or execute the process. | Automation of basic financial transaction processing systems and desktop spreadsheet tools | Financial transaction processing systems, electronic data interchange (EDI) and some desktop analytic tools | Financial transaction processing systems, web-based EDI (electronic data interchange) workflow tools, analytic tools and often a data warehouse are automated.<br>Finance processes are fully built into corporate, cross functional ERP (enterprise resource planning) systems, interface with external parties and are used for automation in bank. |
| Process Integration<br>Level of integration the process has with other processes, systems, tools or third parties | Process is integrated into annual planning processes for setting financial targets. | Process is integrated into financial planning processes, project planning and performance score carding. | Financial processes are linked to all business case development, financial and project planning, systems in the case of enterprise performance management and activity based costing.<br>Finance is actively integrated into other business areas and processes. |
| Capability Area - Enterprise Operations<br>Corporate Operations Management - Operating HR ||||
| Process Participation<br>Who participates in the process execution/approval | Human resources or the training groups are involved. | C-level (CIO, CFO, CEO)/ executive team leadership, talent management/human resources and training personnel are involved. | This process involves c-level (CIO, CFO, CEO)/executive team leadership, talent management/human resources group, training group, key external partners and cascading responsibility to all personnel with dedicated talent management pools embedded within each of the organization's groups. |

-continued

| | Basic | Competitive | Market Leading |
|---|---|---|---|
| Process Creation<br>How the process gets executed<br>Points that serve as<br>differentiators in process<br>capability and sophistication<br>across the scale | Review, refine and adjust organizational framework and talent management strategy. Perform recruitment and training; manage talent management services and operations. | This process is characterized by execution of a partial set of sub processes within high-level processes of review:<br>This process includes refining and adjusting organizational framework and talent management strategy, performing talent management, managing talent management service and operations. | Develop human capital strategy, perform change and journey management, perform talent management, sourcing through retirement, manage HR services and operations and conduct performance measurement. Succession management is planned and executed Recognizing the importance of talent and career development to optimize resource utilization. |
| Process Frequency<br>Number of times and frequency<br>at which a process is executed<br>Number of iterations required<br>before process is complete | This process is ongoing, with annual review and refreshes. | This process is ongoing, with annual refreshes, and in-season management. | This process is ongoing, with short-term and long-term strategic planning, quarterly refreshes, and in-season management. |
| Process Inputs<br>Data, intentions, objectives,<br>materials, information, events,<br>outputs from other processes, etc. | Process inputs include corporate strategy, HR measurements, HR regulatory compliance rules, labor/union agreements, employee feedback and financial budget. | Process inputs include corporate strategy, HR measurements, HR regulatory compliance rules, labor/union agreements, employee feedback, financial budget and major program or project plans. | Process inputs include corporate strategy, line of business strategies, HR measurements, HR regulatory compliance rules, labor/union agreements, employee feedback, financial budget, major program or project plans, talent management best practices and client feedback |
| Process Outputs<br>Data, intentions, objectives,<br>materials, information, events,<br>outputs from other processes, etc. | Process outputs include a talent management strategy, and a refined organization. | Process outputs include talent management strategy, optimized organization, talent management policies and procedures, talent management and HR and learning tools. | Process outputs include talent management strategy, optimized organization, change and journey management plan, talent management policies and procedures, HR and learning tools, outsourced HR operations organizations, and succession plan |
| Process Automation<br>Level of automation or tools used<br>to shape, enable or execute the<br>process. | This process has automated time and attendance, direct deposit of of payroll. | This process has automated time and attendance and direct deposit payroll, online self-service for HR information and benefits administration and online recruitment. | Automated time and attendance, direct deposit of checks, online self-service for HR information and benefits administration, online training, automated performance review tools and employee performance scorecard and online recruitment |
| Process Integration<br>Level of integration the process<br>has with other processes,<br>systems, tools or third parties | Process is integrated with corporate strategy processes. | Process is integrated with corporate strategy processes and IT processes. | Process is integrated with corporate strategy processes, IT processes and major program management processes. |
| | Capability Area - Enterprise Operations<br>Corporate Operations Management - Stakeholder Management | | |
| Process Participation<br>Who participates in the process<br>execution/approval | This process involves a public spokesperson, c-level (CIO, CFO, CEO)/executive team or legal representatives. | This process involves a public spokesperson, legal or communications group and c-level (CIO, CFO, CEO)/ executive team for escalation or investor communications. | This process involves a public affairs/corporate communications group, c-level (CIO, CFO, CEO)/executive team or legal for escalation, c-level (CIO, CFO, CEO)/ executive team for investor communications, charitable foundation leaders, and the board of directors |
| Process Creation<br>How the process gets executed<br>Points that serve as<br>differentiators in process<br>capability and sophistication<br>across the scale | Identify necessary vs. optional points of public interaction. Prioritize and balance proactive and reactive participation and communication. | Develop a stakeholder management assessment, approach and set of guidelines that is communicated to the organization.<br>Establish a stakeholder management governance model that is managed and executed consistently with appropriate ownership and responsibility. | Develop and maintain a stakeholder management strategy that is comprehensive and deals with all constituencies.<br>Align the stakeholder management interactions, participation and investment with the overall corporate strategy components. |
| Process Frequency<br>Number of times and frequency<br>at which a process is executed<br>Number of iterations required<br>before process is complete | This process is managed on an ongoing basis by the stakeholders. | This process is ongoing, with annual evaluation of stakeholder management performance and investments. | This process is ongoing, with annual refreshes to strategy, evaluation of stakeholder management performance and investments in future opportunities. |
| Process Inputs<br>Data, intentions, objectives,<br>materials, information, events,<br>outputs from other processes, etc. | Process inputs include investor calendar, governmental activity, banking obligations, industry opportunities, community | Process inputs include investor calendar, governmental activity, banking obligations, industry opportunities, community | Process inputs include investor calendar, governmental activity, banking obligations, forecast for future services, community/ |

|   | Basic | Competitive | Market Leading |
|---|---|---|---|
|   | sponsorships and funding availability. | sponsorships or opportunities, funding availability, corporate strategy and customer feedback. | public/customer feedback, industry change or trends, overall corporate strategy and investment profile. |
| Process Outputs<br>Data, intentions, objectives, materials, information, events, outputs from other processes, etc. | Process outputs include stakeholder communications and select participation. | Process outputs include stakeholder communication, documented policies and procedures and a governance model. | Process outputs include a stakeholder communications strategy, plan investment profile communication, participation calendar, executed activities, and documented policies and procedures. |
| Process Automation<br>Level of automation or tools used to shape, enable or execute the process. | This process has automated communication tools. | This process has automated communication and feedback tools. | This process has automated communication tools, feedback tools and third party information sources. |
| Process Integration<br>Level of integration the process has with other processes, systems, tools or third parties | This process is integrated with budgeting and legal processes. | This process is integrated with strategy development processes, budgeting and legal processes. | This process is integrated with strategy development processes, operations, budgeting, legal and talent management processes. |
| | | Capability Area - Enterprise Operations<br>Facilities and Real Estate Management | |
| Process Participation<br>Who participates in the process execution/approval | CEO and CFO approval with real estate/construction, IT and legal are involved. | The CEO and CFO participate in strategy and issue escalation. Real estate, construction, maintenance, IT, legal and supply chain teams are involved. | There is c-level (CIO, CFO, CEO)/executive team participation in strategy and issue escalation. Real estate, construction, maintenance, IT, legal and supply chain teams are involved. |
| Process Creation<br>How the process gets executed Points that serve as differentiators in process capability and sophistication across the scale | This process includes opportunistic site selection approval and development. | Site selection strategy with target calendar is involved for warehouses and production facilities based on anticipated growth. | Specific site selection strategy is followed with guidelines, calendars, and checkpoints; real estate is viewed as a value driver and strategic advantage that is proactively managed. |
| Process Frequency<br>Number of times and frequency at which a process is executed Number of iterations required before process is complete | This process occurs when it is necessary. | This process is ongoing; a target calendar for geographic penetration, location, and new development or refurbishment is followed. | This process is ongoing Real estate calendar is used for acquisition and divesture, New development and refurbishment is followed and refined with monthly reviews and based on market and business conditions. |
| Process Inputs<br>Data, intentions, objectives, materials, information, events, outputs from other processes, etc. | Process inputs include growth objectives, construction guidelines and budget. | Process inputs include growth objectives, construction guidelines, budget, retailer needs and market and business conditions. | Process inputs include growth objectives, construction guidelines, budget, market trends, retailer feedback, pending real estate options, legislation changes and interest rate changes. |
| Process Outputs<br>Data, intentions, objectives, materials, information, events, outputs from other processes, etc. | Process outputs include selected sites, real estate agreements and real estate calendar. | Process outputs include real estate strategy, new development and refurbishment guidelines, selected sites and real estate calendar. | Process outputs include comprehensive real estate strategy, selected sites for short and long term development or competitive position, real estate calendar and categorized construction guidelines. |
| Process Automation<br>Level of automation or tools used to shape, enable or execute the process. | Desktop software for communication, research and analysis is automated. | Desktop software for construction planning and programs for architectural drawings and specifications are automated. | Desktop software for construction planning and programs for architectural drawings and specifications are automated. |
| Process Integration<br>Level of integration the process has with other processes, systems, tools or third parties | Integrated into corporate strategic planning | Integrated into corporate strategic planning, and merchandise and inventory planning processes | Integrated into corporate and retailer strategic planning, sales and operations planning and merchandise and inventory planning systems |
| Process Participation<br>Who participates in the process execution/approval | CEO and CFO approval Real estate, construction, IT and legal are involved | CEO, CFO and participation in strategy and issue escalation Real estate, construction, maintenance, IT, legal and supply chain team are involved | C-level (CIO, CFO, CEO)/executive team participation in strategy and issue escalation Real estate, construction, maintenance, IT, legal, finance and supply chain teams are involved |
| Process Creation<br>How the process gets executed Points that serve as differentiators in process | This process includes opportunistic site selection approval and development. | Site selection strategy with target calendar is involved for warehouses and production facilities based on anticipated | C-level (CIO, CFO, CEO)/executive team participation in strategy and issue escalation Real estate, construction, |

|  | Basic | Competitive | Market Leading |
| --- | --- | --- | --- |
| capability and sophistication across the scale | | growth | maintenance, IT, legal, finance and supply chain teams are involved<br>Specific site selection strategy is followed with guidelines, calendars, and checkpoints<br>Real estate is viewed as a value driver and strategic advantage that is proactively managed. |
| Process Frequency<br>Number of times and frequency at which a process is executed<br>Number of iterations required before process is complete | This process occurs as-needed | This process is ongoing<br>A target calendar for geographic penetration, location, and new development or refurbishment is followed. | This process is ongoing<br>Real estate calendar for acquisition and divesture is followed<br>New development and refurbishment with monthly reviews is followed and refined based on market and business conditions. |
| Process Inputs<br>Data, intentions, objectives, materials, information, events, outputs from other processes, etc. | Process inputs include growth objectives, construction guidelines and budget. | Process inputs include growth objectives, construction guidelines, budget, retailer needs, and market and business conditions. | Process inputs include growth objectives, construction guidelines, budget, market trends, retailer feedback, pending real estate options, legislation changes and interest rate changes. |
| Process Outputs<br>Data, intentions, objectives, materials, information, events, outputs from other processes, etc. | Process outputs include selected sites, real estate agreements and real estate calendar. | Process outputs include real estate strategy, new development and refurbishment guidelines, selected sites and real estate calendar. | Process outputs include comprehensive real estate strategy, selected sites for short and long term development or competitive position, real estate calendar and categorized construction guidelines. |
| Process Automation<br>Level of automation or tools used to shape, enable or execute the process. | Desktop software for communication, research and analysis are automated. | Desktop software for construction planning and programs for architectural drawings and specifications are automated. | Desktop software for construction planning and programs for architectural drawings and specifications are automated. |
| Process Integration<br>Level of integration the process has with other processes, systems, tools or third parties | Integrated into corporate strategic planning | Integrated into corporate strategic planning, and merchandise and inventory planning processes | Integrated into corporate and retailer strategic planning, sales and operations planning and merchandise and inventory planning systems |
| Capability Area - Enterprise Operations<br>Information Systems and Technology Management | | | |
| Process Participation<br>Who participates in the process execution/approval | Information technology (IT) group is involved | Information technology group with business user participation is involved. | Information technology with regular c-level (CIO, CFO, CEO)/executive team, senior business leadership and business user participation are involved in business process outsourcing of information technology. |
| Process Creation<br>How the process gets executed<br>Points that serve as differentiators in process capability and sophistication across the scale | Develop or acquire IT solutions, manage IT assets, data and resources, manage solution provider services, contracts and licenses and operate and support IT solutions and end users | Develop basic IT strategy, develop or acquire IT solutions, manage IT assets, data and resources, manage solution provider services, contracts and licenses and operate and support IT solutions and end users | Develop comprehensive IT strategy aligned with business strategy, develop or acquire IT solutions, manage IT assets, data; and resources, manage solution provider services, contracts and licenses, operate and support IT solutions and end users and outsource or share select or all IT processes. |
| Process Frequency<br>Number of times and frequency at which a process is executed<br>Number of iterations required before process is complete | This process is ongoing, but limited to new development with primary focus on operations and support. | This process is ongoing with a balance on new development and maintenance support. | This process is ongoing with a focus on innovation and new development.<br>Operations and maintenance may be outsourced or may constitute a small percentage of IT activity. |
| Process Inputs<br>Data, intentions, objectives, materials, information, events, outputs from other processes, etc. | Process inputs include IT historical performance and budget, business objectives and end user feedback. | Process inputs include corporate strategy, business priorities, end user feedback, competitor activity, IT performance measures and service level agreements. | Process inputs include corporate strategy, business priorities, trading partner and end user feedback, competitor activity, industry and out of industry benchmarks, IT performance measures and service level agreements. |

|   | Basic | Competitive | Market Leading |
|---|---|---|---|
| Process Outputs<br>Data, intentions, objectives, materials, information, events, outputs from other processes, etc. | Process outputs include IT solutions and IT support. | Process outputs include IT strategy, IT solutions and IT support. | Process outputs include IT strategy, IT architecture, IT innovation, IT solutions and IT support. |
| Process Automation<br>Level of automation or tools used to shape, enable or execute the process. | Basic solutions, minimal tools and limited architecture are automated. | Industry common practice solutions, some integrated architecture components and select tools are automated. | Comprehensive, integrated architecture and solution set and a significant use of tools are automated. |
| Process Integration<br>Level of integration the process has with other processes, systems, tools or third parties | There is limited integration of data and solutions Usually involves integrating in batches or using manual steps | There is some integration into strategy and business process planning | Comprehensive integration occurs at all levels of the organization. |

INSIGHT AND DECISION MAKING
Capability Area - Insight and Decision Making
Insights and Analytics

|   | Basic | Competitive | Market Leading |
|---|---|---|---|
| Process Participation<br>Who participates in the process execution/approval | Commercial director, product manager, and CFO | Commercial director, marketing manager, product manager and CFO are facilitated by a commercial intelligence manager. | Commercial director, marketing manager, product manager and CFO are facilitated by a commercial intelligence manager. Assistance from outside companies is utilized (commercial research firms: quantitative and qualitative market research). |
| Process Creation<br>How the process gets executed Points that serve as differentiators in process capability and sophistication across the scale | Process evolves from proto-intelligence functions and is not well documented.<br>The formatted inputs are not standardized.<br>There are limited inputs to assess the market.<br>Data is usually pulled out of internally available documentation or generated information. | Some information is assessed and shared among the different areas with loosely defined standards.<br>Commercial information begins to come from stored queries in the system, as an initial stage of BI implementation. | Information is assessed and conclusions are developed based on identified opportunities.<br>The process produces a sophisticated measurement and analysis.<br>All users are aware of the rigorous standards to reach the data and to capture the information which is in place. |
| Process Frequency<br>Number of times and frequency at which a process is executed Number of iterations required before process is complete | Executed monthly and mixed with sales and marketing meetings<br>Processes are generally left unrevised | Executed monthly in a separated session, with bi-weekly updates (when necessary)<br>Processes revised every 6-9 months and communicated to users and stakeholders in advance | Process frequency is bi-weekly with weekly updates<br>Processes are revised and amended quarterly |
| Process Inputs<br>Data, intentions, objectives, materials, information, events, outputs from other processes, etc. | Process inputs include various sources: external (market research information), internal (category/brand, consumer/shopper/channel/customer, competitor) and financial (company financial and performance results). | Process input include various sources: external (market research information), internal (category/brand, consumer/shopper/channel/customer, competitor) and financial (company financial and performance results).<br>Some rigor and attention for external data is emphasized (for example, competitor information). | Process inputs include data from various sources and are fully integrated into company information system (BI/ERP). |
| Process Outputs<br>Decisions, status, events, actions, information, materials, finished product, etc., resulting from the process. | Process outputs include lists and data compilations, not necessarily an insight or recommendation. | Process outputs include categorized reports, focused on competition penetration (new points of sale, new products and promotions).<br>It has episodically insights and actionable items. | Process outputs include online reports (customizable) for the team members.<br>Recommendations to serve new customers/clients/channels, product lines and category white space identification. |
| Process Automation<br>Level of automation or tools used to shape, enable or execute the process. | Electronic spreadsheets with data pulled out of information system via stored queries from pre-programmed reports | Data resides in company's information system Data is retrieved and analyzed | Data is integrated into BI/ERP. |
| Process Integration<br>Level of integration the process has with other processes, systems, tools or third parties | Data silos, with limited interaction among areas are not well represented, (for example, individuals are not fully empowered to approve recommended actions.) | Data is partially available and integrated into BI/ERP systems. Well represented, selected individuals are empowered to approve recommended actions. | Fully integrated into enterprise's BI/ERP systems Data/information analysis holistic in nature and involves a high degree of participation from the key areas |

Capability Area - Insight and Decision Making
Performance Measurement

|   | Basic | Competitive | Market Leading |
|---|---|---|---|
| Process Participation<br>Who participates in the process execution/approval | CFO facilitates the process with participation of second/third levels below c-suite (chief management).<br>Participants are not totally empowered to carry on decisions | C-level (CIO, CFO, CEO)/executive team leads meetings with key members, using the same agenda, and deepening the understanding of specific items. These members have the power | C-level (CIO, CFO, CEO)/executive team leads meetings with key members, using the same agenda, and deepening understanding of specific items These members have the power |

-continued

| | Basic | Competitive | Market Leading |
|---|---|---|---|
| | made during discussions and behave more like messengers. | to implement some of the approved recommendations, needing punctual intervention from leadership. | to implement approved recommendations. |
| Process Creation<br>How the process gets executed<br>Points that serve as differentiators in process capability and sophistication across the scale | Process creation and revision consists of marginal improvements on current processes. | The process is constantly being revised and aims to integrate other data analyzing capabilities into it.<br>Most of the effort is to synchronize and standardize data, concepts, procedures and exceptions. | The process is constantly being revised and integrates all needed data into it.<br>Few integration points are needed.<br>Little data synchronization is needed. |
| Process Frequency<br>Number of times and frequency at which a process is executed<br>Number of iterations required before process is complete | Some cycles such as planning and budgeting are set in the calendar 3-5 months in advance of the company's fiscal year.<br>Other processes, such as KPI's and forecasts are, by nature, monthly.<br>There are some process that occur in between, such as price transfers. | Planning and budgeting may occur 2-4 months before the end of the FY (fiscal year).<br>Changes in importance are captured by using the last available data. | Planning and budgeting is fully integrated into day-to-day operations.<br>Process cuts occur on a monthly basis |
| Process Inputs<br>Data, intentions, objectives, materials, information, events, outputs from other processes, etc. | The nature of this capability is to gather and study numbers.<br>Inputs are data categories that range from financial, to commercial, to sales and marketing, to supply chain and competitors.<br>Data is not always understood or standardized. | Semi-standardized data needs few interventions and basic KPI definitions are used for each input.<br>Results of some data cleaning and measurement are subject to auditing. | Standardized data and clear KPI definitions are used for each input. |
| Process Outputs<br>Decisions, status, events, actions, information, materials, finished product, etc., resulting from the process. | Process outputs are included in several reports on company performance<br>Reports are fixed in format and incomplete due to lack of thorough design<br>Incompetent systems limit completeness and accuracy | Process outputs include complete and accurate reports which still need to be standardized or which have a limited ability to generate user-created queries | Process outputs include complete and accurate reports, standardized or with ability to generate user-created queries |
| Process Automation<br>Level of automation or tools used to shape, enable or execute the process. | Very little automation exists except for data pulled out of the system with the aid of stored queries | Process is better integrated with enterprise planning systems | Process is fully integrated with enterprise planning systems |
| Process Integration<br>Level of integration the process has with other processes, systems, tools or third parties | Processes are integrated link by link.<br>There is no demonstration of architecture. | Integration occurs at participant level, which standardizes data capture and the timing of capture. | Integration occurs at group and area level, which standardizes data capture and the timing of capture. |

We claim:

1. A method for high performance capability assessment of a consumer goods and services business, comprising:
   providing a processor operatively coupled to a communication network;
   providing one more databases operatively coupled to the processor and accessible through the communication network;
   coupling an interface to the processor for receiving input;
   the processor establishing a machine-readable memory in said one or more databases, including a multidimensional consumer goods and services industry performance reference set comprising multiple key assessment performance reference tables, at least one key assessment performance reference table defining a demand generation platform including:
      a 'Basic' performance level specifying 'Basic' performance assessment criteria;
      a 'Competitive' performance level specifying 'Competitive' performance assessment criteria;
      a 'Market Leading' performance level specifying 'Market leading' performance assessment criteria;
   establishing an integrated marketing strategy assessment criteria so that:
      1) the 'Basic' performance assessment criteria includes a first criteria for Process Participation such that participants include the marketing group;
      2) the 'Competitive' performance assessment criteria includes a first criteria for Process Participation such that participants include the marketing group which have formal interaction with customers, supply chain, procurement and sales groups; and
      3) the 'Market Leading' performance assessment criteria includes a first criteria for Process Participation such that sales, operations and supply chain functions of the company are totally integrated into the marketing plan definition processes;
   receiving an input specifying a consumer goods and services industry area and a consumer goods and services industry key assessment area with the consumer goods and services industry area for analysis;
   searching the multidimensional consumer goods and services industry performance reference set for a matching key assessment performance reference table that matches the consumer goods and services industry area and the consumer goods and services industry key assessment area;

retrieving the matching key assessment performance reference table;
initiating analysis of the matching key assessment performance reference table; and
obtaining a resultant performance level for the consumer goods and services industry key assessment area.

2. A method for high performance capability assessment of a consumer goods and services business, comprising:
providing a processor operatively coupled to a communication network;
providing one more databases operatively coupled to the processor and accessible through the communication network;
coupling an interface to the processor for receiving input;
the processor establishing a machine-readable memory in said one or more databases, including a multidimensional consumer goods and services industry performance reference set comprising multiple key assessment performance reference tables, at least one key assessment performance reference table defining a demand generation platform including:
  a 'Basic' performance level specifying 'Basic' performance assessment criteria;
  a 'Competitive' performance level specifying 'Competitive' performance assessment criteria;
  a 'Market Leading' performance level specifying 'Market leading' performance assessment criteria;
establishing a trade marketing operations and execution assessment criteria so that;
  1) the 'Basic' performance assessment criteria includes a first criteria for Process Participation such that main participation is from the local or regional sales group, with finance involvement where needed;
  2) the 'Competitive' performance assessment criteria includes a first criteria for Process Participation such that global and local sales groups are supported by merchandising and marketing teams;
  3) the 'Market Leading' performance assessment criteria includes a first criteria for Process Participation such that global and local sales groups are supported by the merchandising and marketing teams;
receiving an input specifying a consumer goods and services industry area and a consumer goods and services industry key assessment area with the consumer goods and services industry area for analysis;
searching the multidimensional consumer goods and services industry performance reference set for a matching key assessment performance reference table that matches the consumer goods and services industry area and the consumer goods and services industry key assessment area;
retrieving the matching key assessment performance reference table;
initiating analysis of the matching key assessment performance reference table; and
obtaining a resultant performance level for the consumer goods and services industry key assessment area.

3. A method for high performance capability assessment of a consumer goods and services business, comprising:
providing a processor operatively coupled to a communication network;
providing one more databases operatively coupled to the processor and accessible through the communication network;
coupling an interface to the processor for receiving input;
the processor establishing a machine-readable memory in said one or more databases, including a multidimensional consumer goods and services industry performance reference set comprising multiple key assessment performance reference tables, at least one key assessment performance reference table defining a demand generation platform including:
  a 'Basic' performance level specifying 'Basic' performance assessment criteria;
  a 'Competitive' performance level specifying 'Competitive' performance assessment criteria;
  a 'Market Leading' performance level specifying 'Market leading' performance assessment criteria;
establishing a sales operations and execution assessment criteria so that:
  1) the 'Basic' performance assessment criteria includes a first criteria for Process Participation such that Participants are sales and merchandising groups;
  2) the 'Competitive' performance assessment criteria includes a first criteria for Process Participation such that Participants are sales and merchandising groups, supported by key account management;
  3) the 'Market Leading' performance assessment criteria includes a first criteria for Process Participation such that Participants are sales and merchandising groups, driven by category and brand managers and supported by key account management; and
receiving an input specifying a consumer goods and services industry area and a consumer goods and services industry key assessment area with the consumer goods and services industry area for analysis;
searching the multidimensional consumer goods and services industry performance reference set for a matching key assessment performance reference table that matches the consumer goods and services industry area and the consumer goods and services industry key assessment area;
retrieving the matching key assessment performance reference table;
initiating analysis of the matching key assessment performance reference table; and
obtaining a resultant performance level for the consumer goods and services industry key assessment area.

4. The method of claim 1, further including establishing a category, brand, and consumer strategy assessment criteria.

5. The method of claim 1, further including establishing a channel, customer, and shopper strategy assessment criteria.

6. The method of claim 1, further including establishing a consumer marketing operations and execution assessment criteria.

7. A non-transitory computer readable memory or data storage means encoded with data representing a computer program for a high performance capability assessment of a consumer goods and services business, the computer readable memory or data storage means causing the computer to perform the acts of:
providing a processor operatively coupled to a communication network;
providing one more databases operatively coupled to the processor and accessible through the communication network;
coupling an interface to the processor for receiving input;
establishing a machine-readable memory in said one or more databases, including a multidimensional consumer goods and services industry performance reference set comprising multiple key assessment performance reference tables, at least one key assessment performance reference table defining a demand generation platform including:

a 'Basic' performance level specifying 'Basic' performance assessment criteria;

a 'Competitive' performance level specifying 'Competitive' performance assessment criteria;

a 'Market Leading' performance level specifying 'Market leading' performance assessment criteria;

establishing an integrated marketing strategy assessment criteria so that:

1) the 'Basic' performance assessment criteria includes a first criteria for Process Participation such that Participants include the marketing group;

2) the 'Competitive' performance assessment criteria includes a first criteria for Process Participation such that Participants include the marketing group which have formal interaction with customers, supply chain, procurement and sales groups; and 3) the 'Market Leading' performance assessment criteria includes a first criteria for Process Participation such that sales, operations and supply chain functions of the company are totally integrated into the marketing plan definition processes;

receiving an input specifying a consumer goods and services industry area and a consumer goods and services industry key assessment area with the consumer goods and services industry area for analysis;

searching the multidimensional consumer goods and services industry performance reference set for a matching key assessment performance reference table that matches the consumer goods and services industry area and the consumer goods and services industry key assessment area;

retrieving the matching key assessment performance reference table;

initiating analysis of the matching key assessment performance reference table; and obtaining a resultant performance level for the consumer goods and services industry key assessment area.

8. A non-transitory computer readable memory or data storage means encoded with data representing a computer program for a high performance capability assessment of a consumer goods and services business, the computer readable memory or data storage means causing the computer to perform the acts of:

providing a processor operatively coupled to a communication network;

providing one more databases operatively coupled to the processor and accessible through the communication network;

coupling an interface to the processor for receiving input;

establishing a machine-readable memory in said one or more databases, including a multidimensional consumer goods and services industry performance reference set comprising multiple key assessment performance reference tables, at least one key assessment performance reference table defining a demand generation platform including:

a 'Basic' performance level specifying 'Basic' performance assessment criteria;

a 'Competitive' performance level specifying 'Competitive' performance assessment criteria;

a 'Market Leading' performance level specifying 'Market leading' performance assessment criteria;

establishing a trade marketing operations and execution assessment criteria so that:

1) the 'Basic' performance assessment criteria includes a first criteria for Process Participation such that Main participation is from the local or regional sales group, with finance involvement where needed;

2) the 'Competitive' performance assessment criteria includes a first criteria for Process Participation such that global and local sales groups are supported by merchandising and marketing teams;

3) wherein the 'Market Leading' performance assessment criteria includes a first criteria for Process Participation such that global and local sales groups are supported by the merchandising and marketing teams;

receiving an input specifying a consumer goods and services industry area and a consumer goods and services industry key assessment area with the consumer goods and services industry area for analysis;

searching the multidimensional consumer goods and services industry performance reference set for a matching key assessment performance reference table that matches the consumer goods and services industry area and the consumer goods and services industry key assessment area;

retrieving the matching key assessment performance reference table;

initiating analysis of the matching key assessment performance reference table; and obtaining a resultant performance level for the consumer goods and services industry key assessment area.

9. A non-transitory computer readable memory or data storage means encoded with data representing a computer program for a high performance capability assessment of a consumer goods and services business, the computer readable memory or data storage means causing the computer to perform the acts of:

providing a processor operatively coupled to a communication network;

providing one more databases operatively coupled to the processor and accessible through the communication network;

coupling an interface to the processor for receiving input;

establishing a machine-readable memory in said one or more databases, including a multidimensional consumer goods and services industry performance reference set comprising multiple key assessment performance reference tables, at least one key assessment performance reference table defining a demand generation platform including:

a 'Basic' performance level specifying 'Basic' performance assessment criteria;

a 'Competitive' performance level specifying 'Competitive' performance assessment criteria;

a 'Market Leading' performance level specifying 'Market leading' performance assessment criteria;

establishing a sales operations and execution assessment criteria so that:

1) the 'Basic' performance assessment criteria includes a first criteria for Process Participation such that Participants are sales and merchandising groups;

2) the 'Competitive' performance assessment criteria includes: a first criteria for Process Participation such that Participants are sales and merchandising groups, supported by key account management;

3) the 'Market Leading' performance assessment criteria include a first criteria for Process Participation such that Participants are sales and merchandising groups, driven by category and brand managers and supported by key account management; and receiving an input specifying a consumer goods and services industry area and a consumer goods and services industry key assessment area with the consumer goods and services industry area for analysis;

searching the multidimensional consumer goods and services industry performance reference set for a matching key assessment performance reference table that matches the consumer goods and services industry area and the consumer goods and services industry key assessment area;

retrieving the matching key assessment performance reference table;

initiating analysis of the matching key assessment performance reference table; and obtaining a resultant performance level for the consumer goods and services industry key assessment area.

10. The non-transitory computer-readable medium of claim 7 further comprising computer-readable content to cause a computer to perform acts of establishing a category, brand, and consumer strategy assessment criteria.

11. The non-transitory computer-readable medium of claim 7 further comprising computer-readable content to cause a computer to perform acts of establishing a channel, customer, and shopper strategy assessment criteria.

12. The non-transitory computer-readable medium of claim 7 further comprising computer-readable content to cause a computer to perform acts of establishing a consumer marketing operations and execution assessment criteria.

13. A system for high performance capability assessment of a consumer goods and services business, comprising:

a processor operatively coupled to a communication network;

an interface coupled to the processor configured to receive input;

one more databases operatively coupled to the processor and accessible through the communication network;

a machine-readable memory operatively located in said one or more databases, said memory including a multidimensional consumer goods and services industry performance reference set comprising multiple key assessment performance reference tables, at least one key assessment performance reference table defining a demand generation platform including:

a 'Basic' performance level specifying 'Basic' performance assessment criteria;

a 'Competitive' performance level specifying 'Competitive' performance assessment criteria;

a 'Market Leading' performance level specifying 'Market leading' performance assessment criteria;

the processor establishes an integrated marketing strategy assessment criteria so that:

1) the 'Basic' performance assessment criteria includes a first criteria for Process Participation such that Participants include the marketing group;

2) the 'Competitive' performance assessment criteria includes a first criteria for Process Participation such that Participants include the marketing group which have formal interaction with customers, supply chain, procurement and sales groups;

3) the 'Market Leading' performance assessment criteria includes a first criteria for Process Participation such that sales, operations and supply chain functions of the company are totally integrated into the marketing plan definition processes;

the interface receiving an input specifying a consumer goods and services industry area and a consumer goods and services industry key assessment area with the consumer goods and services industry area for analysis;

wherein the processor searches the multidimensional consumer goods and services industry performance reference set for a matching key assessment performance reference table that matches the consumer goods and services industry area and the consumer goods and services industry key assessment area, and retrieves the matching key assessment performance reference table; and wherein the processor performs analysis of the matching key assessment performance reference table; and obtains a resultant performance level for the consumer goods and services industry key assessment area.

14. A system for high performance capability assessment of a consumer goods and services business, comprising:

a processor operatively coupled to a communication network;

an interface coupled to the processor configured to receive input;

one more databases operatively coupled to the processor and accessible through the communication network;

a machine-readable memory operatively located in said one or more databases, said memory including a multidimensional consumer goods and services industry performance reference set comprising multiple key assessment performance reference tables, at least one key assessment performance reference table defining a demand generation platform including:

a 'Basic' performance level specifying 'Basic' performance assessment criteria;

a 'Competitive' performance level specifying 'Competitive' performance assessment criteria;

a 'Market Leading' performance level specifying 'Market leading' performance assessment criteria;

the processor establishing a trade marketing operations and execution assessment criteria such that:

1) the 'Basic' performance assessment criteria includes a first criteria for Process Participation such that Main participation is from local or regional sales group, with finance involvement where needed;

2) the 'Competitive' performance assessment criteria includes a first criteria for Process Participation such that global and local sales groups are supported by merchandising and marketing teams;

3) the 'Market Leading' performance assessment criteria includes a first criteria for Process Participation such that global and local sales groups are supported by the merchandising and marketing teams;

the interface receiving an input specifying a consumer goods and services industry area and a consumer goods and services industry key assessment area with the consumer goods and services industry area for analysis;

wherein the processor searches the multidimensional consumer goods and services industry performance reference set for a matching key assessment performance reference table that matches the consumer goods and services industry area and the consumer goods and services industry key assessment area, and retrieves the matching key assessment performance reference table; and wherein the processor performs analysis of the matching key assessment performance reference table; and obtains a resultant performance level for the consumer goods and services industry key assessment area.

15. A system for high performance capability assessment of a consumer goods and services business, comprising:

a processor operatively coupled to a communication network;
an interface coupled to the processor configured to receive input;
one more databases operatively coupled to the processor and accessible through the communication network;
a machine-readable memory operatively located in said one or more databases, said memory including a multidimensional consumer goods and services industry performance reference set comprising multiple key assessment performance reference tables, at least one key assessment performance reference table defining a demand generation platform including:
   a 'Basic' performance level specifying 'Basic' performance assessment criteria;
   a 'Competitive' performance level specifying 'Competitive' performance assessment criteria;
   a 'Market Leading' performance level specifying 'Market leading' performance assessment criteria;
the processor establishing a sales operations and execution assessment criteria so that:
   1) the 'Basic' performance assessment criteria includes a first criteria for Process Participation such that Participants are sales and merchandising groups;
   2) the 'Competitive' performance assessment criteria includes a first criteria for Process Participation such that Participants are sales and merchandising groups, supported by key account management;
   3) the 'Market Leading' performance assessment criteria includes: a first criteria for Process Participation such that Participants are sales and merchandising groups, driven by category and brand managers and supported by key account management; and
the interface receiving an input specifying a consumer goods and services industry area and a consumer goods and services industry key assessment area with the consumer goods and services industry area for analysis;
wherein the processor searches the multidimensional consumer goods and services industry performance reference set for a matching key assessment performance reference table that matches the consumer goods and services industry area and the consumer goods and services industry key assessment area, and retrieves the matching key assessment performance reference table; and
wherein the processor performs analysis of the matching key assessment performance reference table; and obtains a resultant performance level for the consumer goods and services industry key assessment area.

16. The system of claim 13, wherein the processor establishes a category, brand, and consumer strategy assessment criteria.

17. The system of claim 15, wherein the processor establishes a channel, customer, and shopper strategy assessment criteria.

18. The system of claim 13, wherein the processor establishes a consumer marketing operations and execution assessment criteria.

* * * * *

UNITED STATES PATENT AND TRADEMARK OFFICE
CERTIFICATE OF CORRECTION

PATENT NO.         : 8,214,238 B1
APPLICATION NO.    : 12/427201
DATED              : July 3, 2012
INVENTOR(S)        : Daren Keith Fairfield et al.

Page 1 of 1

It is certified that error appears in the above-identified patent and that said Letters Patent is hereby corrected as shown below:

On the Title Page, item [56]

Right column, lines 4-6, under "OTHER PUBLICATIONS", delete "Ahmed et al.; Maturity Assessment Framework for Business; IBIS-- Issue 1 (1),2006; Department of Electrical & Computer Engineering; University of Western Ontario.*".

Signed and Sealed this
Sixteenth Day of July, 2013

Teresa Stanek Rea
*Acting Director of the United States Patent and Trademark Office*